US008953074B2

(12) United States Patent
Nomura et al.

(10) Patent No.: US 8,953,074 B2
(45) Date of Patent: Feb. 10, 2015

(54) SEMICONDUCTOR DEVICE, PHYSICAL INFORMATION ACQUIRING APPARATUS, AND SIGNAL READING-OUT METHOD

(75) Inventors: Shinya Nomura, Fukuoka (JP); Yoshiaki Urakawa, Fukuoka (JP); Youji Sakioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 13/359,151

(22) Filed: Jan. 26, 2012

(65) Prior Publication Data

US 2012/0199724 A1 Aug. 9, 2012

(30) Foreign Application Priority Data

Feb. 7, 2011 (JP) ................................. 2011-023782

(51) Int. Cl.
| | |
|---|---|
| *H04N 5/335* | (2011.01) |
| *H04N 5/378* | (2011.01) |
| *H04N 5/345* | (2011.01) |
| *H04N 5/369* | (2011.01) |
| *H04N 5/3745* | (2011.01) |
| *H04N 5/376* | (2011.01) |

(52) U.S. Cl.
CPC ............ *H04N 5/378* (2013.01); *H04N 5/3454* (2013.01); *H04N 5/3698* (2013.01); *H04N 5/3745* (2013.01); *H04N 5/376* (2013.01)
USPC ....................................... 348/302; 250/208.1

(58) Field of Classification Search
CPC .... H04N 5/378; H04N 5/37455; H04N 9/045
USPC .............................. 250/208.1; 348/302–310
See application file for complete search history.

(56) References Cited

U.S. PATENT DOCUMENTS

| 2001/0030700 A1* | 10/2001 | Mabuchi et al. ............... 348/302 |
| 2007/0146514 A1* | 6/2007 | Maeda et al. .................. 348/294 |
| 2010/0079611 A1* | 4/2010 | Suzuki et al. ............... 348/222.1 |

FOREIGN PATENT DOCUMENTS

| JP | 2001-298748 | 10/2001 |
| JP | 2007-142738 | 6/2007 |

* cited by examiner

*Primary Examiner* — Thanh Luu
*Assistant Examiner* — Renee D Chavez
(74) *Attorney, Agent, or Firm* — Rader, Fishman & Grauer PLLC

(57) ABSTRACT

A semiconductor device includes: an element array portion in which unit elements are disposed in a matrix; and a signal processing portion including a signal processing circuit executing predetermined signal processing based on unit signals outputted from the circuit elements, respectively, every column, in which a function of the signal processing circuit is controlled in such a way that power consumption of the signal processing circuit concerned corresponding to the unit elements each not required becomes lower in a phase of an element selection mode in which only information on a part of the unit pixels for one row in the element array portion is required than in a phase of a normal operation mode.

10 Claims, 27 Drawing Sheets

SEMICONDUCTOR DEVICE, PHYSICAL INFORMATION ACQUIRING APPARATUS, AND SIGNAL READING-OUT METHOD

BACKGROUND

The present disclosure relates to a semiconductor device (including a solid-state imaging device), a physical information acquiring apparatus (including an imaging apparatus), and a signal reading-out method.

A mode in which only information on partial unit elements is required (referred to as "an element selection mode") such as a thinning-out mode in which information on unit elements for each predetermined interval is required or a cutting-out mode in which information on unit elements in a specific area is required is known in addition to an all-element mode in which information on all of unit elements in an element portion having unit elements disposed therein (preferably, an element array portion in which unit pixels are disposed in a matrix) (referred to as "a normal mode" as well). In addition, a system for accessing the unit elements for one row at the same time to read-out signals in rows (so-called column reading-out system) when signals are read out from the unit elements of the element array portion in which the unit elements are disposed in a matrix is used in some cases. When the element selection mode and the column reading-out system are used together with each other, this mode is referred to as "a column selection mode." For example, Japanese Patent Laid-Open Nos. 2001-298748 and 2007-142738 (hereinafter referred to as Patent Documents 1 and 2) describe the techniques of the column reading-out system and the column selection mode.

SUMMARY

However, Patent Document 1 merely describes the technique for inhibiting the signals from each non-selection column which does not an object of selection in a phase of the column selection mode from being horizontally transferred (skipped). In addition, Patent Document 1 merely describes the technique for reducing an operating current for output signal lines (vertical signal lines) belonging to each non-selection column which does not an object of selection although it describes reduction as well of power consumption in a phase of the column selection mode. Moreover, the techniques described in Patent Documents 1 and 2 are merely applications when horizontal signal lines each common to all of the columns are used.

The present disclosure has been made in order to solve the problems described above, and it is therefore firstly desirable to provide a technique which is capable of more reducing power consumption as compared with a case of a phase of a normal mode even when an operating current for output signal lines is not reduced in a phase of a element selection mode.

It is secondly desirable to provide a technique which is capable of skipping signals corresponding to unit elements each not required, respectively, in a phase of an element selection mode while a configuration is adopted with which horizontal signal lines each common to all of columns are not used.

It is thirdly desirable to provide a technique which is capable of skipping signals corresponding to unit elements each not required, respectively, while power consumption is reduced in a phase of an element selection mode, and which is different from the technique described in Patent Document 2.

In order to attain the desires described above, according to an embodiment of the present disclosure, there is provided a semiconductor device including: an element array portion in which unit elements are disposed in a matrix; and a signal processing portion including a signal processing circuit executing predetermined signal processing based on unit signals outputted from the circuit elements, respectively, every column, in which a function of the signal processing circuit is controlled in such a way that power consumption of the signal processing circuit concerned corresponding to the unit elements each not required becomes lower in a phase of an element selection mode in which only information on a part of the unit pixels for one row in the element array portion is required than in a phase of a normal operation mode.

According to another embodiment of the present disclosure, there is provided a physical information acquiring apparatus including: an element array portion in which unit elements each including a detecting portion detecting a change in a physical amount, and a unit signal generating portion outputting a unit signal through an output signal line based on the change in the physical amount detected by the detecting portion are disposed in a matrix; and a signal processing portion including a signal processing circuit executing predetermined signal processing based on the unit signal acquired under a predetermined detection condition about the physical amount, thereby acquiring physical information for a predetermined object every column, in which a function of the signal processing circuit is controlled in such a way that power consumption of the signal processing circuit concerned corresponding to the unit elements each not required becomes lower in a phase of an element selection mode in which only information on a part of the unit pixels for one row in the element array portion is required than in a phase of a normal operation mode.

According to still another embodiment of the present disclosure, there is provided a signal reading-out method including reading out signals based on unit signals by using a device including an element array portion in which unit elements are disposed in a matrix, and a signal processing portion including a signal processing circuit executing predetermined signal processing based on unit signals outputted from the circuit elements, respectively, every column, the signal reading-out method including: controlling a function of the signal processing circuit in such a way that when an element selection mode in which only information on a part of the unit pixels for one row in the element array portion is required is specified, power consumption of the signal processing circuit concerned corresponding to the unit elements each not required becomes lower than that in a phase of a normal operation mode.

According to yet another embodiment of the present disclosure, there is provided a semiconductor device including: an element portion in which unit elements are disposed in a predetermined direction; and a transferring portion holding read-out signals corresponding to unit signals outputted from said unit elements in memory portions, respectively, and successively transferring the read-out signals held in the memory portions, respectively, to a subsequent stage, the memory portions being cascade-connected to one another, in which in a phase of an element selection mode in which only information on a part of the unit elements in the element portion is required, the read-out signals corresponding to the unit elements each not required, respectively, are inhibited from being transferred.

According to a further embodiment of the present disclosure, there is provided a physical information acquiring apparatus including: an element portion in which unit elements each including a detecting portion detecting a change in a physical amount, and a unit signal generating portion outputting a unit signal through an output signal line based on the change in the physical amount detected by the detecting portion are disposed in a predetermined direction; and a transferring portion holding physical information for a predetermined object corresponding to the unit signals outputted from the unit elements in memory portions, respectively, and successively transferring the physical information held in the memory portions to a subsequent stage, the memory portions being cascade-connected to one another, in which in an element selection mode in which only information on a part of said unit elements in the element portion is required, the physical information corresponding to the unit elements each not required, respectively, are inhibited from being transferred.

According to an even further embodiment of the present disclosure, there is provided a signal reading-out method including reading out signals based on unit signals by using a device including an element portion in which unit elements are disposed in a predetermined direction, and a transferring portion holding read-out signals corresponding to unit signals outputted from the unit elements in memory portions, respectively, and successively transferring the read-out signals held in the memory portions to a subsequent stage, the memory portions being cascade-connected to one another, the signal reading-out method including: inhibiting the read-out signals corresponding to the unit elements each not required, respectively, from being transferred when an element selection mode in which only information on a part of the unit elements in the element portion is required is specified.

According to a still further embodiment of the present disclosure, there is provided a semiconductor device including: an element array portion in which unit elements are disposed in a matrix; a signal processing portion including a signal processing circuit executing predetermined signal processing based on unit signals outputted from the unit elements, respectively, and generating read-out signals every column; an operating current supplying portion including a current source supplying an operating current with which the unit elements output the unit signals, respectively, every column; and a transferring portion successively transferring the read-out signals generated by the signal processing circuit, in which in a phase of an element selection mode in which only information on a part of the unit elements for one row in the element array portion is required, a function of at least one of said signal processing circuit and said current source is controlled in such a way that power consumption of said at least one of said signal processing circuit and said current source corresponding to the unit elements each not required becomes lower than that in a normal operation mode; and the read-out signals corresponding to the unit elements each not required, respectively, is inhibited from being transferred.

According to a yet further embodiment of the present disclosure, there is provided a physical information acquiring apparatus including: an element array portion in which unit elements each including a detecting portion detecting a change in a physical amount, and a unit signal generating portion outputting a unit signal through an output signal line based on the change in the physical amount detected by the detecting portion are disposed in a matrix; a signal processing portion including a signal processing circuit executing predetermined signal processing based on the unit signal acquired under a predetermined detection condition about the physical amount, thereby generating physical information for a predetermined object every column; an operating current supplying portion including a current source supplying an operating current with which the unit elements output the unit signals, respectively, every column; and a transferring portion successively transferring the physical information generated by said signal processing circuit, in which in a phase of an element selection mode in which only information on a part of the unit elements for one row in the element array portion is required, a function of at least one of the signal processing circuit and said current source is controlled in such a way that power consumption of the at least one of said signal processing circuit and the current source corresponding to the unit elements each not required becomes lower than that in a normal operation mode; and the physical information corresponding to the unit elements each not required, respectively, is inhibited from being transferred.

According to an additional embodiment of the present disclosure, there is provided a signal reading-out method including reading out signals based on unit signals by using a device including an element array portion in which unit elements are disposed in a matrix, a signal processing portion including a signal processing circuit executing predetermined signal processing based on unit signals outputted from the unit elements, respectively, and generating read-out signal every column, an operating current supplying portion including a current source supplying an operating current with which the unit elements output the unit signals, respectively, every column, and a transferring portion successively transferring the read-out signals generated by the signal processing circuit, the signal reading-out method including: controlling a function of at least one of the signal processing circuit and said current source in such a way that power consumption of the at least one of the signal processing circuit and the current source corresponding to the unit elements each not required becomes lower than that in a normal operation mode, and inhibiting the read-out signals corresponding to the unit elements each not required, respectively, from being transferred when a phase of an element selection mode in which only information on a part of the unit elements for one row in the element array portion is required is specified.

As set forth hereinabove, according to the present disclosure, in the phase of the element selection mode, even when the operating current for the output signal lines is not reduced, the signal processing circuit corresponding to the unit elements each not required is caused to become the less power consumption state, whereby the entire power consumption can be more reduced than that in the phase of the normal mode.

In addition, according to the present disclosure, the signals corresponding to the unit elements each not required can be skipped in the phase of the element selection mode while the configuration is adopted in which the horizontal signal line common to all of the columns is not used.

Also, according to the present disclosure, in the phase of the element selection mode, the entire power consumption can be reduced by using the technique different from that described in Patent Document 2, and the signals corresponding to the unit elements each not required can be skipped.

DETAILED DESCRIPTION OF THE PREFERRED EMBODIMENTS

Figure 1:
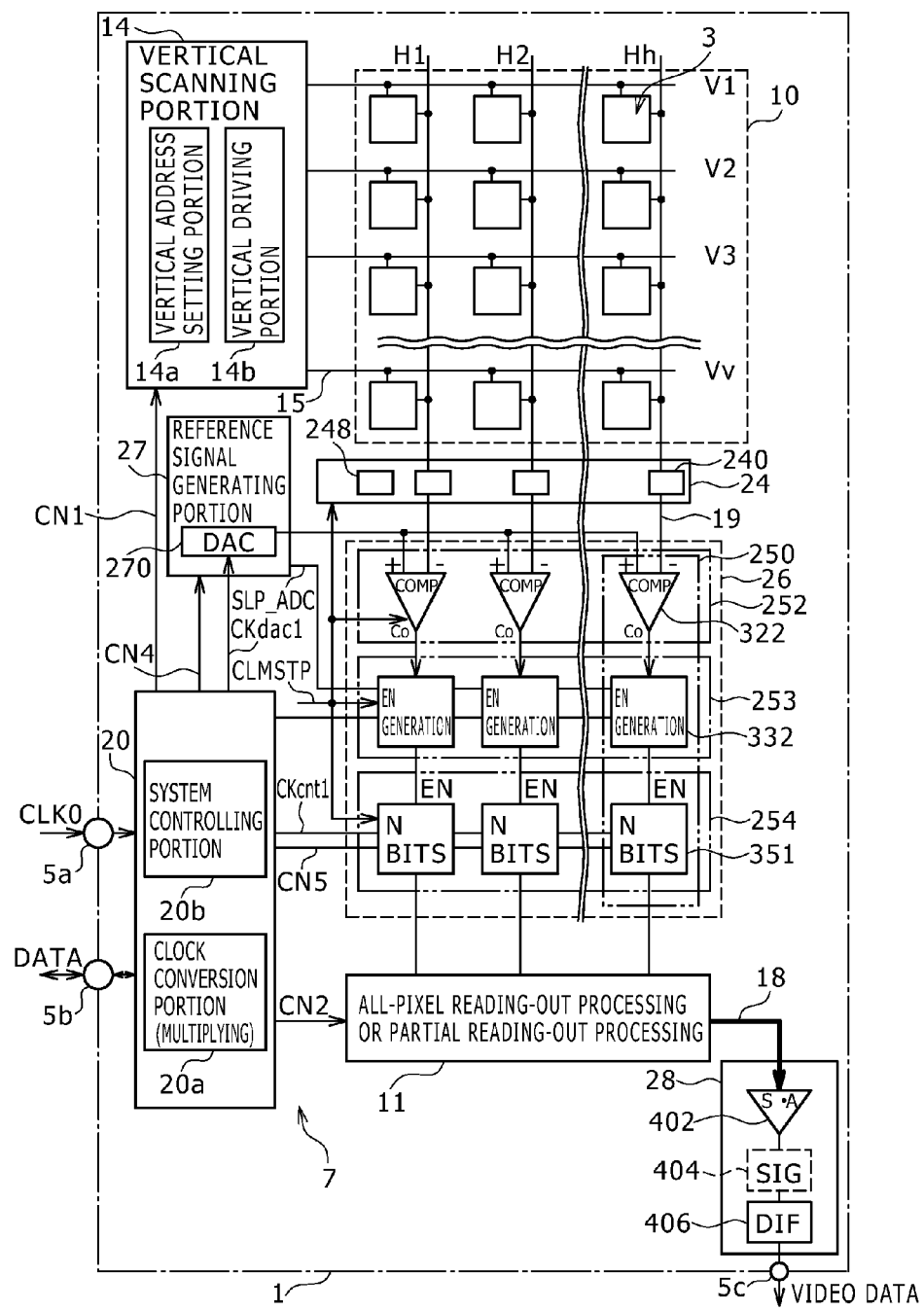
FIG. 1 is a block diagram, partly in circuit, showing a basic configuration of a CMOS (Complementary Metal Oxide Semiconductor) type solid-state imaging device according to an embodiment of the present disclosure.

Hereinafter, embodiments of the present disclosure disclosed in this specification will be described in detail with reference to the accompanying drawings. When functional elements are distinguished among embodiments or Examples, the functional elements are described in the form of being giving reference characters of the alphabet such as A, B, C, .... On the other hand, when the functional elements are not distinguished among the embodiments or Examples, the functional elements are described in the form of omitting the reference characters of the alphabet. This also applies to the drawings.

A description will be given below in accordance with the following order:

1. Entire Outline;
2. Solid-State Imaging Device: Basic Configuration and Operation;
3. Imaging Apparatus;
4. Horizontal Skipping Processing; and
5. Concrete Examples of Constitution Example 1: Cutting-Out Mode, Horizontal Transfer by Shift Register, No Head Side Skipping Example 2: Cutting-Out Mode, Horizontal Transfer by Shift Register, Head Side Skipping Example 3: Cutting-Out Mode, Horizontal Transfer by Horizontal Signal Line, No Head Side Skipping Example 4: Cutting-Out Mode, Horizontal Transfer by Horizontal Signal Line, Head Side Skipping Example 5: Thinning-Out Mode, Horizontal Transfer by Shift Register Example 6: Thinning-Out Mode, Horizontal Transfer by Horizontal Signal Line.

1. Entire Outline

Semiconductor Device, Physical Information Acquiring Apparatus, Signal Reading-Out Method Firstly, basic items will be described below. In a first constitution of the present disclosure corresponding to a semiconductor device according to a first embodiment of the present disclosure, a physical information acquiring apparatus according to a second embodiment of the present disclosure, and a signal reading-out method according to a third embodiment of the present disclosure, when an element selection mode is specified, a signal processing circuit corresponding to unit elements each not required in the element selection mode is caused to be a low power consumption state. Even when an operating current for an output signal line is not reduced, the entire power consumption can be reduced.

Specifically, in the case of the semiconductor device, the semiconductor device includes an element array portion and a signal processing portion. In this case, unit elements are disposed in a matrix in the element array portion. Also, the signal processing portion includes a signal processing circuit for executing predetermined signal processing based on unit signals outputted from the unit elements every column. In the case of the physical information acquiring apparatus, the physical information acquiring apparatus includes an element array portion and a signal processing portion. In this case, unit elements each including a detecting portion for detecting a change in a physical amount, and a unit signal generating portion for outputting a unit signal through an output signal line based on the change in the physical amount detected by the detecting portion are disposed in a matrix in the element array portion. Also, the signal processing portion includes a signal processing circuit for executing predetermined signal processing based on the unit signals acquired under a predetermined detection condition about the physical amount, thereby acquiring physical information for a predetermined object every column. Also, in a phase of an element selection mode in which only information on a part of the unit elements for one row in the element array portion is required, the signal processing portion controls a function of the signal processing circuit in such a way that power consumption of the signal processing circuit concerned corresponding to the unit elements each not required becomes lower than that in a normal operation mode.

"The element selection mode" is a mode in which only a signal from the specific unit element is required except for an all-element mode in which signals from all of the unit elements are read out. With regard to concrete examples of the element selection mode, a so-called thinning-out mode in which pixel signals are read out every predetermined interval column, a cutting-out mode in which a certain area is partitioned for reading-out, and the like correspond thereto. The thinning-out mode and the cutting-out mode may be used together with each other. This also applies to each of a second constitution and a third constitution of the present disclosure.

In the first constitution of the present disclosure, when the function of the signal processing circuit is controlled in such a way that the power consumption of the signal processing circuit concerned corresponding to the unit elements each not required becomes lower than that in the normal operation mode, any system may be adopted as long as it causes the power consumption state to become the low power consumption state. For example, the function of the signal processing circuit may be controlled in such a way that the power consumption state is caused to become the low power consumption state with an electric power being supplied from a power source. Or, a system may also be adopted in which a current from a current source is reduced in a functional portion having a relationship with the current source. The function of the signal processing circuit may be controlled by stopping the supply itself of the electric power from the power source. The effect of reduction of the power consumption is higher in the case where the supply itself of the electric power from the power source is stopped than in the case where the function of the signal processing circuit is controlled with the electric power being supplied from the power source.

For the purpose of controlling the function of the signal processing circuit with the electric power being supplied from the power source, the measures corresponding to a configuration of the signal processing circuit are taken. For stopping the supply of the electric power from the power source, it is only necessary to provide a switch for ON/OFF of the supply of the electric power from the power source. In this case, it is better to take measures for preventing an evil influence from being exerted on an output stage of a circuit in a preceding stage connected to an input side of each functional portion, or an input stage of a circuit in a subsequent stage connected to an output side of each functional portion. The reason for this is because the circuit in the preceding stage or the circuit in the subsequent stage is prevented from causing a problem such as latch-up due to stop of the supply of the electric power from the power source. In other words, the technique for controlling the function of the signal processing circuit with the electric power being supplied from the power source can reduce the power consumption without worrying about the evil influence such as the latch-up.

In the first constitution of the present disclosure, although the signal processing circuit may adopt a configuration with which analog processing is executed, thereby generating an analog read-out signal, preferably, it is only necessary for the signal processing circuit to include an Analog to Digital (AD) conversion portion for converting an analog unit signal into digital data. An anti-noise property is more advantageous in the case where a signal is read out as digital data to a circuit in a subsequent stage than in the case where a signal is read out as an analog signal to a circuit in a subsequent stage. Although various configurations may be adopted for the AD conversion portion, preferably, it is only necessary to adopt a so-called reference signal comparison type AD conversion portion including a comparison processing portion and a counting processing portion. In this case, the comparison processing portion compares a unit signal with a reference signal whose level is gradually changed. Also, the counting processing portion carries out a counting operation for converting an analog unit signal into digital data based on the comparison result from the comparison processing portion by using a counting clock for AD conversion. In this case, it is only necessary to control the function of the signal processing circuit in such a way that the power consumption of any one of the comparison processing portion and the counting processing portion becomes lower in the phase of the element selection mode than in the phase of the normal operation mode. Preferably, it is only necessary to control the function of the signal processing circuit in such a way that the power consumptions of both of the comparison processing portion and the counting processing portion become lower in the phase of the element selection mode than in the phase of the normal operation mode.

In the first constitution of the present disclosure, there may be further provided an operating current supplying portion including a current source for supplying an operating current with which the unit elements output the unit signals, respectively, every column. In this case, it is only necessary to set the operating current by the current source corresponding to the unit elements each not required less in the phase of the element selection mode than in the phase of the normal operation mode.

For setting the operating current less in the phase of the element selection mode than in the phase of the normal operation mode, for example, it is only necessary to provide a switch capable of switching an ON state and an OFF state of a current path over to each other, thereby making the operating current zero. Or, current sources may be provided in output signal lines, respectively, and the current sources may be controlled, thereby directly controlling the current sources of the unit elements each not required. In this case, a control amount is adjusted, whereby the current from the current sources of the unit elements each not required can also be made zero, and a small current less than the current (in other words, of the output signal line of the unit elements each required) in the phase of the normal mode may also be maintained. When the currents from the current sources of the unit elements each not required are each made zero, it is only necessary to provide a reference voltage supplying portion for setting an operating point electric potential of the output signal line of the unit elements each not required at a predetermined value.

In the second constitution of the present disclosure corresponding to a semiconductor device according to a fourth embodiment of the present disclosure, a physical information acquiring apparatus according to a fifth embodiment of the present disclosure, and a signal reading-out method according to a sixth embodiment of the present disclosure, memory portions are cascade-connected to one another, and a transferring portion is provided. In this case, the transferring portion holds read-out signals corresponding to unit signals outputted from the unit elements in the memory portions cascade-connected to one another, respectively, and successively transfers the read-out signals held in the memory portions, respectively, to a subsequent stage. By the way, in the case of the semiconductor device, the semiconductor device includes an element portion in which unit elements are disposed in a predetermined direction. In the case of the physical information acquiring apparatus, the physical information acquiring apparatus includes an element portion. In this case, unit elements each including a detecting portion for detecting a change in a physical amount, and a unit signal generating portion for outputting a unit signal through an output signal based on the change in the physical amount detected by the detecting portion are disposed in a predetermined direction in the element portion. Also, in a phase of an element selection mode in which only information on a part of the unit elements in the element portion is required, the read-out signals corresponding to the unit elements each not required, respectively, are inhibited from being transferred. Therefore, although a configuration is adopted in which horizontal signal lines common to all of the columns, respectively, are not used, it is possible to skip the signals corresponding to the unit elements each not required, respectively, in the phase of the element selection mode.

In the cutting-out mode, it is not essential to inhibit both of the read-out signals on a head side and a rear side of transfer out of the cutting-out from being transferred. Thus, it is only necessary to inhibit at least one of the read-out signals on the head side and the rear side of the transfer from being transferred. When the read-out signal on the head side of the transfer is inhibited from being transferred, there may be provided a switch for passing (short-cutting) the memory portions inhibited to carry out the transfer.

In the thinning-out mode, it is only necessary to dispose a switch having input terminals the number of which corresponds to the number of thinning-out, and one output terminal between each adjacent two stages of the memory portion. In this case, output signals from the memory portions in the preceding stage are inputted to the input terminals in order. The selection by the switch in the thinning-out mode is carried out for the output signal from the memory portion which is located in the preceding stage by the number corresponding to the number of thinning-out. Or, a switch having two input terminals and one output terminal is disposed between each adjacent two stages of the memory portions for each number of thinning-out irrespective of the number of thinning-out. In this case, an output signal from the memory portion right before the switch is inputted to one input terminal, and an output signal from the memory portion which is located in the preceding stage by the number corresponding to the number of thinning-out is inputted to other input terminal. Also, the selection by the switch in the thinning-out mode is carried out for an output signal from the memory portion which is located in the preceding stage by the number corresponding to the number of thinning-out. When the memory portion in the final stage does not become for the final reading-out from a relationship with the setting of the number of thinning-out, it is only necessary to provide a switch for passing (short-cutting) the memory portions, which are not substantially used, up to the memory portion which becomes for the final reading-out to carry out the transfer.

In the second constitution of the present disclosure, the element portion may be an element array portion in which the unit elements are disposed in a matrix. In this case, a signal processing portion is further provided which includes a signal processing circuit for executing predetermined signal processing based on the unit signals outputted from the unit elements, respectively, thereby generating read-out signals every column. Also, in the phase of the element selection mode, the read-out signals corresponding to the unit elements each not required are inhibited from being transferred.

In the second constitution of the present disclosure, it is only necessary for the signal processing circuit to include an AD conversion portion for converting an analog unit signal into digital data. The anti-noise property is more advantageous in the case where a signal is read out as digital data to a circuit in a subsequent stage than in the case where a signal is read out as an analog signal to a circuit in a subsequent stage. Although various configurations can be adopted for the AD conversion portion, preferably, it is better to adopt the so-called reference signal comparison type AD conversion portion described above. In this case, the transferring portion transfers digital data of the unit signal as the read-out signal.

In a third constitution of the present disclosure corresponding to a semiconductor device according to a seventh embodiment of the present disclosure, a physical information acquiring apparatus according to an eighth embodiment of the present disclosure, and a signal reading-out method according to a ninth embodiment of the present disclosure, there is adopted a configuration with which in a phase of an element selection mode, the entire power consumption can be reduced by using a technique different from that described in Patent Document 2, and signals corresponding to unit elements each not required can be skipped. The basic way of thinking uses the technique of the first constitution in which in the phase of the element selection mode, the power consumption is caused to be the low power consumption state, and the technique of the second constitution in which in the phase of the element selection mode, the read-out signals corresponding to the unit elements each not required are inhibited from being transferred together with each other. However, in the first constitution, the object for which in the phase of the element selection mode, the power consumption is caused to be the low power consumption state is the signal processing circuit, and in the second constitution, the transferring portion is used in which the memory portions are cascade-connected to one another. On the other hand, in the third constitution, these limitations are unnecessary. That is to say, various constitutions can be adopted as long as the function stop of the functional portions corresponding to the non-selection elements, respectively, and the skipping of the signals from the non-selection elements are used together with each other.

Specifically, in the case of the semiconductor device, the semiconductor device includes an element array portion, a signal processing portion, an operating current supplying portion, and a transferring portion. In this case, unit elements are disposed in a matrix in the element array portion. The signal processing portion includes a signal processing circuit for executing predetermined signal processing based on unit signals outputted from the unit elements, respectively, thereby generating read-out signals every column. The operating current supplying portion includes a current source for supplying an operating current with which the unit elements output the unit signals, respectively, every column. Also, the transferring portion successively transfers the read-out signals generated by the signal processing circuit. In the case of the physical information acquiring apparatus, the physical information acquiring apparatus includes an element array portion, a signal processing portion, an operating current supplying portion, and a transferring portion. In this case, unit elements each including a detecting portion for detecting a change in a physical amount, and a unit signal generating portion for outputting the unit signal through an output signal line based on the change in the physical amount detected by the detecting portion are disposed in a matrix in the element array portion. The signal processing portion includes a signal processing circuit for executing predetermined signal processing based on the unit signals acquired under a predetermined detection condition about the physical amount, thereby generating physical information for a predetermined object every column. The operating current supplying portion includes a current source for supplying an operating current with which the unit elements output the unit signals, respectively, every column. Also, the transferring portion successively transfers the physical information generated by the signal processing circuit. In addition, the signal processing portion controls a function of at least one of the signal processing circuit and the current source in such a way that power consumption of the at least one of the signal processing circuit and the current source becomes lower in a phase of an element selection mode in which only information on a part of the unit elements for one row in the element array portion is required than in a normal operation mode. Also, the signal processing portion inhibits the read-out signals corresponding to the unit elements each not required, respectively, from being transferred. In the cutting-out mode and the thinning-out mode, with regard to the concrete measures when the read-out signals corresponding to the unit elements each not required, respectively, are inhibited from being transferred, it is only necessary to adopt the same technique as that in the second constitution.

In the third constitution of the present disclosure, preferably, similarly to the case of the second constitution, it is only necessary for the transferring portion to hold the read-out signals corresponding to the unit pixels outputted from the unit elements, respectively, in the memory portions cascade-connected to one another, and to successively transfer the read-out signals held in the memory portions, respectively, to the subsequent stage. Or, the third constitution of the present disclosure is by no means limited thereto, and may adopt an embodiment in which a horizontal signal line common to all of the columns is used. That is to say, the transferring portion may have a signal line which is commonly used in the signal processing circuits, and may read out the read-out signals from the signal processing circuits in order, thereby transferring the read-out signals.

In the third constitution of the present disclosure, when the signal processing portion controls the function of at least one of the signal processing circuit and the current source in such a way that the power consumption of the at least one of the signal processing circuit and the current source corresponding to the unit elements each not required becomes lower in the phase of the element selection mode than in the normal operation mode, any system may be adopted as long as the system causes the power consumption to be the low power consumption state. For example, the function of the signal processing circuit may be controlled in such a way that the power consumption state is caused to become the low power consumption state with an electric power being supplied from a power source. Or, a system may be adopted in which a current from a current source is reduced in a functional portion having a relationship with the current source. The function of the signal processing circuit may be controlled by stopping the supply itself of the electric power from the power source. Basically, the technique adopted in the first constitution can be similarly applied.

In the third constitution of the present disclosure, it is only necessary for the signal processing circuit to include the AD conversion portion for converting an analog unit signal into digital data similarly to the case of the first constitution. Preferably, it is only necessary for the signal processing circuit to adopt the so-called reference signal comparison type AD conversion portion. In this case, similarly to the case of the first constitution, it is only necessary to control the function of the signal processing circuit in such a way that the power consumption of any one of the comparison processing portion and the counting processing portion becomes lower in the phase of the element selection mode than in the phase of the normal operation mode. Preferably, it is only necessary to control the function of the signal processing circuit in such a way that the power consumptions of both of the comparison processing portion and the counting processing portion becomes lower in the phase of the element selection mode than in the phase of the normal operation mode.

The solid-state imaging device includes an electric charge detecting portion (typically, a photoelectric conversion portion) having a sensitivity for an electromagnetic wave, and thus can be applied to an image fetching-in portion for fetching in an image by utilizing the electric charge detecting portion. Thus, the solid-state imaging device is installed and used across the broad of an imaging apparatus and an electronic apparatus each of which uses the solid-state imaging device. For example, the solid-state imaging device is used in the imaging apparatus (camera system) such as a digital still camera or a video camera. Also, the electronic apparatuses include a personal digital assistance, such as a mobile phone, having an imaging function, and a copy machine using the solid-state imaging device or the imaging apparatus in an image fetching-in portion. The solid-state imaging device and the imaging apparatus include a linear sensor and an area sensor. The solid-state imaging device can be grasped as one embodiment of a physical amount distribution detecting semiconductor device in which plural unit constituent elements (such as pixels) each having the sensitivity for the electromagnetic wave, such as a light or a radiation, which is inputted thereto from the outside are disposed either in a line or in a matrix. Also, the imaging apparatus can be grasped as one embodiment of a physical information acquiring apparatus (physical amount distribution detecting apparatus) utilizing the physical amount distribution detecting semiconductor device.

The constitution of the present disclosure can be applied not only to the solid-state imaging device including the electric charge detecting portion having the sensitivity for the electromagnetic wave, such as the light or the radiation, which is inputted thereto from the outside, but also to all of devices which detect changes in various physical amounts as changes in amounts of electric charges. For example, the physical amount distribution detecting semiconductor device can be applied to devices which detect other physical changes such as a fingerprint authentication device for detecting information on a fingerprint as an image of a fingerprint based on a change in electrical characteristics or a change in optical characteristics based on a pressure. For example, the technique of the present disclosure can be applied to a detecting portion in a touch panel. Or, in the field of computer apparatuses, for example, there is used the fingerprint authentication device for detecting the information on the fingerprint as the image of the fingerprint based on the change in the electrical characteristics or the change in the optical characteristics based on the pressure. In this case, such a device is a device for reading out a physical amount distribution which is converted into electrical signals by the unit constituent elements (the pixels in the case of the solid-state imaging device) in the form of the electrical signals, and thus the technique of the present disclosure can be applied thereto. A camera module installed in the electronic apparatus is referred to as the imaging apparatus in some cases. Although the constitution which will be described below will be described by typifying the solid-state imaging device and the imaging apparatus having the solid-state imaging device installed therein, the present disclosure is by no means limited thereto, and thus can also be applied to various electronic apparatuses each having the imaging function.

As can be understood from this, not only the techniques described in the appended claims, but also the electronic apparatus including the same functional portion as that of the semiconductor device, the solid-state imaging device, the physical amount distribution detecting semiconductor device, the imaging apparatus, the physical information acquiring apparatus or the like can be extracted as the technique disclosed in this specification. By the way, in this specification, the semiconductor device includes the solid-state imaging device, and the physical information acquiring apparatus includes the imaging apparatus unless otherwise stated (for example, the point distinctly described here).

2. Solid-State Imaging Device: Basic Configuration and Operation

Hereinafter, a description will be given by exemplifying the case where a CMOS (Complementary Metal Oxide Semiconductor) type solid-state imaging device as an example of an X-Y address type solid-state imaging device is used as a device. Unless otherwise stated, the description will be given below on the assumption that in the CMOS type solid-state imaging device, all of unit pixels are composed of n-channel MOS (nMOS) transistors, and a signal electric charge is a negative electric charge (electron). However, this is merely an example. Thus, the objective device is by no means limited to the MOS type solid-state imaging device. That is to say, the unit pixel may be composed of a p-channel MOS (pMOS) transistor, and the signal electric charge may be a positive electric charge (hole). All of embodiments which will be described later can be similarly applied to all of the physical amount distribution detecting semiconductor devices in each of which plural unit pixels each having the sensitivity for the electromagnetic wave, such as the light or the radiation, inputted thereto from the outside are disposed either in a line or in a matrix, and each of which reads out the signals in accordance with the address control.

[Basic Configuration]

FIG. 1 is a block diagram, partly in circuit, showing a basic configuration of a CMOS type solid-state imaging device (CMOS image sensor) as an embodiment of the solid-state imaging device. The solid-state imaging device is also an example of the semiconductor device. The solid-state imaging device 1 includes a pixel array portion 10 in which plural unit pixels 3 are disposed in a two-dimensional matrix. The solid-state imaging device 1, for example, uses a color separation filter in which color filters for R, G, and B are arranged in a Bayer arrangement style, whereby the pixel array portion 10 can be made to respond to the color imaging. Although in FIG. 1, parts of rows and columns is omitted for the sake of simplicity of illustration, actually, several tens to several thousands of unit pixels 3 are disposed in each row and in each column. As will be described later, the unit pixel 3 includes an intra-pixel amplifier having three or four transistors for electric charge transfer, reset, amplification, and the like in addition to a photodiode as a light receiving element (electric charge generating portion) as an example of a detecting portion. For the pixel array portion 10, all it takes is that the unit pixels 3 are disposed in a two-dimensional form. Thus, the disposition form of the unit pixels 3 is by no means limited to the two-dimensional lattice-like form, and thus may be a pixel shifting disposition form in which the unit pixels 3 are disposed in an oblique lattice-like form, or may be a disposition form in which the unit pixels 3 are disposed in a honeycomb-like form.

A pixel signal voltage $V_x$ is outputted from the unit pixel 3 every column through a vertical signal line 19. In the pixel signal voltage $V_x$ outputted through the vertical signal line 19, a signal level $S_{sig}$ (received-light signal) appears after a reset level $S_{rst}$ (dark-phase signal) containing therein a noise of a pixel signal as a reference level in a time series manner. For example, the reset level $S_{rst}$ is a level obtained by adding a reset component $V_{rst}$ to a field through level $S_{feed}$. The signal level $S_{sig}$ is a level obtained by adding a signal component $V_{sig}$ to the reset level $S_{rst}$, and the signal component $V_{sig}$ is obtained in the form of $S_{sig}(=S_{rst}+V_{sig})-S_{rst}$. This differential processing corresponds to so-called Correlated Double Sampling (CDS) processing. Both of the dark-phase signal and the received-light signal are acquired and difference (level difference) between them is acquired, which results in that the noise component is contained in both of the dark-phase signal and the received-light signal in the same way, and thus the noise contained in the difference becomes very small.

One end of the vertical signal line 19 extends to a column portion 26 side, and the operating current supplying portion 24 is connected to the extension path, so that an operating current (read-out current) is supplied to the vertical signal line 19. The operating current supplying portion 24 includes a current source 240 every vertical signal line 19 (every column), and includes a reference current source portion 248 used commonly in the columns. Here, with regard to a characteristic point of this configuration, column stop signals $CLMSTP_n$ (details thereof will be described later) in accordance with which the current sources 240 are controlled so as to be turned ON or OFF are inputted to the current sources 240 so as to correspond to the columns, respectively. The functions of the current sources 240 belonging to each non-selection column in which the horizontal transfer of the pixel data is unnecessary are stopped, thereby reducing the power consumption.

In the column portion 26, AD conversion portions 250 each having a CDS processing function and a digital conversion function are provided in parallel with one another in columns. In a word, the solid-state imaging device 1 is provided with the current source 240 and the AD conversion portion 250 every column. Although details will be descried later, the column portion 26 is provided with a comparing portion 252, a counting operation time period controlling portion 253, and a counting portion 254. The AD conversion portion 250 is configured in the form of a set of these functional portions for one column. The wording "parallel with one another in columns" means that the functional elements (the AD conversion portions 250 in this case) such as plural CDS processing functional portions and plural digital conversion portions (AD conversion portions) are provided in parallel with the vertical signal lines 19 (an example of column signal lines) belonging to the respective vertical columns. We shall refer such a reading-out system as a column reading-out system. Although in the typical column reading-out system, the vertical signal lines 19 and the AD conversion portions 250 are disposed so as to show one-to-one correspondence, the present disclosure is by no means limited thereto, and thus may adopt a so-called column share configuration in which one AD conversion portion 250 is provided for predetermined plural columns. In this case, although not illustrated, the column portion 26 is provided with a vertical line selecting portion for selecting one vertical signal line 19 for the predetermined plural columns. Adoption of the column sharing configuration results in that the comparator and the counter can be shared among plural columns. As a result, there are obtained advantages that it is possible to reduce an area which the column portion 26 occupies on the sensor chip, the manufacturing cost becomes inexpensive, and so forth.

The solid-state imaging device 1 further includes a drive controlling portion 7, an operation current supplying portion 24, a reference signal generating portion 27, and an outputting portion 28. In this case, the operation current supplying portion 24 supplies an operating current (read-out current) for pixel signal reading to the unit pixel 3. Also, the reference signal generating portion 27 supplies a reference signal SLP_ADC for AD conversion to the column portion 26.

The drive controlling portion 7 includes a horizontal transferring portion 11, a vertical scanning portion 14 (row scanning circuit), and a communication/timing controlling portion 20 in order to realize a control circuit function for successively reading out the signals from the pixel array portion 10. In response to a control signal CN2 from the communication/timing controlling portion 20, the horizontal transferring portion 11 starts to carry out the scanning for the columns, and transfers the pixel data acquired in the column portion 26 in the horizontal direction while it indicates a column portion of the data to be read out in a phase of a data transferring operation. The vertical scanning portion 14 includes a vertical address setting portion 14a and a vertical driving portion 14b which control a row address and row scanning. The vertical scanning portion 14 selects the row of the pixel array portion 10 and supplies a pulse necessary for the row thus selected. Thus, the vertical scanning portion 14 starts to carry out the scanning for the rows in response to a control signal CN1 from communication/timing controlling portion 20. The vertical address setting portion 14a selects the row for an electronic shutter, and the like in addition to the row from which the signals are to be read out (the read-out row: referred to as "a selection row" or "a signal output row" as well).

Here, although details will be described later, the features of the horizontal transferring portion 11 in the embodiment are that the horizontal transferring portion 11 can execute horizontal partial reading-out processing for horizontally transferring only the pixel data on a part of the pixels (columns) in the horizontal direction in addition to the normal reading-out processing for horizontally transferring the data on all of the pixels in the horizontal direction.

The unit pixel 3 is connected to the vertical scanning portion 14 through a row control line 15 for row selection, and is also connected to the AD conversion portion 250 provided every vertical column of the column portion 26 through the vertical signal line 19. The row control lines 15 shows the entire wirings which are wired from the vertical scanning portion 14 to the pixels.

The communication/timing controlling portion 20 includes a functional block of a timing generator (an example of a read address controller). In this case, the functional block of the timing generator supplies a clock synchronized with a master clock CLK0 inputted through a terminal 5a to each of the portions such as the horizontal transferring portion 11, the vertical scanning portion 14, and the column portion 26. In addition, the communication/timing controlling portion 20 includes a functional block of a communication interface. In this case, the functional block of the communication interface receives the master clock CLK0 supplied from an external main control portion through the terminal 5a, receives data which is supplied from the external main control portion through a terminal 5b and which is used to make an instruction for an operation mode or the like, and outputs data containing therein information on the solid-state imaging device 1 to the external main control portion. For example, the communication/timing controlling portion 20 includes a clock conversion portion 20a having a function of a clock conversion portion for generating an internal clock, a system controlling portion 20b having a communication function and a function for controlling each of the portions, and the like. The clock conversion portion 20a includes therein a multiplying circuit for generating a pulse having a higher speed frequency than that of the master clock CLK0 based on the master clock CLK0 inputted through the terminal 5a. Thus, the clock conversion portion 20a generates interval clocks such as a current clock $CK_{cntl}$ and a count clock $CK_{dacl}$.

The outputting portion 28 includes a signal amplifying portion 402 (sense amplifier S·A), and a digital interface portion 406 (DIF) making a function of an interface between the solid-state imaging device 1 and the outside. The signal amplifying portion 402 detects a signal (having a small amplitude in spite of digital data) on the horizontal signal line 18 as a signal line (transfer wiring) for data transfer between the horizontal transfer portion 11 and the signal amplifying portion 402. In the outputting portion 28, a digital arithmetically operating portion 404 (SIG) for executing various pieces of digital arithmetically operating processing may be provided between the signal amplifying portion 402 and the digital interface portion 406 as may be necessary. The digital interface portion 406 is interposed between the signal amplifying portion 402 and an external circuit, and makes a function of an interface with the external circuit. An output terminal of the digital interface portion 406 is connected to an output terminal 5c, and video data is outputted to a circuit in a subsequent stage.

[Details of Column AD Circuit and Reference Signal Generating Portion]

With regard to an AD conversion system in the AD conversion portion 250, various systems are considered from a viewpoint of a circuit scale, a processing rate (increased processing rate), resolution, and the like. However, as an example, there is adopted an AD conversion system which is also referred to as a reference signal comparison type AD conversion system, a slope integration type AD conversion system, a ramp signal comparison type AD conversion system or the like. This system has the feature that even when the AD convertors are provided in parallel with one another, the circuit scale is preventing from being made large because the AD convertor can be realized with a simple configuration. In carrying out the reference signal comparison type AD conversion, a current operation enables time period $T_{en}$ is determined based on a time from conversion start (start of the comparison processing) to conversion end (end of the comparison processing) (a signal representing this time period is referred to as an enable signal EN in this case). Also, a processing object signal is converted into digital data based on the number of clocks for this time period.

Information obtained from the comparison processing is pulse information having time information corresponding to a magnitude of an analog signal (a pixel signal voltage $V_x$ in this case). In the reference signal comparison type AD conversion processing, an enable time period for counting processing is determined based on the pulse information (time information) obtained from the comparison processing. Also, there is executed counting processing for changing a value at a given rate for the enable time period for the counting processing. As a typical example, the least significant digit is changed one by one with the reference clock cycle by using a counter. The count value thus obtained is acquired as digital data corresponding to a magnitude of an analog signal. Of course, all it takes is that the counting processing for changing the value at the given rate can be executed. Thus, the present disclosure is by no means limited to the configuration using the counter, and various changes can be made. For example, there may be adopted a configuration in which a so-called adder and adder/subtractor, and a data holding portion (latch) for holding therein the result from the adder and adder/subtractor with the reference clock cycle are used to configure a cyclic type AD conversion system, so that a change value in each of cyclic times is set at the given rate (1 in a typical example).

When the reference signal comparison type AD conversion system is adopted, with regard to the way of thinking, it is expected that the reference signal generating portion 27 is also provided every AD conversion portion 250. For example, the case is expected where there is adopted a configuration in which a comparator and a reference signal generator are provided every AD conversion portion 250, and a value of the reference signal is successively changed by the reference signal generator in the corresponding column based on the comparison result of the comparator. However, in this case, the circuit scale and the power consumption are both increased. Then, the embodiment adopts a configuration in which the reference signal generating portion 27 is commonly used in all of the AD conversion portions 250, thereby obtaining a configuration in which the reference signal SLP_ADC generated from the reference signal generating portion 27 is commonly used by all of the AD conversion portions 250.

For this reason, the reference signal generating portion 27 includes the Digital Analog Conversion (DAC) portion 270. Thus, the reference signal generating portion 27 generates the reference signal SLP_ADC having a tilt (change rate) represented by control data CN4 synchronously with the count clock $CK_{dacl}$ from an initial value represented by the control data CN4 from the communication/timing controlling portion 20. The count clock $CK_{dacl}$ may be made identical to the count clock $CK_{cntl}$ for counting processing of the counting portion 254. It is only necessary for the reference signal SLP_ADC to have a waveform which is linearly changed with a certain tilt as a whole. Thus, the reference signal SLP_ADC may have a waveform whose change shows a smooth slope-like shape, or may have a waveform which is successively changed on a step-by-step basis.

In carrying out the reference signal comparison type AD conversion, a count enable time period $T_{en}$ (a signal representing this time period is referred to as a count enable signal EN) is determined based on the results of the comparison between the reference signal SLP_ADC and the pixel signal voltage $V_x$ by the comparator 252. Also, the analog processing object signal is converted into the digital data based on the number of clocks of the count clock $CK_{cntl}$ for a time period for which the count enable signal EN is held active. Processing about a reference level (a reset level $S_{rst}$) is referred to as processing for a precharge phase (described as "a P phase" as well for short in some cases). Also, processing about a signal level $S_{sig}$ is referred to as processing for a data phase (described as "a D phase" as well for short in some cases). When the processing for the D phase is executed after the processing for the P phase, the processing for the D phase becomes processing for the signal level $S_{sig}$ obtained by adding the signal component $V_{sig}$ to the reset level $S_{rst}$. With regard to the counting operation enable time period $T_{en}$, there are a first half count system, a second half count system, and a first and second halves count system. In this case, in the first half count system, for each of the P phase and the D phase, the counting is carried out until the comparison result is inversed. In the second half count system, for each of the P phase and the D phase, the counting is carried out after the comparison output has been inversed. Also, in the first and second halves count system, for one of the P phase and the D phase, the counting is carried out until the comparison result is inversed, while for the other, the counting is carried out after the comparison output has been inversed. In addition, in each of these count systems, the count modes of the P phase and the D phase are skillfully combined with each other, or the setting of the initial value in a phase of start of the processing for the P phase is controlled, whereby the CDS processing can also be executed within the column. With regard to how the counting operation enable time period $T_{en}$ is taken, whether or not the differential processing (CDS processing) is executed in the AD conversion portion 250, and so forth, the applicant of this application has proposed variously the reference signal comparison type AD conversion systems. The reference signal comparison type AD conversion systems thus proposed can also be basically adopted in embodiments which will be described later.

In any of the processing examples, in principle, the reference signal SLP_ADC is applied to the voltage comparator, and the analog pixel signal inputted through the vertical signal line 19 is compared with the reference signal SLP_ADC. When the counting operation enable time period $T_{en}$ has been entered, the counting based on the clock signal starts, whereby the number of clocks in the counting operation enable time period $T_{en}$ specified is counted, thereby carrying out the AD conversion.

For carrying out the reference signal comparison type AD conversion, the AD conversion portion 250 in each of the columns in the column portion 26 in the embodiment includes a comparison processing portion 322 (COMP: a voltage comparing portion or a comparator), a counter control signal generating portion 332 (EN generating portion), and a counting processing portion 351. In the column portion 26 in the embodiment, the counting operation time period controlling portion 253 (the counter control signal generating portion 332) is disposed between the comparing portion 252 (the comparison processing portion 322) and the counting portion 254 (the counting processing portion 351). Preferably, a counter (up-down counter) which can switch an up-count mode and a down-count mode over to each other is used as the counting processing portion 351. By using the up-down counters, the high frame rate promotion can be attained without increasing the circuit scale. The comparing portion 252 is configured in the form of a set of the comparison processing portions 322 in the AD conversion portions 250. The counting operation time period controlling portion 253 is configured in the form of a set of the counter control signal generating portion 322 in the AD conversion portions 250. Also, the counting portion 254 is configured in the form of a set of the counting processing portion 352 in the AD conversion portions 250.

The comparing portion 252 (the comparison processing portion 322) compares the analog pixel signal voltage $V_x$ obtained from the unit pixel 3 belonging to the selected row through the vertical signal line 19 (H1, H2, ..., Hn) with the reference signal SLP_ADC generated by the reference signal generating portion 27 (the DA conversion portion 270). The comparison processing portion 322 inverts a comparison pulse $C_0$ (comparator output) when the analog pixel signal voltage $V_x$ agrees with the reference signal SLP_ADC.

The counter control signal generating portion 332 of the counting operation time period controlling portion 253 generates a count enable signal EN based on the comparison output $C_0$ and the control information supplied thereto from the communication/timing controlling portion 20, and supplies the count enable signal EN thus generated to the counting processing portion 351, thereby controlling the counting operation time period of the counting processing portion 351. Here, the feature of this configuration is that column stop signals $CLMSTP_n$ (details thereof will be described later) used to control ON/OFF of the counting operation time period control are inputted to the counter control signal generating portion 332 so as to correspond to the columns, respectively. The counting operation time period controlling function of each non-selection column for which the horizontal transfer of the pixel data is unnecessary is stopped, thereby reducing the power consumption.

A control signal CN5 for instructing whether or the counting processing portion 351 operates for the counting processing for the P phase/the D phase in the up-count mode or in a down-count mode, and other pieces of control information for the setting and resetting processing of the initial value $D_{ini}$ in the counting processing for the P phase, and the like is inputted from the communication/timing controlling portion 20 to the counting processing portion 351 of each of the AD conversion portions 250.

The reference signal SLP_ADC generated by the reference signal processing portion 27 is inputted to one input terminal (+) of the comparison processing portion 322 in common with input terminals (+) of other comparison processing portions 322. The vertical signal lines 19 belonging to the vertical columns, respectively, are connected to the other input terminals (−) of the comparison processing portions 322, respectively, and the pixel signal voltages $V_x$ from the pixel array portions 10 are inputted to the other input terminals (−) of the comparison processing portions 322, respectively. Here, the feature of this configuration is that the column stop signals $CLMSTP_n$ (the details thereof will be described later) each used to control ON/OFF of the comparison operation are inputted to the comparison processing portions 322 so as to correspond to the columns, respectively. The comparison function for each non-selection column for which the horizontal transfer of the pixel data is unnecessary is stopped, thereby reducing the power consumption.

The count clock $CK_{cntl}$ is inputted from the communication/timing controlling portion 20 to a clock terminal CK of the counting processing portion 351 in common with the clock terminals CK of other counting processing portions 351. The counting processing portion 351 has a latch function of holding therein the counting results. Here, the feature of this configuration is that column stop signals $CLMSTP_n$ used to control ON/OFF of the counting operation are inputted to the counting processing portions 351 so as to correspond to the columns, respectively. The counting function of each non-selection column for which the horizontal transfer of the pixel data is unnecessary is stopped, thereby reducing the power consumption.

Although in the embodiment, the basic configuration is adopted in which the CDS processing is executed in (the counting processing portion 351 of) the counting portion 254, the present disclosure is by no means limited thereto. That is to say, the P phase data on the reset level $S_{rst}$, and the D phase data on the signal level $S_{sig}$ may be transferred to the outputting portion 28 side separately from each other, and the CDS processing may be executed in the digital arithmetically operating portion 404 on the subsequent stage of the AD conversion portion 250.

The solid-state imaging device 1 of the embodiment is configured in the form of so-called one chip (provided on the same semiconductor substrate) in which the constituent portions, such as the horizontal transferring portion 11 and the vertical scanning portion 14, of the drive controlling portion 7 are formed in a semiconductor area, for example, made of single crystal silicon integrally with the pixel array portion 10 by using the same technique as the semiconductor integrated circuit manufacturing technique. The solid-state imaging device 1 may adopt a form in which the constituent portions are formed in the semiconductor area integrally with one another into one chip. Or, the solid-state imaging device 1 may also adopt a module-like form which has an imaging function and into which although an illustration is omitted here, in addition to various signal processing portions such as the pixel array portion 10, the drive controlling portion 7, and the column portion 26, optical system portions such as an imaging lens, an optical low-pass filter, and an infrared ray cutting filter are provided, and are all collectively packaged.

An output side of the individual AD conversion portions 250 (specifically, the counting processing portions 351 of the counting portion 254) is connected to the horizontal transferring portion 11. Details of the horizontal transferring portion 11 will be described will be described later. Note that, for the purpose of making so-called pipeline horizontal transfer possible, it is possible to adopt a configuration including a data memory portion as a memory device including a latch for holding therein the counting results held in the counting processing portion 351 in a subsequent stage of the counting processing portion 351. The latch holds and stores therein the counting data outputted from the counting processing portion 351 at a determined timing. The pipeline horizontal transfer means processing for executing the column processing (such as the AD conversion and the CDS processing) in the AD conversion portion 250, and the horizontal transfer of the pixel data in parallel with each other.

[Input Stage of Comparing Portion]

Figure 2:
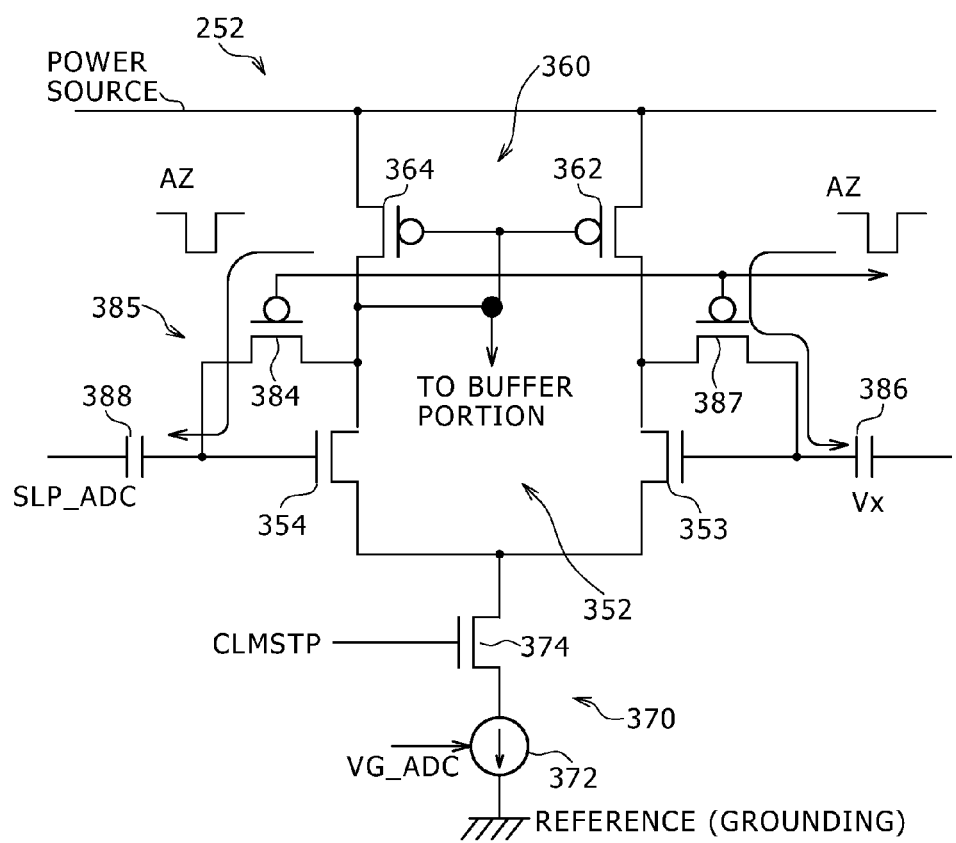
FIG. 2 is a circuit diagram showing a configuration and an operation of an input stage of a comparing portion shown in FIG. 1.

FIG. 2 is a circuit diagram explaining a configuration and an operation of an input stage of the comparing portion 252. The comparing portion 252 has the feature that by devising the circuit configuration, a comparison time period is enabled to be set irrespective of a dispersion of a reset component ΔV for each unit pixel 3.

The comparing portion 252 adopts a differential amplifier configuration which is generally well known in terms of a basic configuration. The comparing portion 252 includes a differential transistor pair portion 352, a load transistor pair portion 360, and a current source portion 370. Moreover, the feature of this configuration is that the comparing portion 252 includes an operating point resetting portion 380 as well. The differential transistor pair portion 352 includes NMOS type transistors 353 and 354, and source terminals of the NMOS type transistors 353 and 354 are connected to each other. An output terminal (a drain terminal of the transistor 354 in the case of FIG. 2) of the differential transistor pair portion 352 is connected to a buffer portion (any of a non-inversion type or an inversion type may be valid) having an amplifier function (not shown). Thus, after the sufficient amplification has been carried out for an output signal from the differential transistor pair portion 352, the output signal from the differential transistor pair portion 352 is outputted as the comparison pulse $C_0$.

In the load transistor pair portion 360, PMOS type transistors 362 and 364 which are connected so as to become an active load of the differential transistor pair portion 352 are disposed on a power source side. Specifically, drain terminals of the transistors 353 and 362 are connected to each other. In addition, drain terminals of the transistors 354 and 364 are connected to gate terminals of the transistors 362 and 364.

The current source portion 370 supplies a given operating current to each of the differential transistor pair portion 352 and the load transistor pair portion 360, and has a constant current source 372 disposed on the grounding (GND) side. In addition, the feature of this configuration is to include a configuration in which "an operating current caused to flow through the comparison processing portion 322 belonging to each non-selection column not requiring the pixel signal is reduced." Basically, it is possible to adopt the same configuration as that of the current source 240 in the operating current supplying portion 24 which will be described later. For example, as shown in FIGS. 1 and 2, the current source 240 in each of the columns of the operating current supplying portion 24 includes an NMOS type switch transistor 374 on the current path of the constant current source 372 (between the constant current source 372, and the source terminals of the transistors 353 and 354 in the case of FIG. 2). A DC gate voltage VG_ADC is inputted to a control input terminal of the constant current source 372 in common with the columns. The column stop signals $CLMSTP_n$ used to control ON/OFF of the transistor 374 are inputted to gate terminals of the switch transistors 374 so as to correspond to the columns, respectively. The column stop signals $CLMSTP_n$ inputted to the switch transistor 374 belonging to each non-selection column for which the horizontal transfer of the pixel data is unnecessary becomes an L level to turn OFF the switch transistor 374, which results in that the function of the comparing portion 252 is stopped, thereby reducing the power consumption.

The operating point resetting portion 380 includes PMOS type switch transistors 382 and 384. An automatic zero signal AZ is supplied as a comparator resetting signal commonly to each of gate terminals of the PMOS type switch transistors 382 and 384. A timing at which the automatic zero signal AZ becomes active (the L level in this case) falls within a time period for which the pixel signal voltage $V_x$ after a reset signal RST supplied to the gate terminal of the reset transistor of the unit pixel 3 is changed from the active state to the inactive state becomes the reset level $S_{rst}$. Or, this timing falls within a time period for which the reset signal RST supplied to the gate terminal of the reset transistor 36 of the unit pixel 3 is held active. For such time periods, the reference signal SLP_ADC is at a reset level which is slightly lower than the initial value as a level at which the reference signal SLP_ADC starts to be changed to a ramp shape.

The pixel signal $V_x$ is supplied to the gate terminal (input terminal) of the transistor 353 through a capacitive element 386. Also, the reference signal SLP_ADC is supplied from the reference signal generating portion 27 (not shown in FIG. 2) to the gate terminal (input terminal) of the transistor 354 through a capacitive element 388. The operating point resetting portion 380 exhibits a sample and hold function for the signals inputted thereto through the capacitive elements 386 and 388. That is to say, only right before the comparison between the pixel signal $V_x$ and the reference signal SLP_ADC starts, the automatic zero signal AZ is made at the active L level, and the operating point of the differential transistor pair portion 352 is reset at a drain voltage (an operation reference value with which the reference component or the signal component is read out). After that, the pixel signal $V_x$ is inputted to the transistor 353 through the capacitive element 386, and the reference signal SLP_ADC is inputted to the transistor 354 through the capacitive element 388. Thus, the comparison processing is continuously executed until the pixel signal $V_x$ and the reference signal SLP_ADC becomes the same electric potential. When the pixel signal $V_x$ and the reference signal SLP_ADC becomes the same electric potential, the output signal is inverted. At the outset of start of the comparison processing, the reference signal SLP_ADC is higher than the pixel signal $V_x$ and, for example, the output signal (the comparison pulse $C_0$) from the comparing portion 252 is at the L level. After that, when the pixel signal $V_x$ and the reference signal SLP_ADC are at the same electric potential, the output signal from the comparing portion 252 is inverted from the L level to the H level. The comparison pulse $C_0$ is supplied to the counting operation time period controlling portion 253 (not shown).

A reset signal RST (held at the active state) is supplied to the gate terminal of the reset transistor of the unit pixel 3 to reset the reset transistor. At this time, for a time period for which the reset signal RST is held in the active state, a noise pulse having a relatively large voltage level is generated in the pixel signal voltage $V_x$. After that, when the reset signal RST is changed from the active state to the inactive state, the pixel signal voltage $V_x$ settles to the reset level $S_{rst}$. The level of the noise pulse in the reset active phase, and the subsequent reset level $S_{rst}$ disperse every circuit pixel 3. The signal level $S_{sig}$ corresponding to the signal electric charges detected in the electric charge generating portion is superimposed on the reset level $S_{rst}$, and thus the pixel signal voltage $V_x$ appears as the signal level $S_{sig}$. Therefore, when the reset level $S_{rst}$ disperses, the signal level $S_{sig}$ disperses accordingly. At this time, an influence of the dispersion does not exist in the signal level $S_{sig}$ itself. In the CDS processing, in view of this point, the difference between the reset level $S_{rst}$ and the signal level $S_{sig}$ is obtained, thereby acquiring the signal level $S_{sig}$ free from the influence of the dispersion.

When the reset level $S_{rst}$ has the dispersion, and thus exceeds the comparable range of the reference signal SLP_ADC, there may be caused the possibility that it may be impossible to execute the proper comparison processing. In order to avoid this situation, in the phase of the processing of the P phase, the voltage comparing portion 252 is reset at an operation reference value with which the reset level $S_{rst}$ is read out. After that, after the reference signal SLP_ADC has been supplied to the comparing portion 252, both of the comparing processing and the counting processing start to be executed. That is to say, in the comparing portion 252, the automatic zero signal AZ is supplied to temporarily connect the gate terminal and the drain terminal of the transistors 303 and 304 of the differential transistor pair portion 302 to each other, thereby configuring diode connection. Also, after an electric potential obtained by adding the offset component of the transistor 304 to the electric potential at the input terminal of the amplifying transistor 42 of the unit pixel 3 has been held at the input terminal (gate terminal) of the transistor 304, the reference signal SLP_ADC is inputted, thereby starting to compare the pixel signal $V_x$ with the reference signal SLP_ADC. As a result, since the operating point of the voltage comparing portion 252 is set with the read-out electric potential of the pixel signal $V_x$, the operating point becomes hard to receive the influence of the reset level $S_{rst}$. However, when the comparing portion 252 is reset at the operation reference values, generation of a kTC noise is feared. Therefore, in the phase of the processing of the D phase, the reset is not carried out for the comparing portion 252 (the automatic zero setting is not carried out), and the reference signal SLP_ADC is immediately supplied to the comparing portion 252, thereby starting to execute both of the comparing processing and the counting processing.

[Basic Operation of Solid-State Imaging Device]

Figure 3:
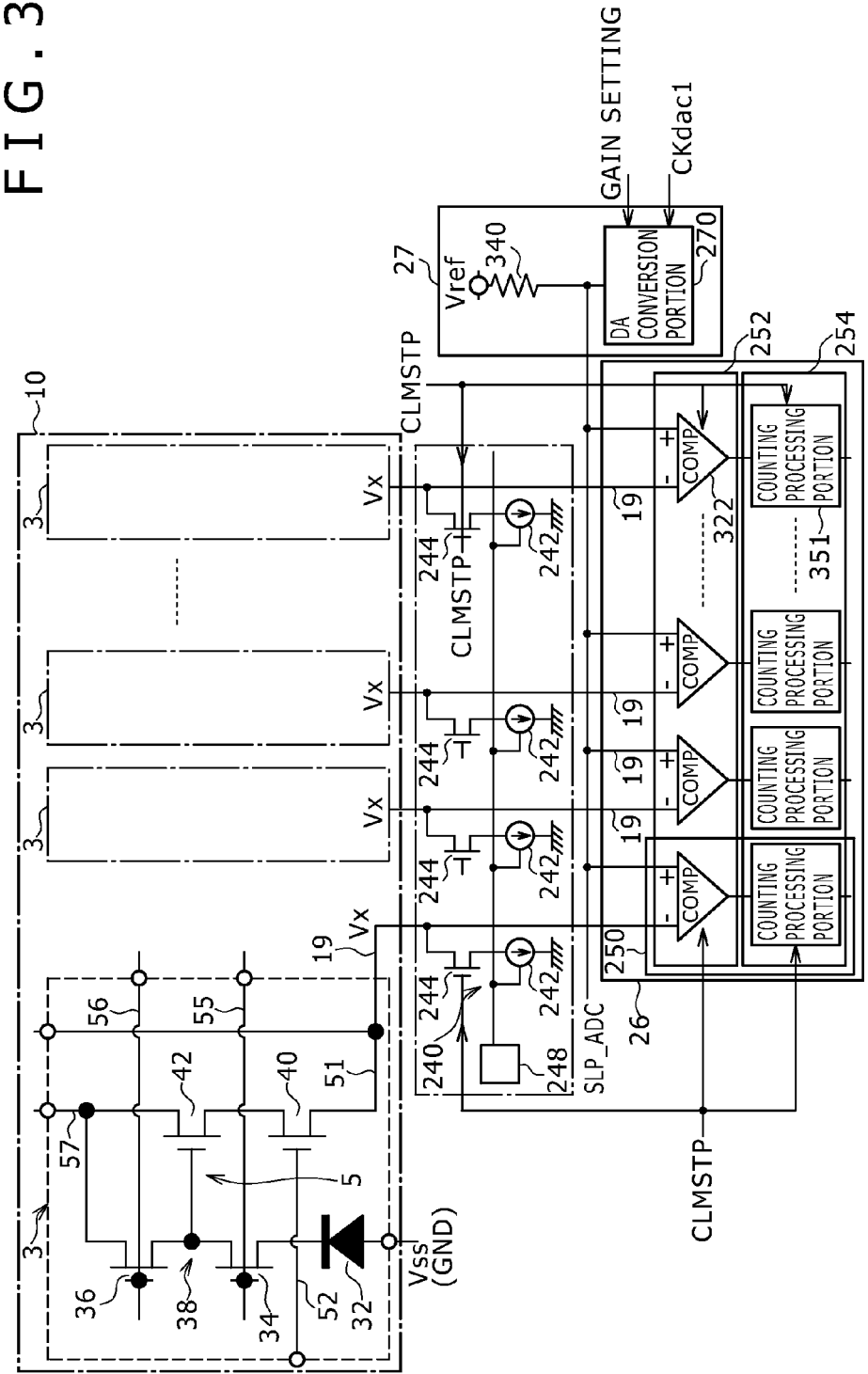
FIG. 3 is a simple circuit diagram showing a solid-state imaging device in which attention is paid to AD conversion processing and CDS processing.

FIG. 3 is a circuit diagram showing a simplified circuit configuration, of the solid-state imaging device 1, in which attention is paid to both of the AD conversion processing and the CDS processing. The counting operation time period controlling portion 253 is omitted here.

The unit pixel 3 includes four transistors: a transistor 34 for read and selection; a reset transistor 36; a transistor 40 for vertical selection; and an amplifying transistor 42 as basic elements composing the pixel signal generating portion 5 in addition to the electric charge generating portion 32. The transistor 34 for read and selection composing a transferring portion is driven by using a transfer signal TRG. The reset transistor 36 composing an initializing portion is driven by using the reset signal RST. Also, the transistor 40 for vertical selection is driven by using the vertical selection signal VSEL.

The electric charge generating portion 32 is an example of the detecting portion composed of a light receiving element such as a photodiode. In the electric charge generating portion 32, an anode terminal of the light receiving element is connected to a reference electric potential $V_{ss}$ on a low electric potential side, and a cathode terminal side thereof is connected to a source terminal of the transistor 34 for read and selection. The reference electric potential $V_{ss}$ may be made the grounding electric potential GND. In the transistor 34 for read and selection (transfer gate), a drain terminal is connected to a connection node to which the reset transistor 36, a floating diffusion 38, and the amplifying transistor 42 are all connected. In the reset transistor 36, a source terminal and a drain terminal are connected to the floating diffusion 38, and a reset power source $V_{rd}$ (normally, made common to the power source $V_{dd}$), respectively.

In the transistor 40 for vertical selection, as an example, a drain terminal and a source terminal are connected to a source terminal of the amplifying transistor 42 and a pixel line 51, respectively. Also, a gate terminal (especially referred to as "a vertical selection gate SELV" is connected to a vertical selection line 52. In the amplifying transistor 42, a gate terminal is connected to the floating diffusion 38, a drain terminal is connected to the power source $V_{dd}$, and a source terminal is connected to the pixel line 51 through the transistor 40 for vertical selection. In addition, the pixel line 51 is connected to the vertical signal line 19. As another connection example, in the transistor 40 for vertical selection, the drain terminal may be connected to the power source $V_{dd}$, the source terminal may be connected to the drain terminal of the amplifying transistor 42, and the source terminal of the amplifying transistor 42 may be connected to the pixel line 51.

One end of the vertical line 19 extends to the column portion 26 side, and the operation current supplying portion 24 is connected to the extension path. The current source 240 in each of the columns of the operating current supplying portion 24 includes the load MOS transistor with respect to the vertical column. Also, the gate terminals are connected between the reference current source portion 248 used commonly in the columns, and the load MOS transistor to configure a current mirror circuit which in turn functions as a constant current source 242 with respect to the vertical signal line 19. Also, there is adopted a source follower configuration with which an approximately constant operating current (read current) is supplied to the amplifying transistor 42.

In addition, the feature of this configuration is to include a configuration with which "the current caused to flow through the vertical signal line 19 belonging to each non-selection column not requiring the pixel signal is reduced." A mechanism for inhibiting the pixel current in the column not requiring the pixel signal from being caused to flow may be provided between the load MOS transistor serving as the current source, and the vertical signal line 19. The power consumption can be reduced all the more because this configuration enables the function for reading out the pixel current in the column not requiring the pixel signal to be inhibited from being perfectly fulfilled. With regard to "the mechanism for inhibiting the pixel current in the column not requiring the pixel signal from being caused to flow," for example, it is only necessary to provide a switch section for switching ON/OFF of the current path (switching a conduction state and a non-conduction state over to each other) such as provision of a switch, such as a transistor, made from a semiconductor.

Or, the operating current supplying portion 24 may direct control the load MOS transistor serving as the current source connected to the vertical signal line 19 belonging to each non-selection column not requiring the pixel signal, thereby reducing an amount of current as a configuration with which "the current caused to flow through the vertical signal line 19 belonging to each non-selection column not requiring the pixel signal is reduced." Even with this configuration, the power consumption can be reduced all the more because this configuration enables the function for reading out the pixel signal in each column not requiring the pixel signal to be inhibited from being fulfilled.

When "an amount of current is reduced" with respect to each column not requiring the pixel signal, it is only necessary to make the current concerned smaller than the load current in the phase of the normal reading. Thus, the active state of the load MOS transistor as the current source may be maintained, thereby causing the small current to flow, or the load MOS transistor itself as the current source may be made to become perfectly an OFF state (non-conduction state), thereby providing a state in which the current is inhibited from being perfectly caused to flow. By the way, when the state is provided in which the current is inhibited from being caused to flow through the vertical signal line 19 belonging to each column not requiring the pixel signal, it is feared that the electric potential of the vertical signal line 19 belonging to each column concerned becomes an unstable state and thus the system becomes unstable in some cases. For solving this problem, it is only necessary to provide a configuration with which the vertical signal line 19 belonging to each column free from the reading is fixed to a certain electric potential so as to correspond to the provision of the state in which the current is inhibited from being caused to flow through the vertical signal line 19 belonging to each column not requiring the pixel signal.

For example, the configuration shown in FIG. 3 includes an NMOS type switch transistor 244 on the current path of the constant current source 242 (between the constant current source 242 and the vertical signal line 19 in the case of FIG. 3). The column stop signals $CLMSTP_n$ used to control ON/OFF of the switch transistors 244 are inputted to the gate terminals of the switch transistors 244 so as to correspond to the columns, respectively. The column stop signals CLM-STP$_n$ inputted to the switch transistor 244 belonging to each non-selection column for which the horizontal transfer of the pixel data is unnecessary becomes the L level to turn OFF the switch transistor 244, which results in that the read current supplying function is stopped. The load MOS transistor itself serving as the current source is perfectly made to be the OFF state (non-conduction state), thereby reducing the power consumption.

The reference signal generating portion 27 includes a DA conversion portion 270 and a resistive portion 340. Although not illustrated, the DA conversion portion 270 includes current source portion configured in the form of a combination of constant current sources, a counter portion, an offset generating portion, a current source controlling portion, and a reference current source portion for setting a specified current I_0, and thus becomes a current output type DA conversion circuit. The resistive portion 340 having a resistive value R_340 is connected as a current-to-voltage converting portion to a current output terminal of the current source portion. The current-to-voltage converting portion is composed of a current source portion, a current source controlling portion, and the resistive portion 340. Also, a voltage generated at a connection point between the current source portion and the resistive portion 340 is utilized as a reference signal SLP_ADC.

The vertical signal lines 19 of the columns are connected to one terminals (inverting input terminals in this case) of the comparison processing portion 322, respectively. As a result, the pixel signal voltages V$_x$ are supplied to the AD conversion portions 250 of the column portion 26 through the vertical signal lines 19, respectively. In the AD conversion portion 250, the pixel signal voltage V$_x$ read out from the unit pixel 3 to the vertical signal line 19 is compared with the reference signal SLP_ADC in the comparison processing portion 322 of the AD conversion portion 250. Also, the counter control signal generating portion 332 (not shown) causes the counting processing portion 351 to operate based on the current enable signal EN, and changes the reference signal electric potential while it shows one-to-one correspondence to the counter operation, thereby converting the pixel signal voltage V$_x$ of the vertical signal line 19 into the digital data.

3. Imaging Apparatus

Figure 4:
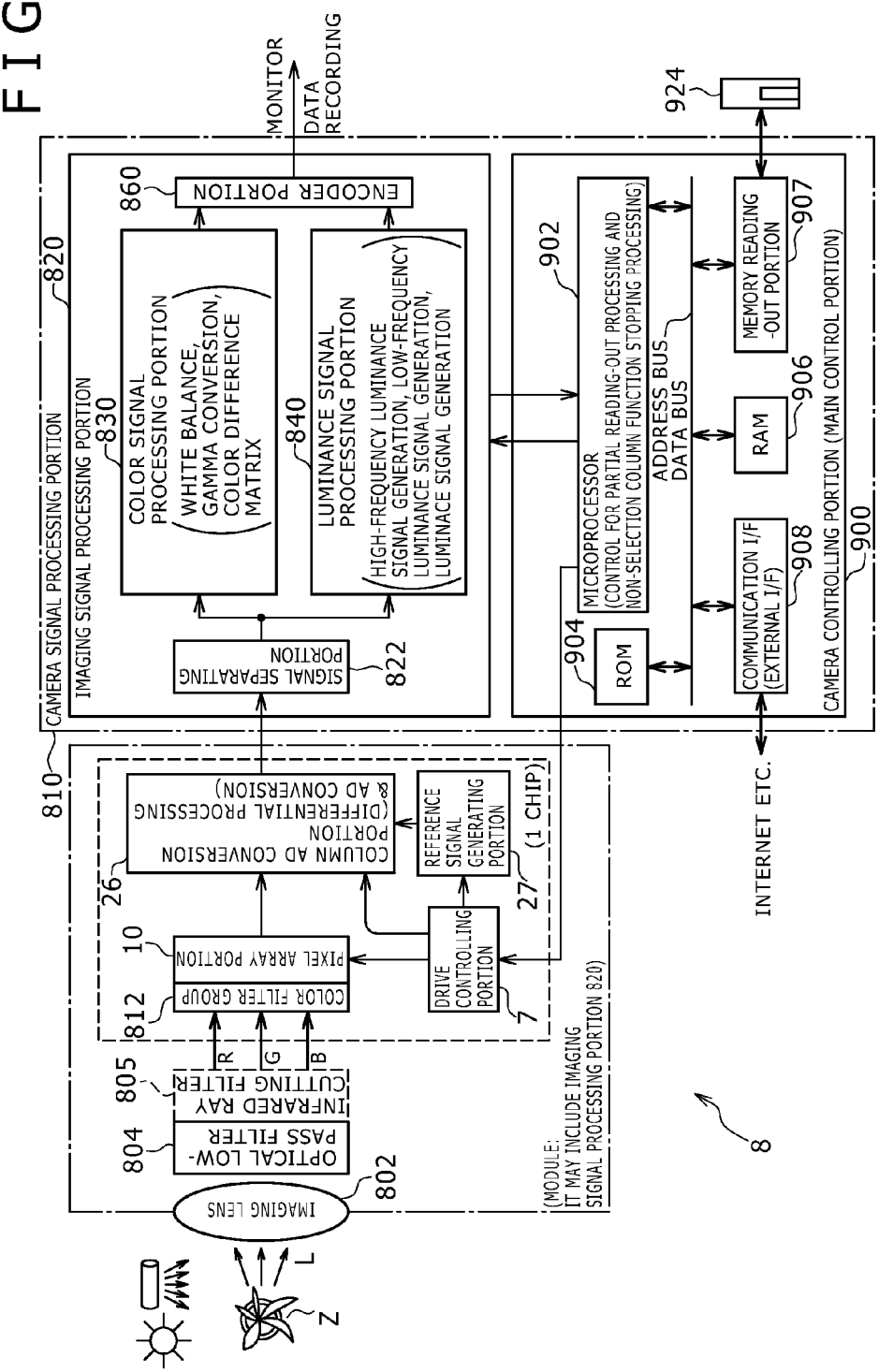
FIG. 4 is a block diagram showing a schematic configuration of an imaging apparatus according to another embodiment of the present disclosure using the solid-state imaging device shown in FIG. 1.

FIG. 4 is a block diagram showing a schematic configuration of an imaging apparatus according to another embodiment of the present disclosure using the solid-state imaging device 1 according to the embodiment of the present disclosure. This is an embodiment in which both of the AD conversion processing, and the horizontal transferring processing for the pixel data which are adopted in the solid-state imaging device 1 described above are applied to the imaging apparatus as an example of the physical information acquiring apparatus. Main constituent elements will be described as follows (a description of any of constituent elements other than the main constituent elements is omitted here).

The imaging apparatus 8 includes an imaging lens 802, an optical low-pass filter 804, a color filter group 812, the pixel array portion 10, the drive controlling portion 7, the column portion 26, the reference signal generating portion 27, and a camera signal processing portion 810. As indicated by a broken line in FIG. 4, an infrared ray cutting filter 805 for reducing an infrared ray component can also be provided in combination with the optical low-pass filter 804. A column signal processing portion 810 provided in a subsequent stage of the column portion 26 includes an imaging processing portion 820, and a camera controlling portion 900 functioning as a main control portion for controlling the entire imaging apparatus 8. The imaging processing portion 820 includes a signal separating portion 822, a color signal processing portion 830, a luminance signal processing portion 840, and an encoder portion 860.

The camera controlling portion 900 includes a microprocessor 902, a Read Only Memory (ROM) 904 as a read only memory portion, a Random Access Memory (RAM) 906, and other peripheral members (not shown). The microprocessor 902 is similar to a portion serving as a nerve center of an electronic computer typified by a Central Processing Unit (CPU) in which functions of arithmetic operations and control made by the computer are aggregated into an ultra-minute integrated circuit. The RAM 906 is an example of a volatile memory portion in/from which writing and reading are possible at any time. The microprocessor 902, the ROM 904, and the RAM 906 are collectively referred to as a microcomputer as well.

The camera controlling portion 900 controls the entire system, and has a function of adjusting frequencies of the count clocks CK$_{cntl}$ and CK$_{dacl}$, the tilt of the reference signal SLP_ADC, and the like. A control program of the camera controlling portion 900, and the like are stored in the ROM 904. In particular, in this case, a program for controlling reference signal comparison type AD conversion processing, horizontal partial reading-out processing, and processing for stopping the function of each non-selection column is stored in the ROM 904 by the camera controlling portion 900. Data with which the camera controlling portion 900 executes various pieces of processing, and the like are stored in the RAM 906. The camera controlling portion 900 is configured in such a way that a recording media 924 such as a memory card is detachable, and is also configured in such a way that connection to a communication network such as the Internet is possible. For example, the camera controlling portion 900 includes a memory reading-out portion 907 and a communication interface (I/F) 908 in addition to the microprocessor 902, the ROM 904, and the RAM 906.

The recording media 924, for example, is utilized to register program data used to cause the microprocessor 902 to execute the software processing, and a convergence range and exposure control processing (including electronic shutter control) for measured light data DL based on a luminance system signal from the luminance processing portion 840. In particular, in the embodiment, the recording media 924 is also utilized to register various pieces of data such as set values of various pieces of control information used to execute the horizontal partial reading-out processing and the processing for stopping the function of each non-selection column. The memory reading-out portion 907 stores (installs) the data read out from the recording media 924 in the RAM 906. The communication I/F 908 mediates delivery of communication data with the communication network such as the Internet.

In the imaging apparatus 8, both of the data controlling portion 7 and the column portion 26 are shown in the form of a module separately from the pixel array portion 10. However, one chip may also be utilized in which the data controlling portion 7 and the column portion 26 are formed together with the pixel array portion 10 on the same semiconductor substrate integrally with one another. FIG. 4 shows the imaging apparatus 8 in a state of including the optical system composed of the imaging lens 802, the optical low-pass filter 804, the infrared ray cutting filter 805, and the like in addition to the pixel array portion 10, the drive controlling portion 7, the column portion 26, the reference signal generating portion 27, and the camera signal processing portion 810. This embodiment is suitable when these constituent portions are collectively packed into the module having the imaging function. Such an imaging apparatus 8, for example, is provided as a camera or an electronic apparatus, such as a portable apparatus, having the imaging function for carrying out "the imaging." "The imaging" contains not only the image shooting in the phase of the normal camera photographing, but also in a broad sense, the fingerprint detection, or the acquiring of image information by utilizing a pressure as a physical amount distribution in the physical amount distribution detecting semiconductor device such as a touch panel, or the physical information acquiring apparatus (physical amount distribution detecting apparatus).

In the imaging apparatus 8 as well having such a configuration, by applying the horizontal partial reading-out processing and the processing for stopping the function of each non-selection column which will be described later, it is possible to reduce the entire power consumption and it is possible to skip the signals corresponding to the unit elements each not required in the phase of the element selection mode.

4. Horizontal Skipping Processing

Hereinafter, a description will be given with respect to concrete examples of the horizontal partial reading-out processing (horizontal skipping processing) and a technique related thereto. By the way, Examples 1 to 3 are application examples of the horizontal cutting-out processing in a cutting-out mode, and Examples 5 and 6 are application examples of the horizontal thinning-out processing in a thinning-out mode. Although the description will be given below in the case where the thinning-out reading processing in the row direction for skipping the pixel rows with a given cycle, and reading-out the signals from the pixels belonging to the remaining pixel rows, and the cutting-out processing in the row direction are used together with each other, this is not essential to the present disclosure.

Figure 5A:
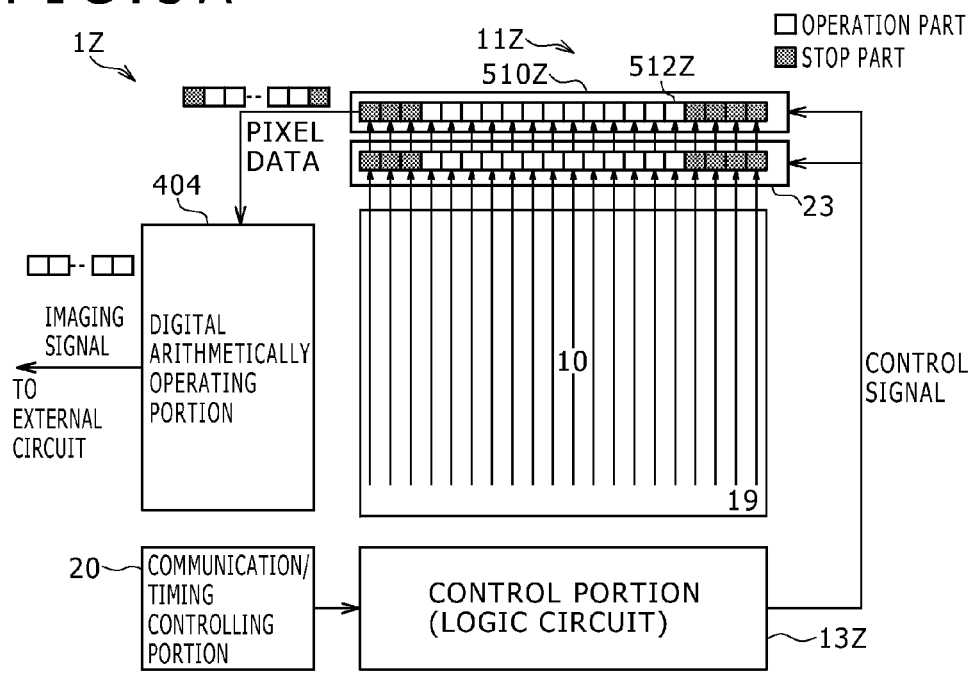
FIGS. 5A and 5B are respectively block diagrams explaining a basic concept of horizontal skipping processing in Comparative Example 1 and Example 1.
Figure 5B:
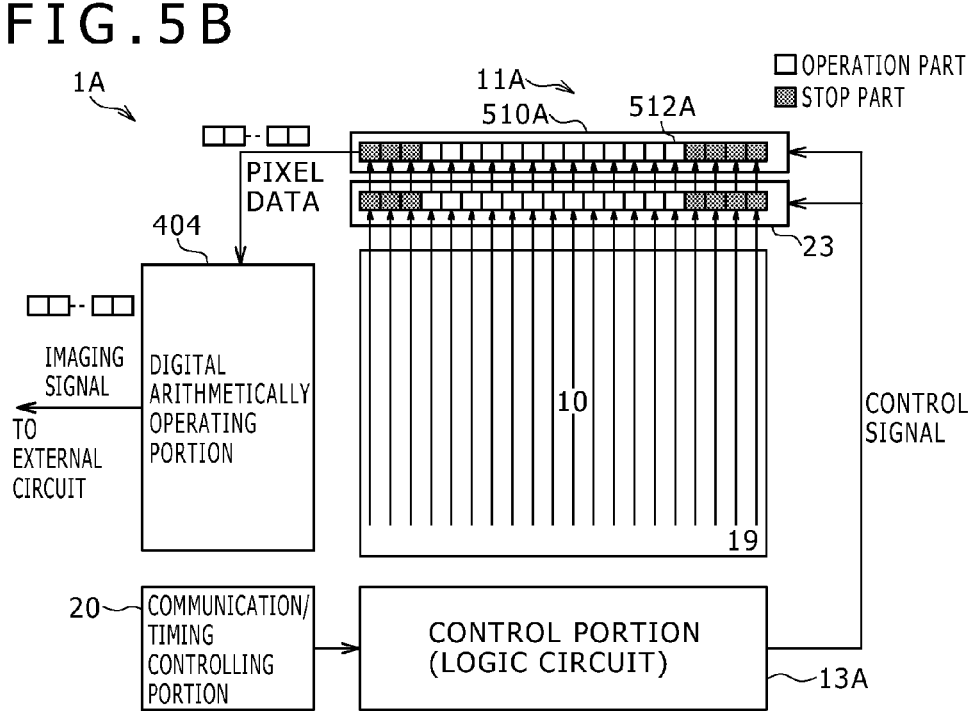

FIGS. 5A and 5B are respectively block diagrams explaining a basic concept of the horizontal skipping processing according to still another embodiment of the present disclosure. Specifically, FIG. 5A is a block diagram explaining the horizontal skipping processing of Comparative Example which is contrasted with Example, and FIG. 5B is a block diagram explaining the horizontal skipping processing of Example.

The horizontal skipping processing in Example 1 is an application example of the horizontal cutting-out processing when the horizontal transferring portion 11 includes a shift register, and pixel data (read-out signal) is successively shifted to the subsequent stage whenever a clock for horizontal transfer is inputted, thereby carrying out the horizontal reading (horizontal transfer) of the pixel data.

In a solid-state imaging device 1Z of Comparative Example shown in FIG. 5A, a horizontal transferring portion 11Z includes a shift register 510Z (an example of the transferring portion) in which registers 512Z (each being an example of the memory portion) are cascade-connected to one another in a given direction. The shift register 510Z is used for the horizontal transfer itself of the data, and the read-out signal (pixel data) is successively shifted to the subsequent stage whenever the clock for the horizontal transfer is inputted. The shift register 510Z holds the pixel data (an example of the read-out signals) processed in the AD conversion portions 250 corresponding to the pixel signals outputted from the unit pixels 3, respectively, in the registers 512Z, respectively, and successively transfers the pixel data held in the registers 512Z to the subsequent stages. The solid-state imaging device 1Z includes a horizontal transfer controlling portion 13Z for generating various control signals used to control the shift registers 510Z. The horizontal transfer controlling portion 13Z is composed of a gate circuit and other logic circuits. The solid-state imaging device 1Z reads out all of the pixel data acquired in the AD conversion portions 250 of the respective columns in the horizontal direction, including the pixel data of the unnecessary columns (referred to as "the non-selection columns") out of the cutting-out range (referred to as "the horizontal transfer" as well), and abandons the unnecessary pixel data of each non-selection column in a data processing block (a signal processing portion: for example, a digital arithmetically operating portion 404 of the outputting portion 28) in the subsequent stage through the outputting portion 28. In this case, the power consumption consumed in both of the current sources 240 and the AD conversion portions 250 belonging to each non-selection column becomes equal to that in the phase of the all-pixel reading, and thus there is no merit in terms of the power consumption. In addition, a time required for the horizontal transfer for each non-selection column becomes equal to that in the phase of the all-pixel reading, and thus there is no merit in terms of the high speed operation as well.

On the other hand, in a solid-state imaging device 1A of Example shown in FIG. 5B, a horizontal transferring portion 11A includes a shift register 510 (an example of the transferring portion) in which registers 512A (each being an example of the memory portion) are cascade-connected in a given direction. The shift register 510A is used for the horizontal transfer itself of the data, and the read-out signal (pixel data) is successively shifted to the subsequent stage whenever the clock for the horizontal transfer is inputted. The shift register 510A holds the pixel data (an example of read-out signal) processed in the AD conversion portions 250 corresponding to the pixel signals outputted from the unit pixels 3 in the registers 512A, respectively, and successively transfers the pixel data held in the registers 512A to the subsequent stages. The solid-state imaging device 1A includes a horizontal transfer controlling portion 13A for generating various control signals used to control the shift register 510A. The horizontal transfer controlling portion 13A is also composed of a gate circuit and other logic circuits. Although the configuration itself of the solid-state imaging device 1A appears to be the same as that of the solid-state imaging device 1Z of Comparative Example, the configuration itself of the solid-state imaging device 1A is different from that of the solid-state imaging device 1Z of Comparative Example in detailed configurations and operations of the constituent functional portions. That is to say, in the solid-state imaging device 1A of Example, of the data acquired in the AD conversion portions 250 of the respective columns, the data for each non-selection column is not horizontally transferred, but only the data for the necessary columns (referred to as "the selection columns") in the cutting-out range. We shall refer such selective horizontal data reading-out (transferring) processing as horizontal skipping processing (for each non-selection column). As a result, it is possible to reduce the electric power required for the horizontal transfer for each non-selection column (it is possible to realize the low power consumption), and it is possible to reduce the time required for the horizontal transfer for each non-selection column. Therefore, it is also possible to realize the speeding up of the horizontal transfer.

At this time, preferably, the function concerned is controlled in such a way that each non-selection column of the operating current supplying portion 24 (the current source 240) and the column portion 26 (the AD conversion portion 250) becomes the low power consumption state. We shall refer this state as that each non-selection column is caused to be a standby state. As a result, it is possible to reduce the electric power required for the operations of the operating current supplying portion 24 and the AD conversion portion 250 of each non-selection column. With regard to the additional effect, since a thermocurrent (dark current) due to power consumption heating is suppressed, the noise in the phase of the pixel data transfer and the data transfer is reduced. In addition, since it is possible to shorten the time required for the horizontal transfer for each selection column by the horizontal skipping of each non-selection column, the speeding up of the horizontal partial reading-out processing becomes possible. At this time, in the allowable case (details will be described later), one horizontal time period is shortened, thereby making the speeding up of the entire processing possible.

Preferably, although it is better to control the function concerned in such a way that the low power consumption state is obtained with each non-selection column of both of the current source 240 and the AD conversion portion 250 as an object, the present disclosure is by no means limited thereto. However, each non-selection column of at least the AD conversion portion 250 is made an object depending on the configuration, and more preferably, each non-selection column of the current source 240 is also made an object. More specifically, preferably, although it is better to control all of the functions of the current source 240 of each non-selection column of the operating current supplying portion 24, and the functional portions of the AD conversion portion 250 (the comparison processing portion 322, the counter control signal generating portion 332, and the counting processing portion 351) of each non-selection column of the column portion 26, this is not essential to the present disclosure. With regard to the AD conversion portion 250, the function concerned may be controlled in such a way that at least any one of the functional portions composing the AD conversion portion 250 becomes the low power consumption state.

In "controlling the function concerned," any system may be adopted as long as the system has the form allowing the low power consumption state to be provided. Also, the function concerned may be controlled in such a way that the low power consumption state is provided with the electric power from the power source being supplied. Or, the functional portion having a connection with the current source as with the current source 240 or the like may adopt a system with which the current of the current source is reduced. Or, the function concerned may also be controlled by stopping the supply itself of the electric power from the power source. For "controlling the function concerned with the electric power from the power source being supplied," the measures to meet the circuit configuration are taken. An example thereof will be described later. In "stopping the supply of the electric power from the power source," preferably, it is better to take measures for preventing an evil influence from being exerted either on the output stage of the circuit in the preceding stage connected to the input side of each of the functional portions or on the input stage of the circuit in the subsequent stage connected to the output side thereof. The effect of reducing the power consumption is higher in "the stop of the supply of the electric power from the power source" than in "the control of the function concerned with the electric power from the power source being supplied." For example, if the increasing circuit scale is permitted, a power switch is located on the columns skipped, thereby making it possible to more reduce the power consumption.

Operation Stopping Control for Each Non-Selection Column

First Example

Figure 6:
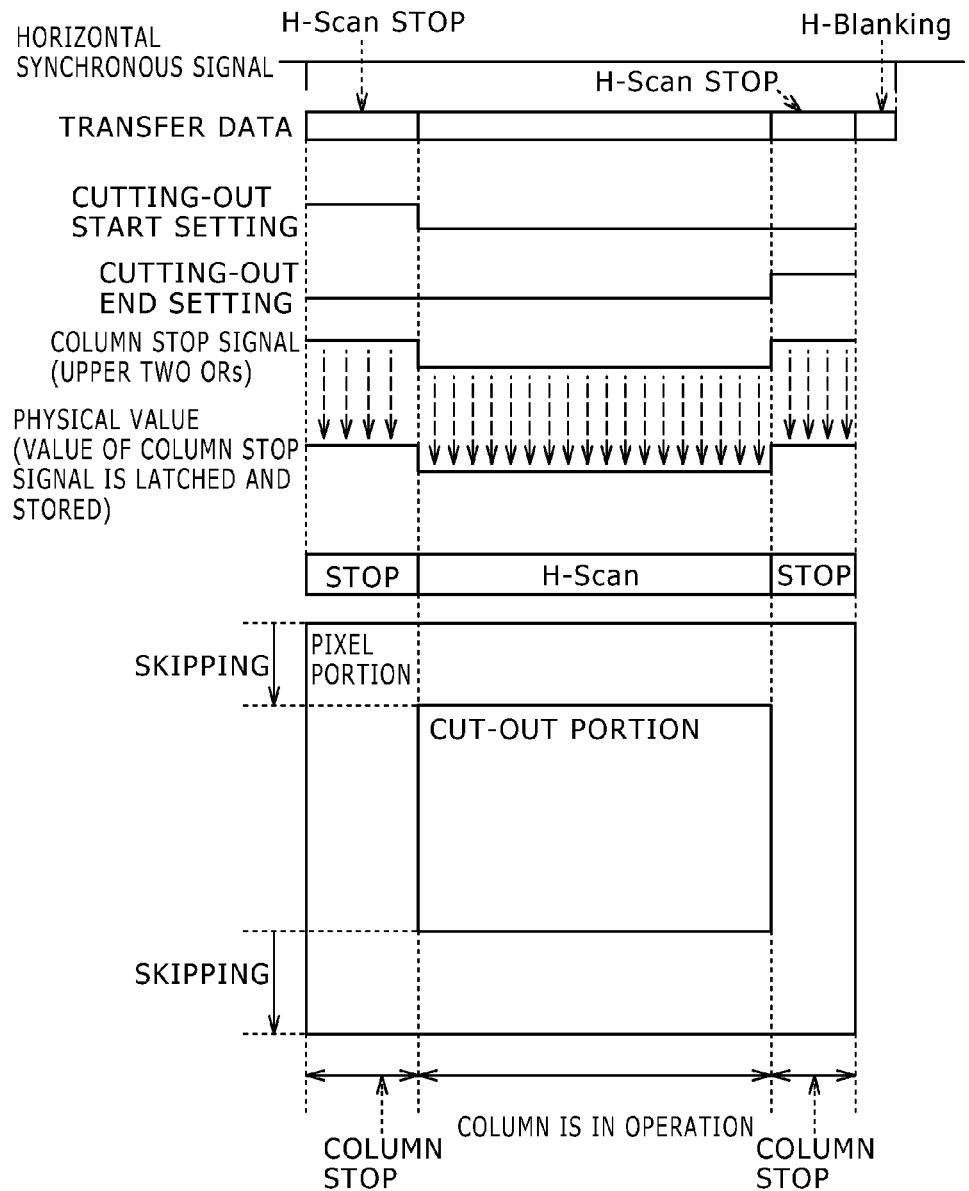
FIG. 6 is a diagram explaining a first example of a column stopping function and is also a timing chart at a horizontal scanning rate and an image diagram showing the column stopping function.
Figure 7:
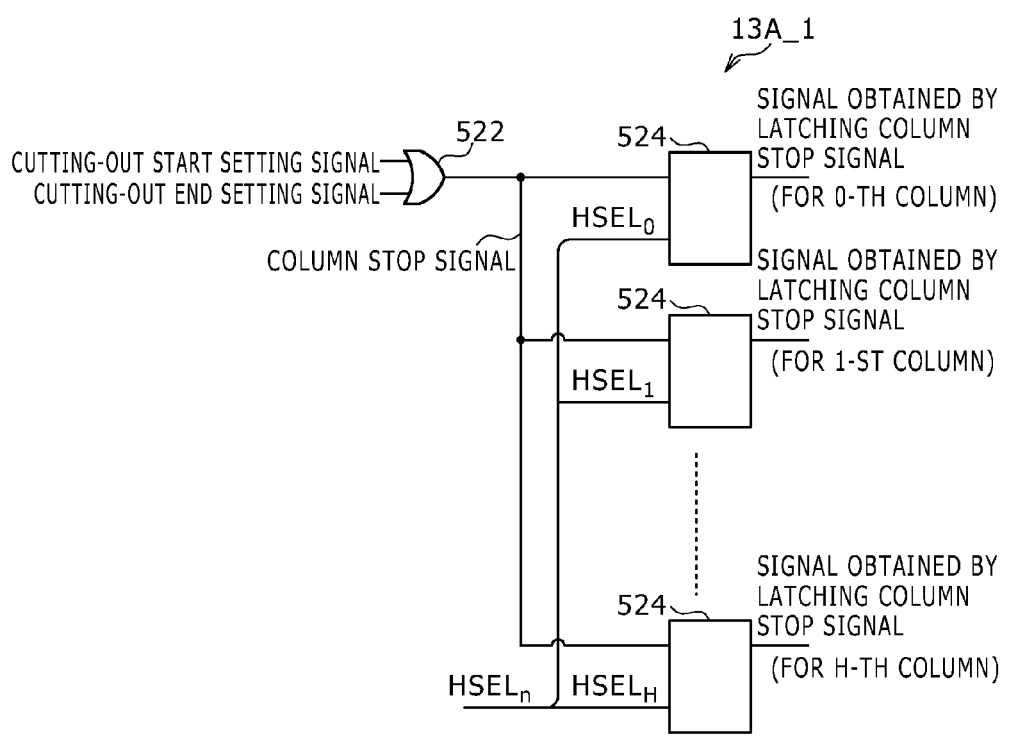
FIG. 7 is a block diagram, partly in circuit, explaining a technique for generating a column stopping signal in the first example of the column stopping function.

FIGS. 6 and 7 are respectively diagrams explaining a first example of a function (column stopping function) of stopping the column circuit of each non-selection column in the phase of the horizontal cutting-out. Here, FIG. 6 is a timing chart at a horizontal scanning rate and an image diagram showing the column stopping function. Specifically, an image diagram of timing charts of a horizontal synchronous signal, timings of the cutting-out start and cutting-out end of the transfer data, a column stop signal, and corresponding pixel cut-out portion is shown in FIG. 6. Also, FIG. 7 is a block diagram, partly in circuit, explaining a technique for generating the column stop signal in the first example of the column stopping function.

The feature of the column stopping function of the first example is that each of control signals representing a start position and an end position of the cut-out portion are represented in the form of an L/H logic. By the way, "L" represents a low level, and "H" represents a high level. The description will be continuously given with reference to the configuration as well of the solid-state imaging device 1A of Example shown in FIG. 5B. A control signal used to stop the column circuit in each non-selection column in the phase of the horizontal cutting-out is generated in a horizontal transfer controlling portion 13A_1, thereby stopping the operation of the column circuit, of each non-selection column, for generating the pixel data (gray portion) not used in the horizontal direction. Both of a control signal (cutting-out start setting signal) indicating a start position of the cut-out portion, and a control signal (cutting-out end setting signal) indicating an end position of the cut-out portion are supplied from the communication/timing controlling portion 20 to the horizontal transfer controlling portion 13A_1. For example, as shown in FIG. 6, for a time period ranging from the start point of the horizontal synchronous signal (at the active L level) to the start position of the cut-out portion, the cutting-out start setting signal is held at the active H level, and for other time periods, the cutting-out start setting signal is held at the inactive L level. For a time period from the end position of the cut-out portion to the start position of the horizontal blanking time period, the cutting-out end setting signal is held at the active H level, and for other time periods, the cutting-out end setting signal is held at the inactive L level. The start position and the end position of the cut-out portion, for example, can be set by the registers or the like. The cut-out range may not be specified by hand-coded setting, but the arbitrary cut-out range can be specified. The timings and logics of the cutting-out start setting signal and the cutting-out end setting signal are by no means limited to those shown in FIG. 6.

The horizontal transfer controlling portion 13A_1 to which the first example is applied, as shown in FIG. 7, includes one 2-input type OR gate 522 and latch portions 524 for the number of columns. Both of the cutting-out start setting signal and the cutting-out end setting signal are supplied to an input terminal of the OR gate 522. The OR gate 522 obtains a logical sum of the cutting-out start setting signal and the cutting-out end setting signal, generates the column stop signal, and supplies the column stop signal to each of the latch portions 524 for the respective columns. Signals (for example, horizontal read controlling pules $HSEL_n$) used to output a trigger while the horizontal transfer is carried out every pixel are supplied to latch timing control input terminals of the latch portions 524, respectively. For example, for generating the column stop signal, for one line during the reading time period of the vertical blanking, the pixel signals are read out from all of the pixels as well (the cut-out pixels+ the pixels other than the cut-out portion). At this time, the latch portions 524 individually fetch in the column stop signals outputted from the OR gate 522 synchronously with the horizontal read control pulses $HSEL_n$, store therein values as physical values, and latch (hold) therein the values until the reading for all of the pixels is ended. Signals of the physical values latched by the respective latch portions 524 are referred to as "a column standby signals."

Operation Stopping Control for Each Non-Selection Column

Second Example

Figure 8:
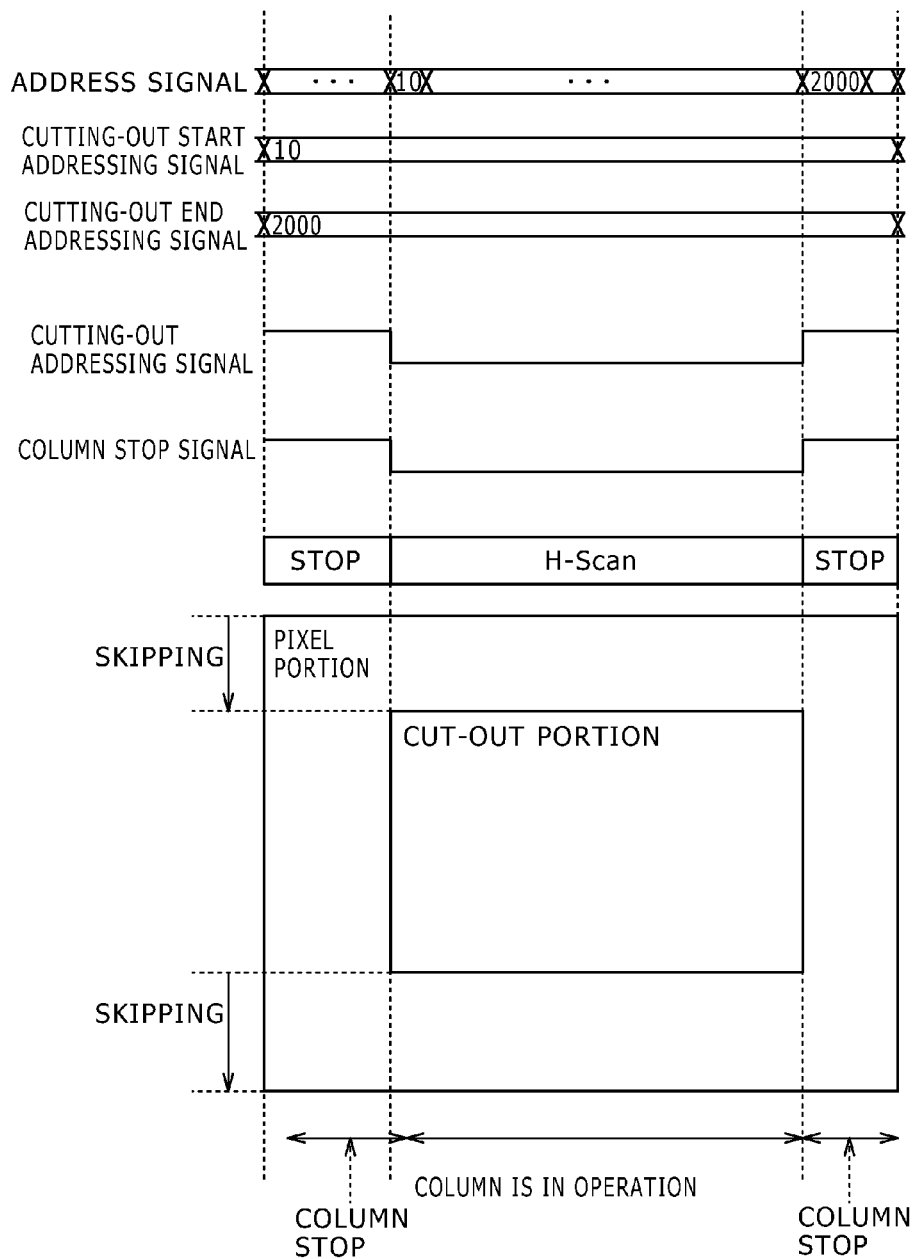
FIG. 8 is a diagram explaining a second example of the column stopping function and is also a timing chart at a horizontal scanning rate and an image diagram showing the column stopping function.
Figure 9:
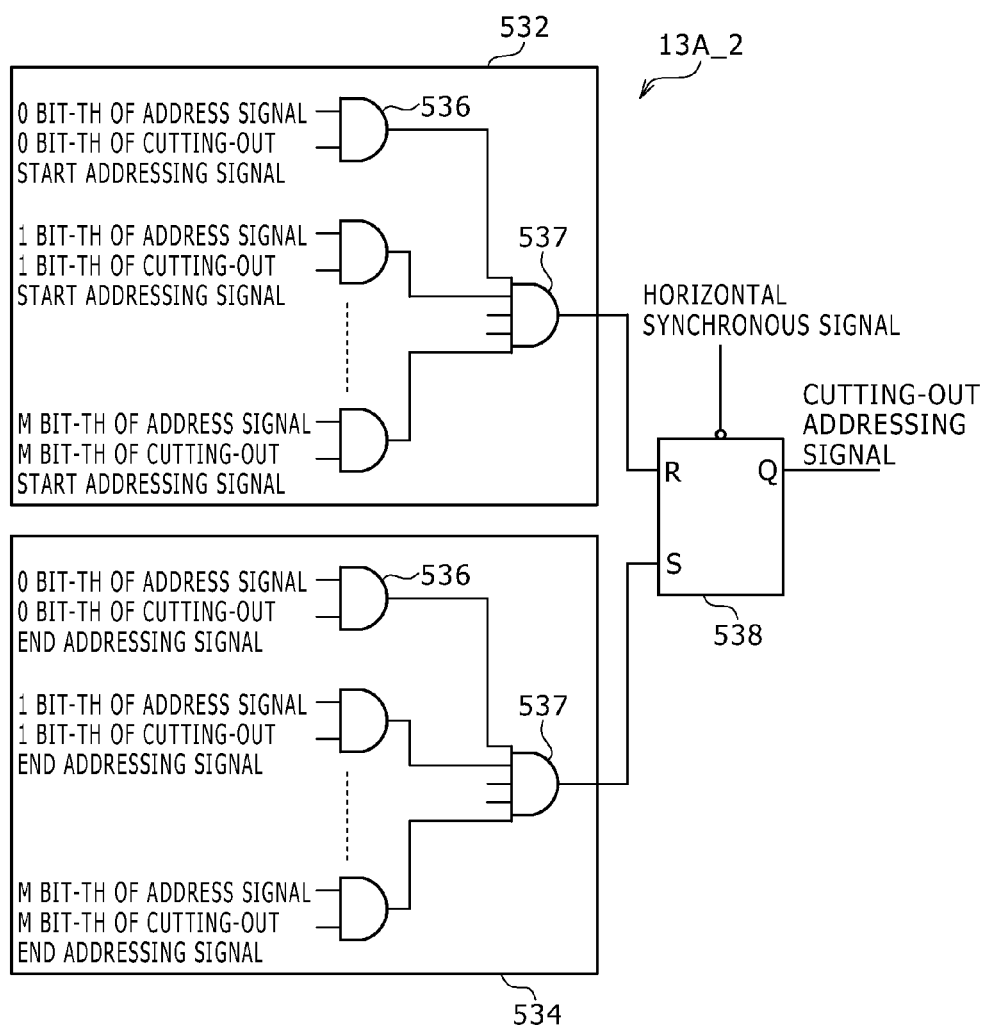
FIG. 9 is a circuit diagram explaining a technique for generating a cutting-out addressing signal in a second example of the column stopping function.

FIGS. 8 and 9 are respectively diagrams explaining a second example of a function (column stopping function) of stopping the column circuit of each non-selection column in the phase of the horizontal cutting-out. Here, FIG. 8, similarly to the case of FIG. 6, is a timing chart at a horizontal scanning rate and an image diagram showing the column stopping function. Specifically, an image diagram of timing charts of a horizontal synchronous signal, timings of the cutting-out start and cutting-out end of the transfer data, a column stop signal, and corresponding pixel cut-out portion is shown in FIG. 8. Also, FIG. 9 is a block diagram, partly in circuit, explaining a technique for generating the cutting-out addressing signal in the second example of the column stopping function.

The feature of the column stopping function of the second example is that horizontal address information is added by using the concept of the address, thereby creating control signals (such as the cutting-out addressing signal) representing the start position and end position of the cut-out portion from signals specifying addresses of the pixels in the horizontal direction. A horizontal address signal, an address signal (a cutting-out start address setting signal) representing the start position of the cut-out portion, and an address signal (cutting-out end address setting signal) representing the end position of the cut-out portion are all supplied from the communication/timing controlling portion 20 to a horizontal transfer controlling portion 13A_2 to which the second example is applied.

The horizontal transfer controlling portion 13A_2, as shown in FIG. 9, includes digital comparators 532 and 534, and an RS latch 538 (RS type flip flop). Each of the digital comparators 532 and 534 includes 2-input type AND gates 536 for the number of bits, and an AND gate 537 having input terminals for the number of bits. In each of the AND gates 536 by the bits of the digital comparator 532, bit data to which the addressing signal corresponds is supplied to one input terminal, and bit data to which the cutting-out start address setting signal corresponds to the other input terminals. In each of the AND gates 536 by the bits of the digital comparator 534, bit data to which the addressing signal corresponds is supplied to one input terminal, and bit data to which the cutting-out end address setting signal corresponds to the other input terminals. In any of the digital comparators 532 and 534, output signals from the respective AND gates 536 are supplied to the respective input terminals of the AND gate 537. When all of the output signals from the respective AND gates 536 are held at the H level in logic, an output signal from the AND gate 537 becomes the H level in logic. A horizontal synchronous signal (at the active L level) is supplied to a preset terminal of the RS latch 538. An output terminal of the digital comparator 532 is connected to a reset input terminal R of the RS latch 538, and an output terminal of the digital comparator 534 is connected to a set input terminal S of the RS latch 538.

When the signal at the reset input terminal R becomes the H level while the signal at the set input terminal S is at the L level, the RS latch 538 is reset and thus a signal at a non-inverting input terminal becomes the L level. When the signal at the set input terminal S becomes the H level while the signal at the reset input terminal R is at the L level, the RS latch 538 is reset and thus the signal at the non-inverting input terminal becomes the H level. For example, in a phase of signal processing for one line, firstly, the RS latch 538 is preset by using the horizontal synchronous signal (at the active L level), and thus the signal at the non-inverting input terminal becomes the H level. After that, when (the address data represented by) the addressing signal is changed in order depending on the pixel position for the horizontal transfer, and agrees with the cutting-out start address setting signal, all of the output signals from the respective AND gates 536 of the digital comparator 532 become the H level. Therefore, the signal at the output terminal of the AND gate 537 (in a word, the reset input terminal R of the RS latch 538) becomes the H level to reset the RS latch 538, and thus the signal at the non-inverting output terminal becomes the L level. After that, when (the address data represented by) the addressing signal is more changed depending on the pixel position for the horizontal transfer, and agrees with the cutting-out end address setting signal, all of the output signals from the respective AND gates 536 of the digital comparator 534 become the H level. Therefore, the signal at the output terminal of the AND gate 537 (in a word, the set input terminal S of the RS latch 538) becomes the H level to reset the RS latch 538, and thus the signal at the non-inverting output terminal becomes the H level. As a result, as shown in FIG. 8, the cutting-out addressing signal is outputted at the same timing as that of the column stop signal from the non-inverting output terminal Q of the RS latch 538.

As described above, when the address of the pixel to be cut out is clear as with the technique of the second example, it becomes unnecessary to generate the column stop signal. In other words, although in the first example, the column ADC for the pixels other than those in the cut-out portion needs to be carried out at least for one horizontal scanning time period during the vertical blanking time period, there is not such necessity in the second example. However, as can be understood from the consumption between FIG. 7 and FIG. 9, the circuit scale becomes larger in the horizontal transfer controlling portion 13A_2 of the second example than in the horizontal transfer controlling portion 13A_1 of the first example. Thus, the second example can be adopted when the increase in the circuit scale is permitted.

[Generation of Standby Signal]

Figure 10:
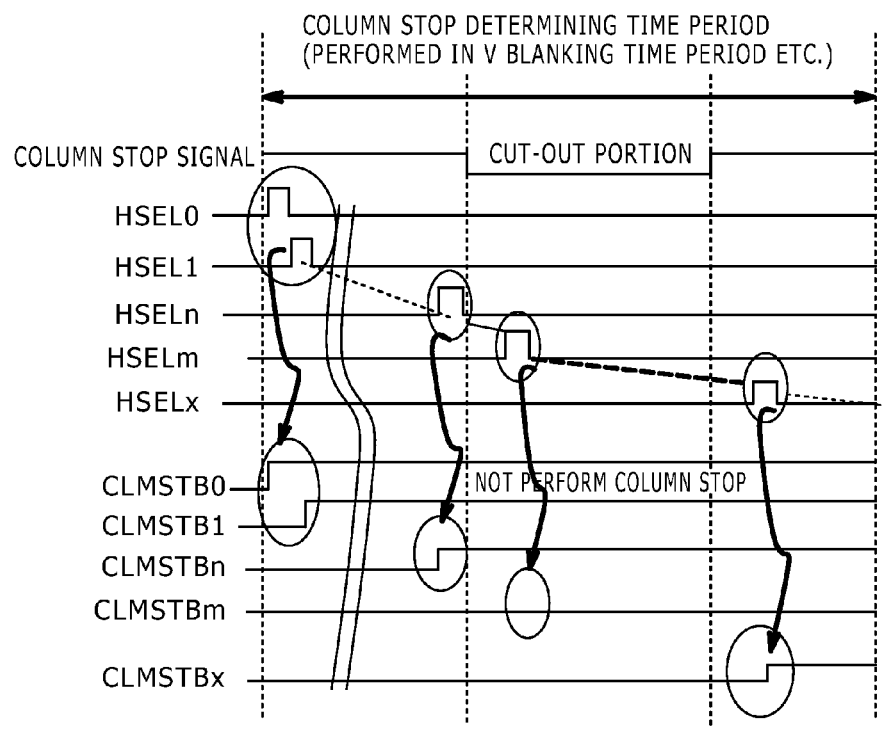
FIG. 10 is a timing chart when a column standby signal is generated.
Figure 11:
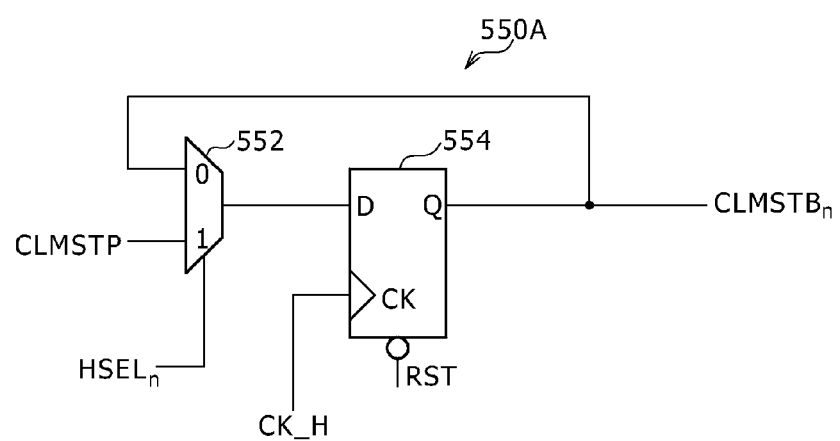
FIG. 11 is a circuit diagram explaining a first example of a column standby signal generating portion.
Figure 12A:
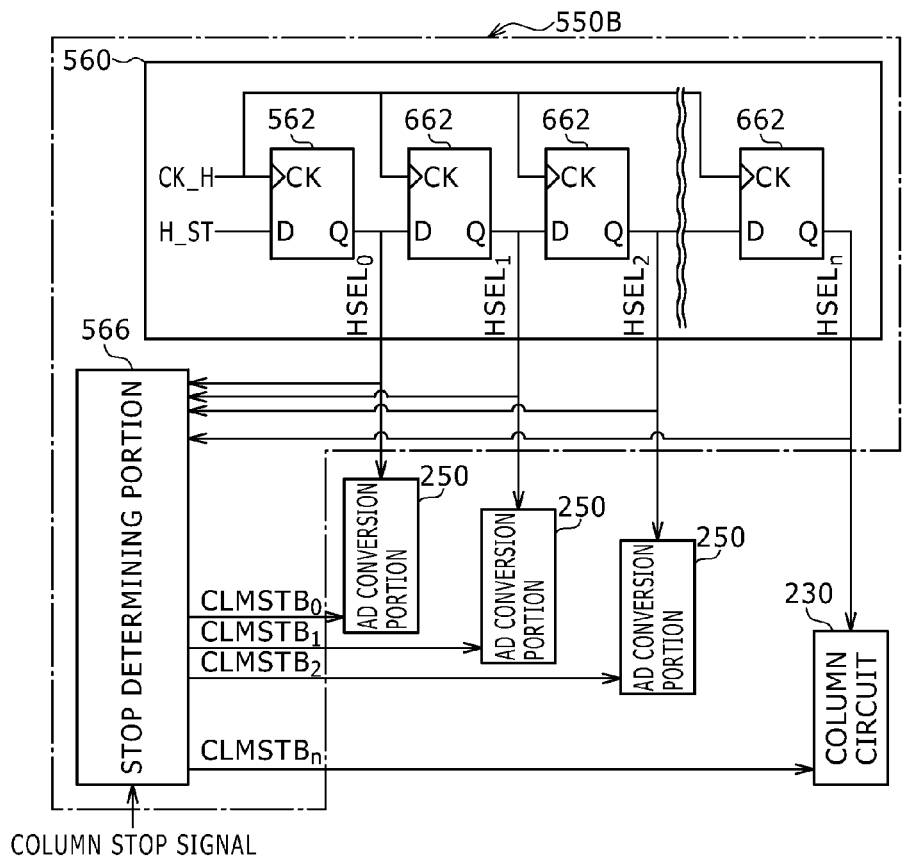
FIGS. 12A and 12B are respectively circuit diagrams explaining a second example of the column standby signal generating portion.
Figure 12B:
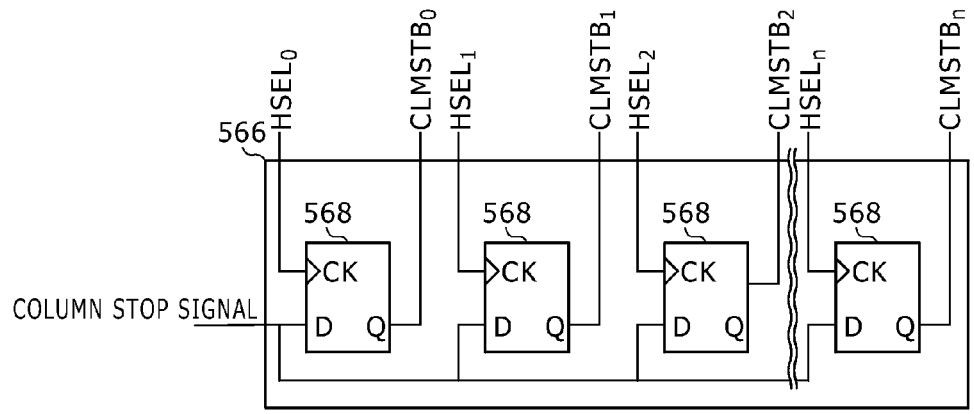

FIG. 10 to FIGS. 12A and 12B are respectively a timing chart and circuit diagrams explaining a technique for generating the column standby signal. Here, FIG. 10 is a timing chart when a column standby signal is generated. FIG. 11 is a circuit diagram explaining a first example of the column standby signal generating portion. Also, FIGS. 12A and 12B are respectively circuit diagrams explaining a second example of the column standby signal generating portion.

Here, a description will be given with respect to a technique for generating the column standby signal based on the column stop signal which is generated by applying the operation stop control for each non-selection column of the first example shown in FIGS. 6 and 7. For this reason, FIG. 10 shows the timing chart showing an example in which the column standby signal is created from the column stop signal. When the operation stop control for each non-selection column of the second example shown in FIGS. 8 and 9 is applied, it is only necessary to use the cutting-out addressing signal instead of using the column stop signal of the first example.

A logic is obtained between the signal (for example, the horizontal read control pulse $HSEL_n$) used to output a trigger when the horizontal transfer is carried out every pixel, and the column stop signal CLMSTP generated in the phase of the reading processing for the vertical blanking time period. Also, there is generated a column standby signal $CLMSTB_n$ for each column which enables the current source $240_n$ of the operating current supplying portion 24, and the AD conversion portion $250_n$ of the column portion 26 to become the standby state. With regard to the horizontal read control pulse HSEL, it is only necessary to refer to Example 3 which will be described later. For example, while the column stop signal CLMSTP is at the H level, the logic is obtained with the pulse of the horizontal read control pulse $HSEL_n$ to make the column standby signal $CLMSTB_n$ at the H level, thereby making both of the current source $240_n$ and the AD conversion portion $250_n$ in the standby state. On the other hand, while the column stop signal CLMSTP is at the L level, even when the logic is obtained with the pulse of the horizontal read control pulse $HSEL_n$, the column standby signal $CLMSTB_n$ is made at the L level to output the pixel data without making both of the current source $240_n$ and the AD conversion portion $250_n$ in the standby state. In accordance with this control, both of the current source $240_n$ and the AD conversion portion $250_n$ can be operated in the cut-out portion (each selection column) of the pixels, and the functions of both of the current source $240_n$ and the AD conversion portion $250_n$ can be controlled in a portion (each non-selection column) other than the cut-out portion of the pixels. When the functions of both of the current source $240_n$ and the AD conversion portion $250_n$ of each non-selection column are controlled, the column ADC processing is not executed in the portion other than the cut-out portion, which can contribute to the low power consumption promotion.

The logic is obtained between the horizontal read control pulse $HSEL_n$ used to output the trigger when the horizontal transfer is carried out every pixel, and the column stop signal CLMSTP, thereby generating the column standby signal used to make the column(s) in the standby state. For example, while the column stop signal CLMSTP is at the active H level, the logic is obtained with the horizontal read control pulse $HSEL_n$ to make the column standby signal $CLMSTB_n$ at the active H level (in the standby state of the column(s)). On the other hand, while the column stop signal CLMSTP is at the inactive L level, even when the logic is obtained with the horizontal read control pulse $HSEL_n$, the column standby signal is made to be held in the inactive L level (the column(s) is(are) prevented from becoming the standby state). For example, FIG. 11 shows a configuration of the column standby signal generating portion 550A (corresponding to the latch portion 524 when it is made to correspond to FIG. 7) of a first example included in the horizontal transfer controlling portion 13A. The column standby signal generating portion 550A of the first example has the configuration of fetching in and holding the column stop signal CLMSTP only when the horizontal read control pulse $HSEL_n$ is inputted thereto. Specifically, the column standby signal generating portion 550A includes a 2-input type selector 552, and a D type flip flop 554 every column (in a word, every column portion 23). In the selector 552, the column stop signal CLMSTP outputted from the OR gate 522 shown in FIG. 7 is inputted to one input terminal (a "1" side), and a non-inverted output signal Q from the flip flop 554 is inputted to the other input terminal (a "0" side). The horizontal read control pulse $HSEL_n$ is supplied to a control input terminal of the selector 552. In each of the flip flops 554, an output signal from the selector 552 is inputted to a data input terminal D, and a clock for horizontal transfer (a horizontal transfer clock CK_H) is supplied to a clock input terminal. In a phase of start of the operation (for example, in a phase of start of the vertical scanning), a reset signal is supplied to a reset terminal RST of the flip flop 554 to reset the non-inverted output signal Q.

With such a configuration, while the horizontal read control pulse $HSEL_n$ is active (at the "1" (H) level in this case), the selector 552 selects and outputs the column stop signal CLMSTP as the input signal on the "1" side. On the other hand, while the horizontal read control pulse $HSEL_n$ is inactive (at the "0" (L) level in this case), the selector 552 selects and outputs the column stop signal CLMSTP as the input signal on the "0" side. Since the signal thus selected and outputted is fetched in by the flip flop 554, when the column stop signal CLMSTP at the H level (representing the columns out of the cut-out range) is temporarily fetched in, the H level can be maintained. As a result, the column standby signal $CLMSTB_n$ as shown in FIG. 10 is outputted from the non-inverting output terminal Q of the flip flop 554.

FIGS. 12A and 12B show a configuration of a column standby signal generating portion 550B of a second example includes in the horizontal transfer controlling portion 13A. As shown in FIG. 12A, the column standby signal generating portion 550B of the second example includes a shift register 560 (an example of the transferring portion) in which registers 562 (each being an example of the memory portion) are cascade-connected to one another, and a stop determining portion 566. The register 562 and the shift register 560 correspond to a register 662 and a shift register 660 in Example 3 which will be described later, respectively. In this case, a detailed description thereof is omitted for the sake of simplicity. The shift register 660 carries out a shift operation for successively supplying the horizontal read control pulse $HSEL_n$ to the register 562 in the subsequent stage along with the horizontal scanning.

As shown in FIG. 12B, the stop determining portion 566 includes a D type latch 568 (D type flip flop) every column. The column stop signal CLMSTP is supplied to a data input terminal D of the D type latch 568 in common with the columns. A horizontal read control pulse $HSEL_n$ of the corresponding column is supplied to the clock input terminal CK of the D type latch 568. The D type latch 568 fetches in and holds the value (either L or H) of the column stop signal CLMSTP at a rising edge of the horizontal read control pulse $HSEL_n$, thereby outputting the column standby signal $CLMSTB_n$ to the non-inverting output terminal Q. Thus, the D type latch 568 supplies the column standby signal $CLMSTB_n$ to each of the current source 240 and the AD conversion portion 250 of the corresponding column. As a result, as shown in FIG. 10, the column standby signal $CLMSTB_n$ of each non-selection column out of the cut-out range is at the H level, and the column standby signal $CLMSTB_n$ of each non-selection column within the cut-out range is at the L level. By the way, the horizontal read control pulse $HSEL_n$ supplied to the AD conversion portion 250, for example, is utilized for selecting the AD conversion portion 250 becoming an object of the reading of the pixel data.

[Function Stop Controlling Circuit]

Figure 13A:
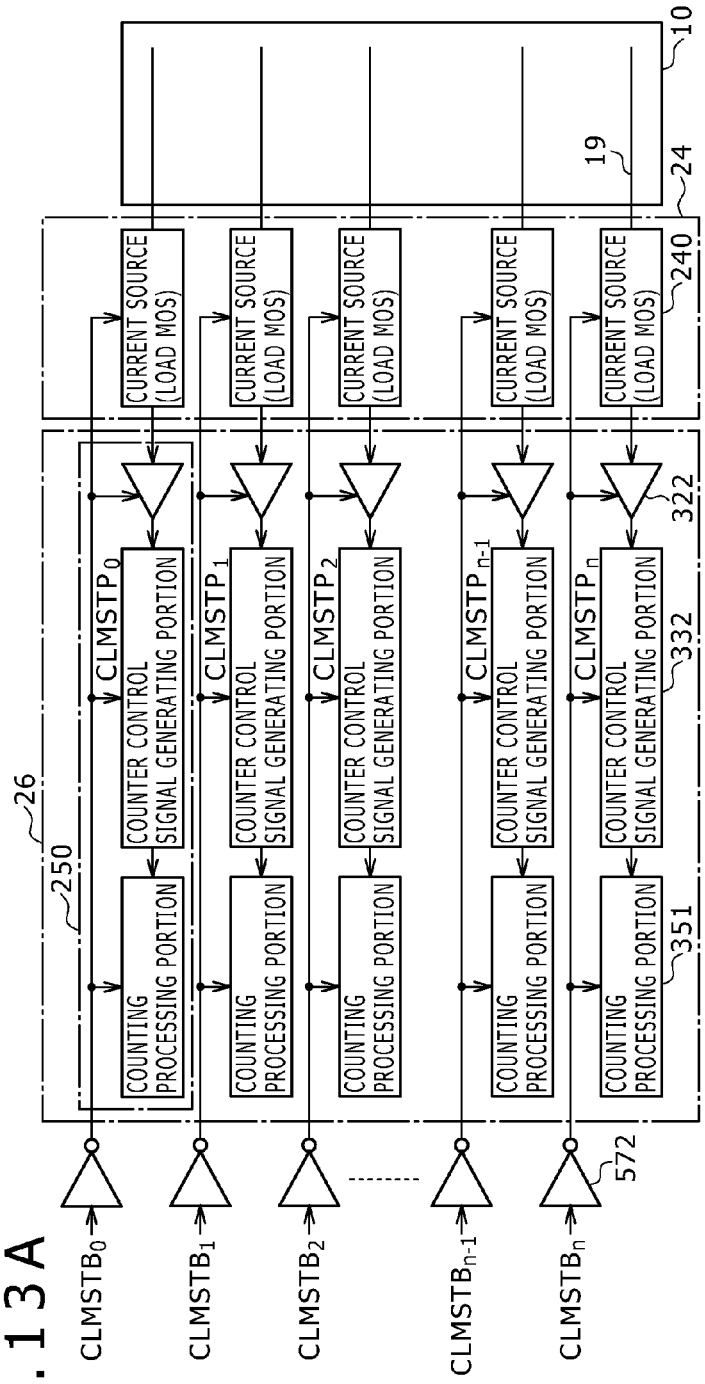
FIGS. 13A and 13B are respectively circuit diagrams showing a configuration of a function stop controlling circuit.
Figure 13B:
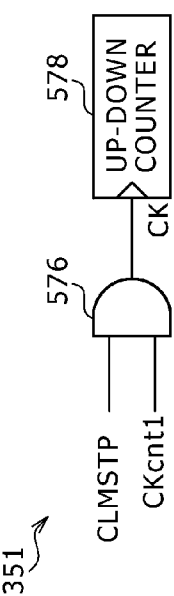

FIG. 13 is a block diagram, partly in circuit, showing a configuration of a function stop controlling circuit for turning ON or OFF the functions of the current sources $240_n$ of the operating current supplying portion 24, and the AD conversion portions $250_n$ of the column portion 26 by using the column standby signals $CLMSTB_n$ generated so as to correspond to the columns, respectively, in correspondence to the columns, respectively. As also described with reference to FIGS. 1, 2, and 3, the column stop signals CLMSTP$_n$ used to control ON/OFF of the functions are inputted to the switch transistors 244 of the current sources 240, the switch transistors 374 of the comparing portion 252, the counter control generating portions 332, and the counting transferring portions 351 so as to correspond to the columns, respectively. It is only necessary for the column stop signal CLMSTP$_n$ to invert the logic of the column standby signal CLMSTB$_n$ by the inverter 572 to generate the column standby signal CLMSTB$_n$ thus inverted in logic. As shown in FIG. 2, the function stop controlling circuit for controlling the function of the current source 240$_n$ can be realized in the form of the configuration in which the switch transistor 244 is provided in the constant current source 242, and the current supply is suppressed by (the L level of) the column signal CLMSTP$_n$. As shown in FIG. 3, the function stop controlling circuit for controlling the function of the comparison processing portion 322, can be realized in the form of the configuration in which the switch transistor 374 is provided in the constant current source 372, and the current supply is suppressed by (the L level of) the column stop signal CLMSTP$_n$. As shown in FIG. 13B, the function stop controlling circuit for controlling the function of the counting processing portion 351$_n$ is realized in the form of the configuration in which the logical product of the column stop signal CLMSTP$_n$ and the count clock CK$_{cntl}$ is obtained in the AND gate 576, and the clock (having the same logic as that of the count clock CK$_{cntl}$) supplied to the clock input terminal CK of the up-down counter 578 of the counting processing portion 351 is stopped. Or, although not illustrated, there may also be adopted a configuration in which the logic is obtained with the count enable signal EN within the up-down counter 578, and the clock supply is stopped. The configuration is adopted in which normally, the counting is carried out only when the count enable signal EN is active, and the logic is obtained with the column stop signal, thereby carrying out the control in such a way that the count enable signal EN does not become active. Although not illustrated, all it takes is that the function stop controlling circuit for controlling the function of the counter control signal generating portion 332 is a circuit for controlling the function concerned for generating the count enable signal EN. Thus, it is only necessary to adopt a configuration corresponding to the configuration of the counter control signal generating portion 332. As described above, the stopping of functions of the current source 240 and the AD conversion portion 250 belonging to each non-selection column for which the horizontal transfer for the pixel data is unnecessary leads to the reduction of the power consumption.

[Horizontal Scanning Skipping Processing]

Figure 14:
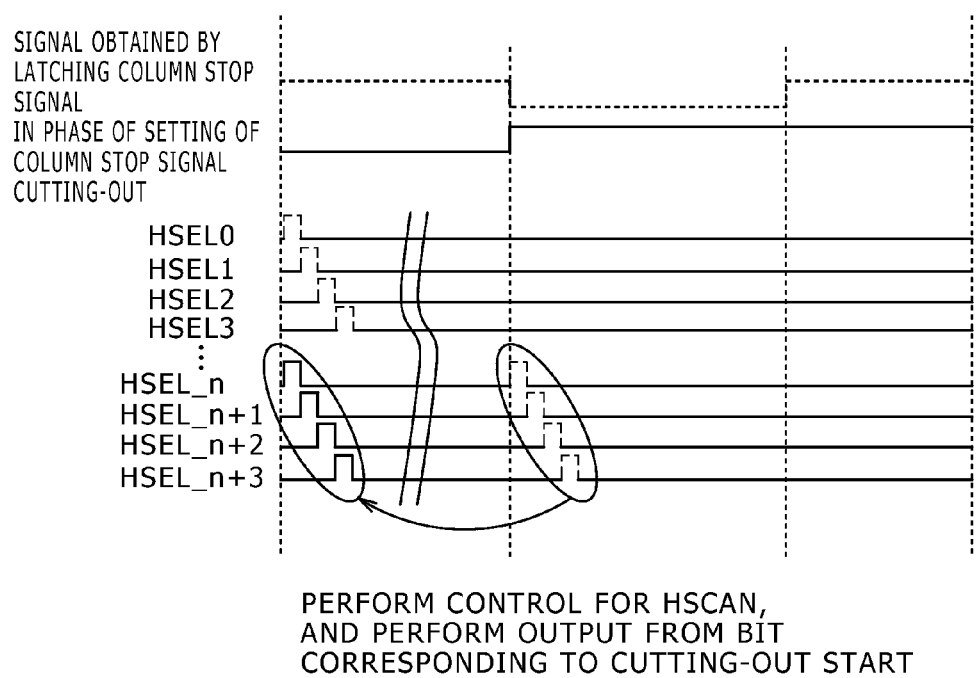
FIG. 14 is a timing chart explaining reading-out start position control for realizing horizontal scanning skipping processing.
Figure 15:
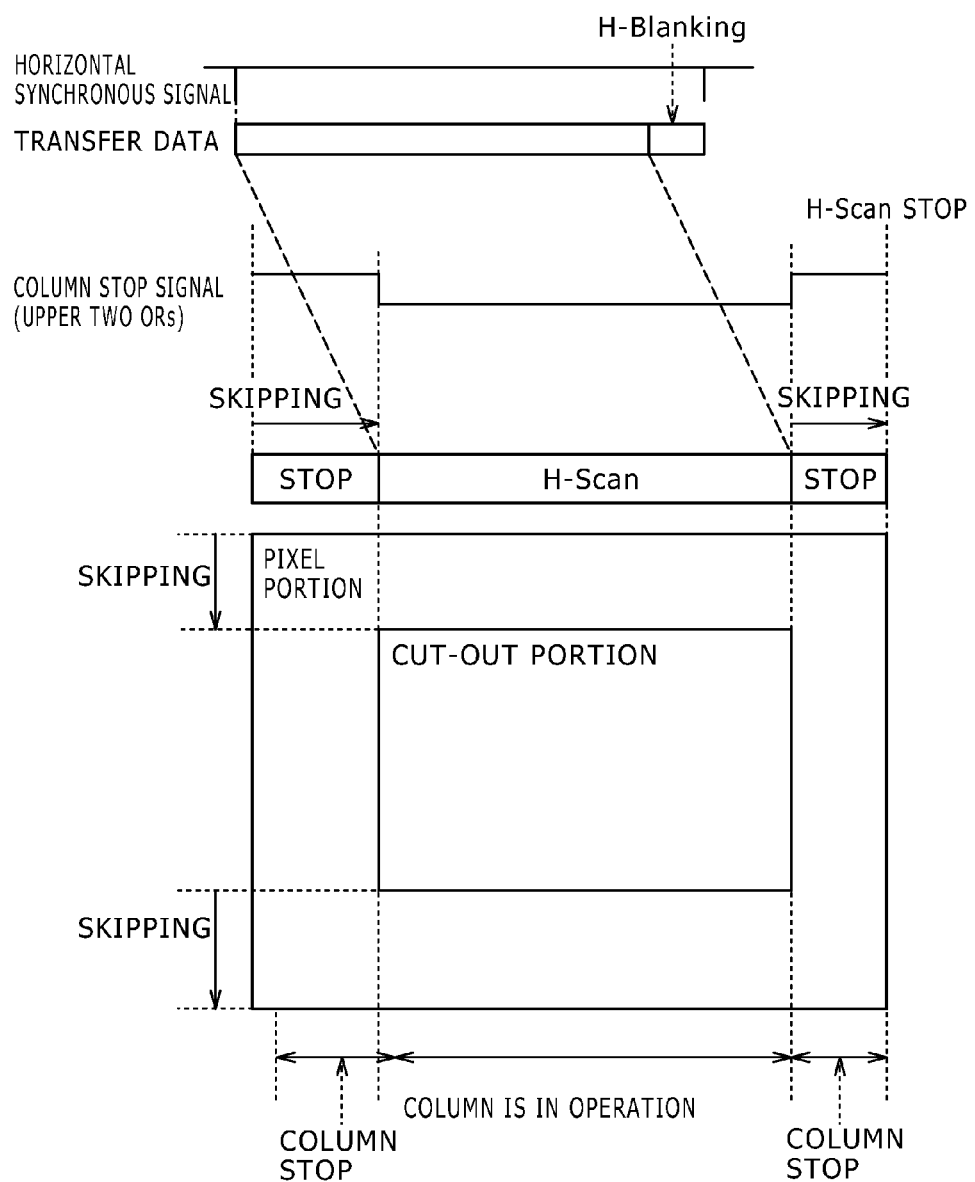
FIG. 15 is a timing chart at a horizontal scanning rate and an image diagram showing a column stopping function and a horizontal scanning skipping function when the column stopping function and the horizontal scanning skipping function belonging to each non-selection column are used together with each other.

FIGS. 14 and 15 are respectively a diagram and a timing chart explaining processing for inhibiting the horizontal transfer for the pixel data of each non-selection column out of the cut-out range from being executed (for inhibiting the transfer of the read-out signal), in a word, processing for skipping the pixel data of each non-selection column in the horizontal transfer (referred to as "horizontal scanning skipping processing"). Here, FIG. 14 is a diagram explaining read start position control for realizing the horizontal scanning skipping processing. Also, FIG. 15 is a timing chart at the horizontal scanning rate and an image diagram of the column stop function and the horizontal scanning skipping processing when the column stop function and the horizontal scanning skipping processing for each non-selection column are used together with each other.

In FIG. 14, a pulse indicated by a broken line is a pulse when no skipping is carried out, and a pulse indicated by a solid line is a pulse when the horizontal scanning skipping processing is executed by carrying out the control for the horizontal read control pulse HSEL. When the reading of the pixels (the horizontal transfer for the pixel data) is carried out, the horizontal read control pulse HSEL is outputted with one pixel as a unit, thereby carrying out the control for the pixel reading timing. At this time, the control for the skipping of the horizontal read control pulse HSEL for the horizontal scanning skipping processing is realized by starting the first output of the horizontal read control pulse HSEL from the pixel bit corresponding to the cutting-out start. As a result, as shown in FIG. 15, the pixel data in and before the cutting-out start can be skipped (prevented from being read out).

[Reading-Out Start Position Control]

Figure 16:
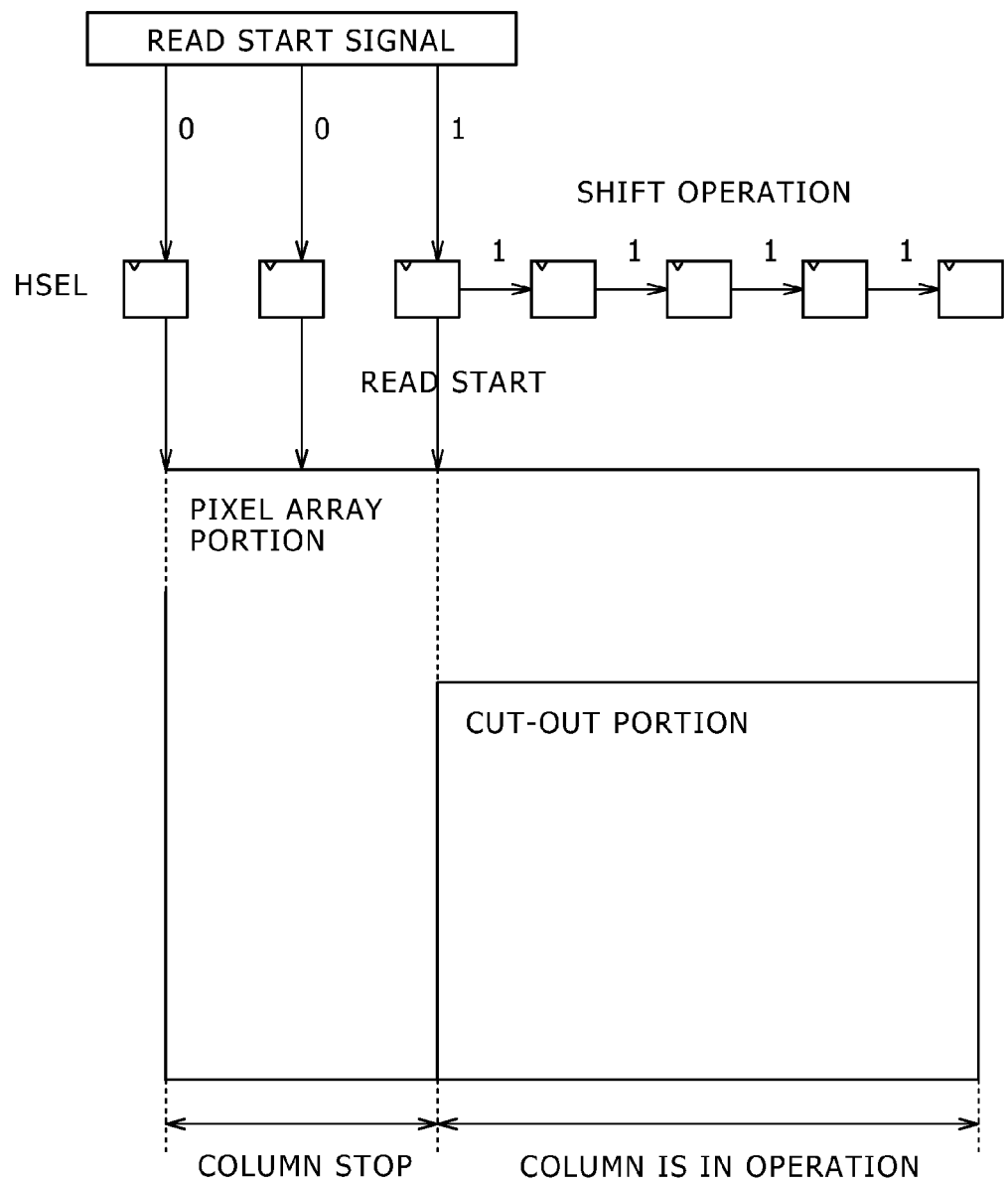
FIG. 16 is a conceptual diagram explaining horizontal scanning skipping processing in still another embodiment of the present disclosure.

FIG. 16 is a conceptual diagram explaining the horizontal scanning skipping processing according to still another embodiment of the present disclosure. As shown in FIG. 16, when the reading-out start position is set, the pixel data is outputted from the current source 240 of the operating current supplying portion 24 thus set, and the AD conversion portion 250 of the column portion 26. Whenever the clock is inputted, the read-out signal is successively shift-registered, thereby carrying out the pixel reading (the horizontal transfer of the pixel data). In addition, after the reading of the cut-out portion of the pixels has been ended, the logic is obtained with the scanning end signal (the trigger signal representing the end of the scanning), and the output from the horizontal read control pulse HSEL is stopped (for example, reset), thereby making it possible to skip the pixels in and after that time (not to read out the pixel data).

When the concept of the address is added in the horizontal direction as described above, both of the start address and the end address of the pixel cut-out portion are set in the control for the horizontal read control pulse HSEL, thereby making it possible to carry out the skipping (to start to output the horizontal read control pulse HSEL from the specified address).

[Technique for Generating Read Start Position Signal]

Figure 17A:
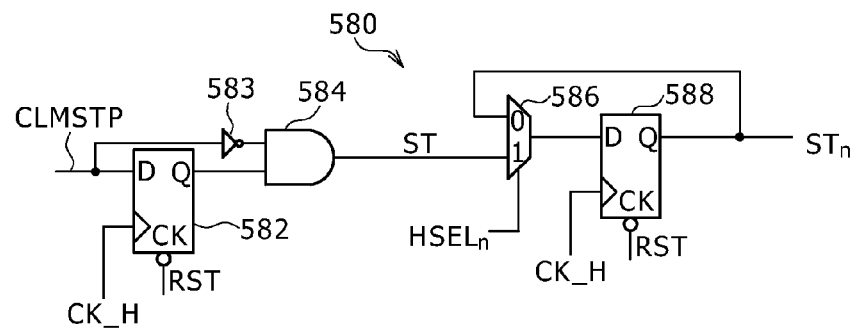
FIGS. 17A and 17B are respectively a circuit diagram and a timing chart explaining a technique for generating a reading-out start position signal.
Figure 17B:
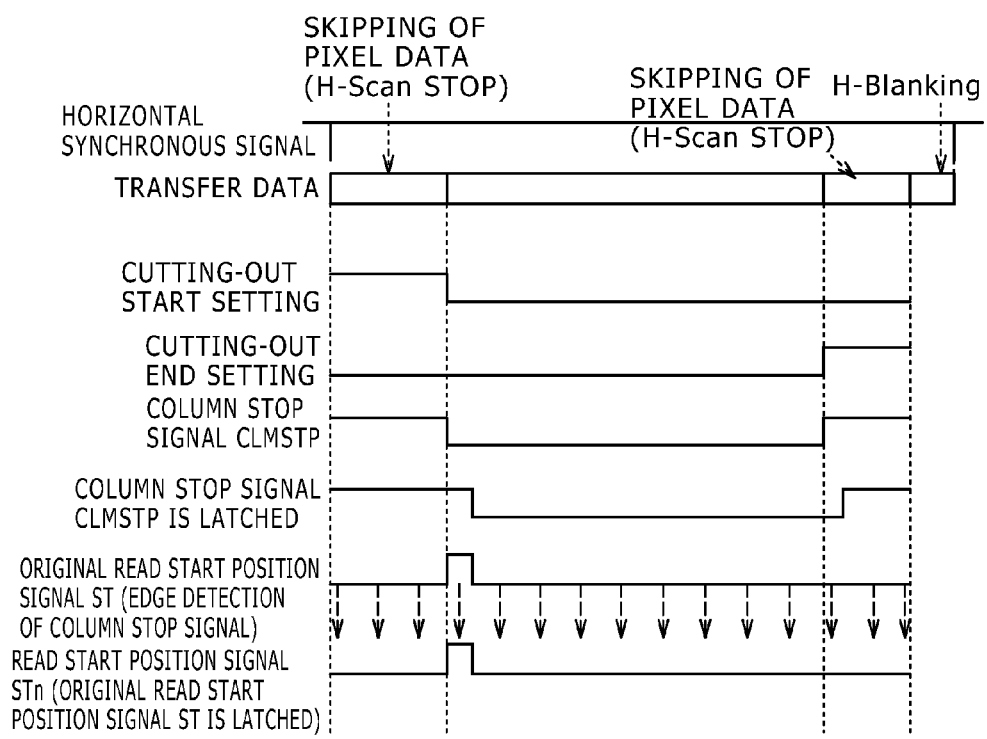

FIGS. 17A and 17B are respectively a circuit diagram and a timing chart explaining a technique for generating a read start position signal. Here, FIG. 17A is a circuit diagram showing a configuration of a read start position signal generating portion, and FIG. 17B is a timing chart explaining an operation of the read start position signal generating portion.

The read start position signal generating portion 580 includes a D type flip flop 582, an inverter 583, a 2-input type AND gate 584, a 2-input type selector 586, and a D type flip flop 588 every column (in a word, every column portion 23). In a phase of start of the operation (for example, in a phase of start of the vertical scanning), a reset signal is supplied to each of reset terminals RST of the flip flops 582 and 588 to reset the non-inverted output signal Q to the L level. In the flip flop 582, the column stop signal CLMSTP outputted from the OR gate 522 shown in FIG. 7 is inputted to a data input terminal D, and a horizontal transfer clock CK_H is supplied to a clock input terminal. In the AND gate 584, a signal obtained by inverting the column stop signal CLMSTP in logic in the inverter 583 is inputted to one input terminal, and a non-inverted output signal Q from the flip flop 582 is inputted to the other input terminal. The selector 586 and the flip flop 588 have a configuration of fetching in and holding an original read start position signal ST only when the horizontal read control pulse HSEL$_n$ is inputted thereto. In the selector 586, the output signal (the original read start position signal ST) from the AND gate 584 is inputted to one input terminal (a "1" side), and the non-inverted output signal Q from the flip flop 588 is inputted to the other input terminal (a "0" side). The horizontal read control pulse HSEL$_n$ is supplied to a control input terminal of the selector 586. When the horizontal read control pulse HSEL$_n$ is active (at the "1" (H) level in this case), the selector 585 selects and outputs the input signal on the "1" side. On the other hand, when the horizontal read control pulse HSEL$_n$ is inactive (at the "0" (L) level in this case), the selector 585 selects and outputs the input signal on the "0" side. In each of the flip flops 588, an output signal from the selector 586 is inputted to a data input terminal D, and the horizontal transfer clock CK_H is supplied to a clock input terminal.

With such a configuration, as shown in FIG. 17B, the edge detection is carried out in the AND gate 584 by using both of the column stop signal CLMSTP and the signal obtained by latching the column stop signal CLMSTP in the flip flop 582, thereby generating the original read start position signal ST representing the read start position. The original read start position signal ST is latched in the flip flop 588 synchronously with the horizontal transfer clock CK_H, thereby generating and holding a read start position signal ST$_n$ for each column. As a result, the read start position signal ST$_n$ as shown in FIG. 17B is outputted from the non-inverting output terminal Q of the flip flop 588. By the way, since the read start position signal ST$_n$, for example, is supposed to be created during the V blanking time period, it may be impossible to carry out the skipping operation for one line during the V blanking time period. However, the image within the cut-out range can be skipped, thereby outputting the pixel data.

[Relationship with Column AD Conversion Processing]

Figure 18:
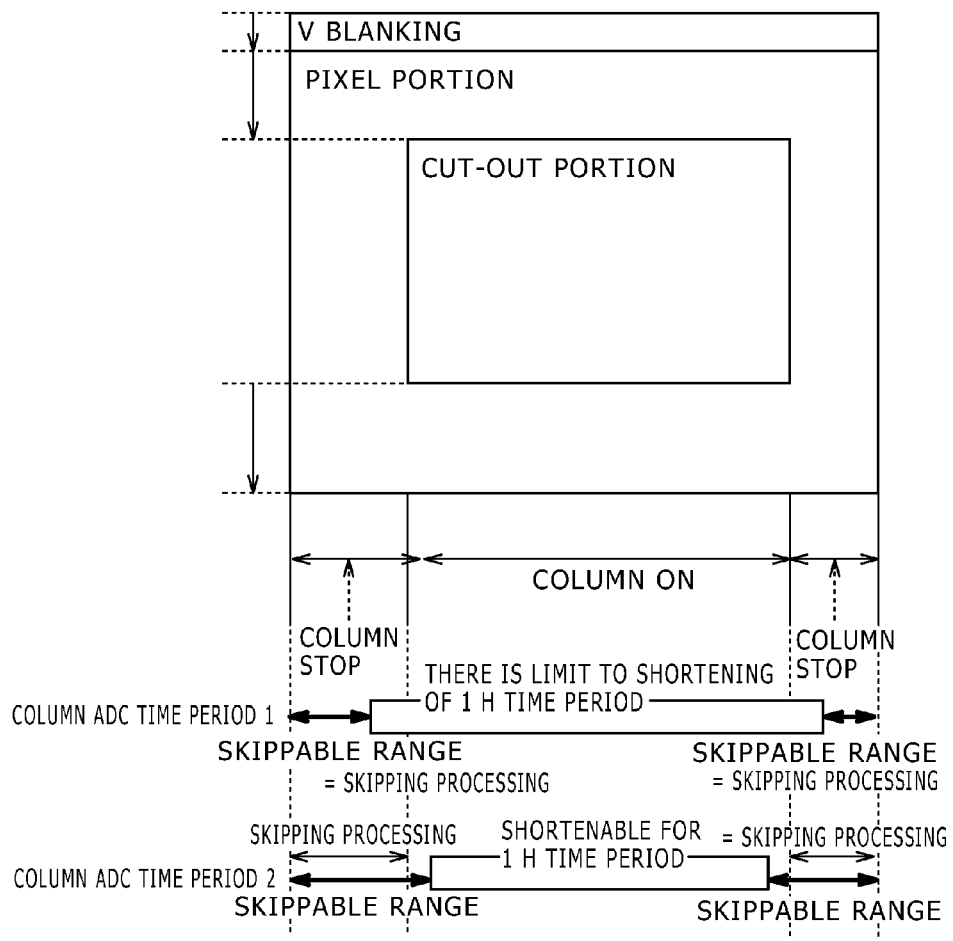
FIG. 18 is a diagram explaining a relationship between function stop and column AD conversion processing in each non-selection column.

FIG. 18 is a diagram explaining a relationship between the function stop of each non-selection column and the column AD conversion processing. The function of the column circuit (the load MOS transistor composing the constant current source 242 of the operating current supplying portion 24, and the AD conversion portion 250) belonging to each non-selection column (other than the cut-out pixels in this case) is controlled, thereby making it possible to reduce the power consumption in the phase of the pixel reading. Also, the function of stopping the horizontal transfer of the pixel data of each non-selection column (skipping the pixels), thereby making it possible to shorten the horizontal cutting-out time period. However, as shown in FIG. 18, the shortening of the horizontal scanning time period for one line to be read out is limited by a time period required for the column AD conversion processing (reference signal comparison type AD conversion processing). Therefore, there is a limit that the shortening of the time period beyond the necessary time period is impossible. In other words, the horizontal skipping of each non-selection column can be carried out merely up to the length of the time period required for the column AD conversion processing.

For example, a column ADC time period 1 shown in FIG. 18 is provided when the time period required for the column AD conversion processing is longer than that of the cut-out portion. In this case, the skippable range does not contain the entire range out of the cut-out range, and is limited to a part thereof. Therefore, the actual skipping processing in the horizontal thinning-out processing is limited to this part (=this skippable range). On the other hand, a column ADC time period 2 shown in FIG. 18 is provided when the time period required for the column AD conversion processing is shorter than that of the cut-out portion. In this case, the skippable range contains the entire range out of the cut-out range. Therefore, the actual skipping processing in the horizontal thinning-out processing is executed on the entire range out of the cut-out range.

5. Examples of Concrete Configurations

Hereinafter, a description will be given with respect to Examples of concrete configurations with each of which the horizontal skipping processing in still another embodiment described above is executed.

Example 1

Configuration of Horizontal Transferring Portion

Figure 19:
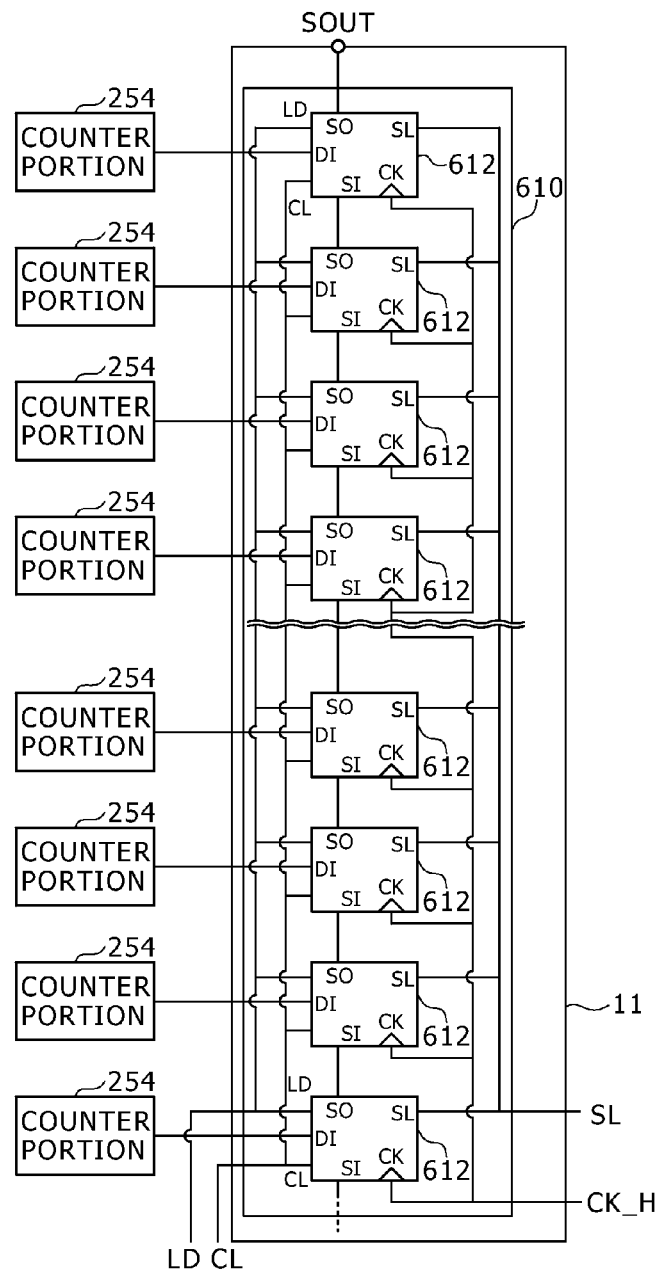
FIG. 19 is a circuit diagram explaining horizontal skipping processing according to Example 1 of the embodiment shown in FIG. 16.

FIG. 19 is a circuit diagram showing a schematic configuration of the horizontal transferring portion 11 of Example 1, and FIG. 18 is a circuit diagram showing a detailed configuration of the horizontal transferring portion 11 of Example 1. In these figures, the horizontal transferring portion 11 is shown as a form in which the left-hand side in the figures becomes a reading head side.

Horizontal skipping processing in Example 1, similarly to the case of Example 2 which will be described later, is an application example of the horizontal skipping processing in the case where the horizontal transferring portion 11 includes a shift register, and whenever the clock for horizontal transfer (the horizontal transfer clock CK_H) is inputted, the read-out signal (pixel data) is successively shifted to the subsequent stage, thereby horizontally reading the pixel data (in a word, horizontally transferring the pixel data). Specifically, the horizontal transferring portion 11 of Example 1 includes a shift register 610 in which registers 612 are cascade-connected to one another, and the pixel data is successively shifted to the subsequent stage. A shift register having a form in which parallel data simultaneously fetched in from the AD conversion portions 250 belonging to the respective columns of the column portion 26 is outputted as serial data to the outputting portion 28 side (a so-called shift register for parallel input/serial output: a parallel/serial counter) is used as the shift register 610 in Example 1. In the shift register 610, serial output terminals SO of the registers 612 in the stages are connected to serial input terminals SI of the registers 612 in the subsequent stages, respectively, and parallel input terminals (data input terminals DI of the registers 612) are connected to (counting portions 254 of) the AD conversion portions 250 of the columns, respectively. In addition, in (each of the registers 612 of) the shift register 610, the clock for horizontal transfer (the horizontal transfer clock CK_H) is inputted to a clock input terminal CK, a mode control signal SL used to switch a shift mode and a load mode over to each other is inputted to a mode setting terminal SL, and a clear signal CL is inputted to a clear terminal CL (reset terminal). A serial output terminal SOUT in terms of the entire shift register 610 is connected to the outputting portion 28. The horizontal transfer clock CK_H, the mode control signal SL, and the clear signal CL are all supplied from the communication/timing controlling portion 20.

In the phase of start of the horizontal scanning, firstly, the data held in the registers 612 is reset by the clear signal CL. After that, the mode control signal SL comes to indicate the load mode, whereby the data in the counting portions 254 of the column portion 26 is fetched in the register 612. After that, when the mode control signal SL comes to indicate the shift mode, whenever the horizontal transfer clock CK_H is inputted, the pixel data (read-out signals) fetched in the register 612 is successively shifted to the subsequent stage, thereby horizontally reading out the pixel data (horizontally transferring the pixel data). Since the register 612 exhibits the latch function of holding therein the count results held in the counting portions 254, the register 612 can respond to a so-called pipeline operation for executing the AD conversion processing in the AD conversion portion 250, and the horizontal transfer of the pixel data in parallel with each other.

Here, in Example 1, even in carrying out the cutting-out and reading-out not only in the phase of the normal horizontal transfer, the pixel data is transferred from the head side to the outputting portion 28. For this reason, in the horizontal skipping processing in Example 1, it may be impossible to skip the head side of the shift register (in a word, the pixel data in and before the cutting-out start), but it is possible to skip the pixel data in and after the cutting-out end. In a word, when the pixel data of the column of the cutting-out end is outputted from the read buffer (the reading-out of the pixel for the cut-out portion is ended), the supply of the horizontal transfer clock CK_H is stopped to stop the horizontal transfer, thereby making it possible to skip (not to read out) the pixel data in and after that time.

Example 2

Figure 20:
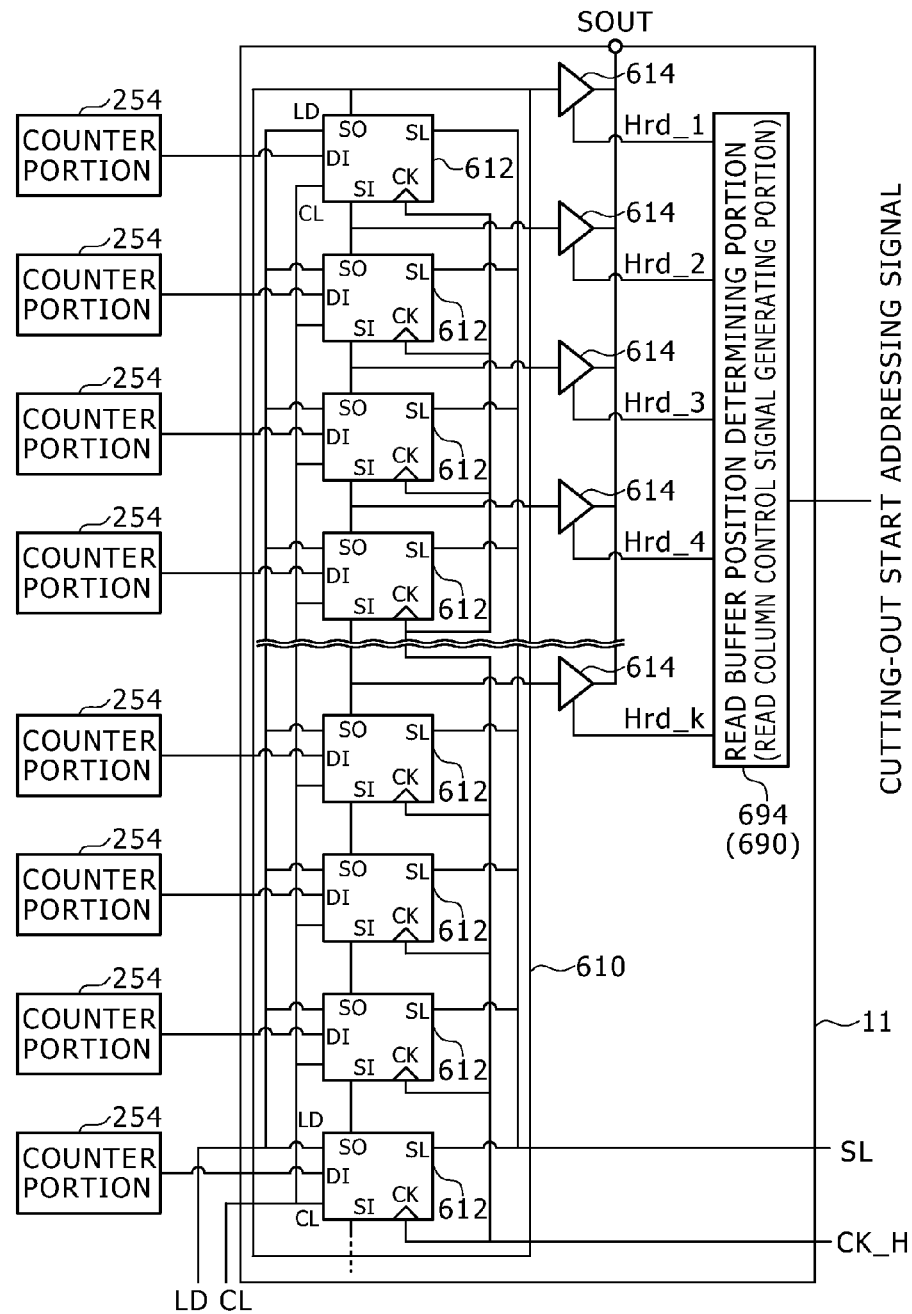
FIG. 20 is a circuit diagram explaining horizontal skipping processing according to Example 2 of the embodiment shown in FIG. 16.

FIG. 20 is a circuit diagram, partly in block, explaining horizontal skipping processing in Example 2. In the figure, the horizontal transferring portion 11 is shown as a form in which the left-hand side in the figure becomes a reading head side. Example 2 is a change in horizontal transfer of Example 1, and the operation stop control for each non-selection column may be the same as that of Example 1.

The horizontal skipping processing in Example 2, similarly to the case of Example 1, is an application example of the horizontal skipping processing in the case where the horizontal transferring portion 11 includes a shift register, and whenever the clock for horizontal transfer (the horizontal transfer clock CK_H) is inputted, the read-out signal (pixel data) is successively shifted to the subsequent stage, thereby horizontally reading the pixel data (in a word, horizontally transferring the pixel data). The horizontal skipping processing in Example 2 is different from that in Example 1 in that an output selector is provided on the head side of the shift register, whereby it is easily realized to skip the pixel data before the cutting out-start.

Specifically, in the shift register 610, with regard to the registers 612 in a range (a range indicated by ADJ in the figure) capable of becoming the non-selection column on the head side in the phase of the horizontal skipping processing, output buffers 614 are provided in the serial output terminals SO, respectively. Serial output terminals SO of the output buffer 614 are connected commonly to a serial output terminal SOUT in terms of the entire shift register 610. Control signals (reading buffer indicating signals Hrd_k: a reference character k is a column number from the final stage side) indicating which of the output signals from the output buffers 614 is supplied to the outputting portion 28, in other words, which of the output buffers 612 is used as the reading buffer are individually supplied from a read column control signal generating portion 690 to the output buffers 614. The read column control signal generating portion 690 includes a read buffer position determining portion 694. A cutting-out start address indicating signal is supplied from the communication/timing controlling portion 20 to the read buffer position determining portion 694. The read buffer position determining portion 694 specifies the column of the read buffers based on the cutting-out start address indicating signal, and generates the read buffer indicating signals Hrd_k of which only the read buffer indicating signals having the column number of the read buffers are active (for example, at the H level), and other read buffer indicating signals are inactive (for example, at the L level). In the output buffers 614 for which the read buffer indicating signals Hrd_k are inactive, the serial output terminals SO thereof becomes a high-impedance state. On the other hand, the output buffers 614 (read buffers) for which the read buffer indicating signals Hrd_k are active successively transfer the pixel data from the serial output terminal SOUT to the outputting portion 28.

In Example 1, even in carrying out the cutting-out and reading-out not only in the phase of the normal horizontal transfer, the pixel data is transferred from the head side to the outputting portion 28. On the other hand, when the cutting-out and the reading-out are carried out in Example 2, the pixel data is transferred from the read buffers to the outputting portion 28. As a result, the pixel data of the non-selection column on the head side is not horizontally transferred, but the pixel data of the selection columns from the read start position is successively, horizontally transferred. Also, when the pixel data of the column in the cutting-out end is outputted from the read buffers, in a word, when the reading for the cut-out portion of the pixels is ended, similarly to the case of Example 1, the horizontal transfer is stopped, thereby making it possible to skip (not to read out) the pixel data in and after that time. By the way, when the normal horizontal transfer is carried out in Example 2, there is no inconvenience because the pixel data is transferred from the head output buffer 614 (in a word, the read register 612) to the outputting portion 28.

Example 3

Figure 21:
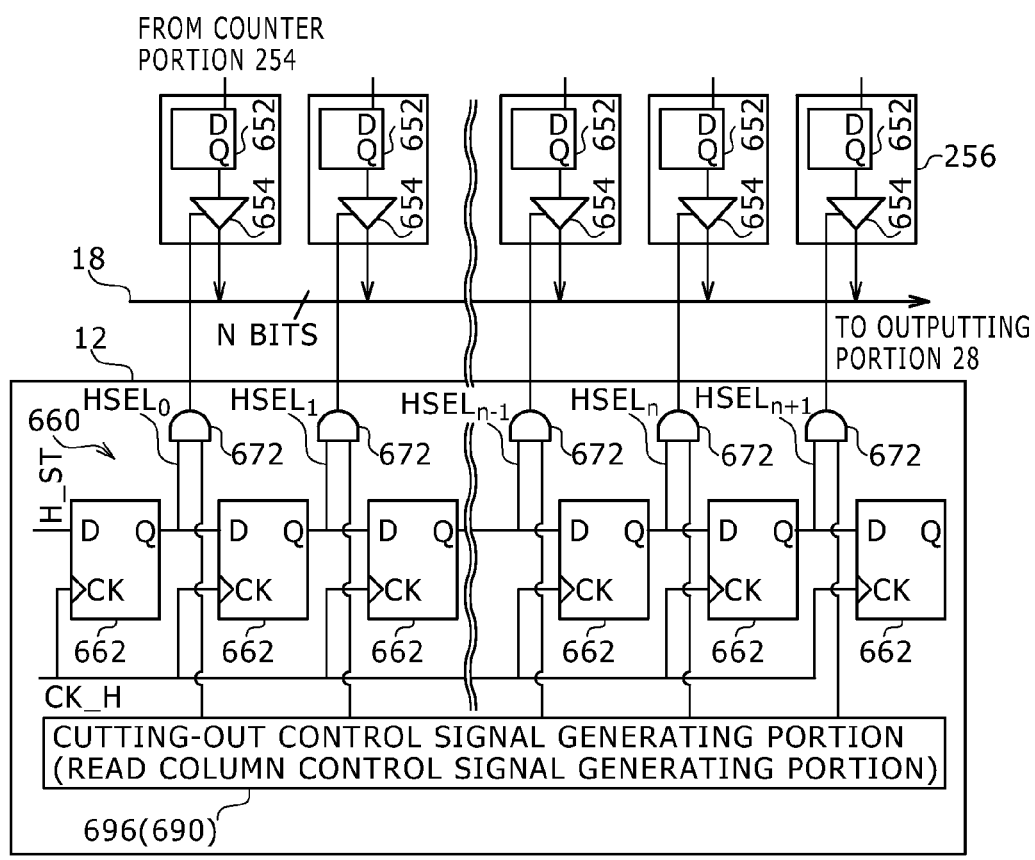
FIG. 21 is a circuit diagram explaining horizontal skipping processing according to Example 3 of the embodiment shown in FIG. 16.

FIG. 21 is a circuit diagram, partly in block, explaining horizontal skipping processing in Example 3. In these figure, the horizontal transferring portion 11 is shown as a form in which the left-hand side in the figure becomes a reading head side. Example 3 is a change in horizontal transfer of Example 1, and the operation stop control for each non-selection column may be the same as that of Example 1.

Unlike both of Example 1 and Example 2, the feature of the horizontal skipping processing in Example 3 is that the pixel data (read out) is not successively transferred to the subsequent stage by the shift register whenever the horizontal transfer clock CK_H is inputted, but the read start position and end position in the horizontal direction are regulated in accordance with control made by the horizontal scanning portion 12, and the horizontal scanning position is successively shifted. In a word, when the horizontal transfer of the pixel data is carried out, the horizontal read control pulse HSEL is outputted with one pixel as a unit, thereby controlling the reading-out timing of the pixel data. Also, with regard to the control for the horizontal skipping, the horizontal read control pulse HSEL starts to be outputted from the position corresponding to the cutting-out start, thereby skipping (not reading out) the pixel data before the cutting-out start. For example, when the reading-out start position is set, the pixel data is outputted from the AD conversion portion 250 in the horizontal position thus set. Thus, whenever the horizontal transfer clock CK_H is inputted, the horizontal read control pulse HSEL (assumed to be at the active H level) is shifted, thereby shifting the horizontal read position (in a word, the scanning start from the read start position by using the horizontal read control pulse HSEL). As a result, the horizontal transfer of the pixel data is carried out. When the reading for the cut-out portion has been ended, the output of the horizontal read control pulse HSEL is stopped, thereby skipping (not reading out) the pixel data in and after that time.

For example, the horizontal transferring portion 11 includes both of the horizontal scanning portion 12 (column scanning circuit) and the horizontal signal line 18 for realizing the control circuit function for successively reading out the signals in the pixel array portion 10 in the horizontal direction. The horizontal scanning portion 12 indicates the column position of the data which is to be read out in the phase of the data transferring operation. Specifically, the horizontal scanning portion 12 includes a horizontal address setting portion 12a and the horizontal driving portion 12b for controlling the column addresses and the column scanning. In response to the control signal CN2 from the communication/timing controlling portion 20, the horizontal scanning portion 12 starts to scan the columns.

For example, the output terminals of the counting portion 254 can be connected to the horizontal signal line 18 through the output side of the individual AD conversion portions 250. Or, a configuration may be adopted in which the data memory portion 256 as a memory device including the latch for holding the count results held in the counting portion 254 is provided in the subsequent stage of the counting portion 254, thereby responding to the pipeline processing. The data memory portion 256 holds and stores therein the count data outputted from the counting portion 254 at a determined timing. Hereinafter, a description will be given with respect to the case of the data memory portion 256 is provided.

The horizontal scanning portion 12 has a function of a reading-out scanning portion for reading out the count values held in the data memory portions 256, respectively, in parallel with that the comparing portion 252 and the counting portion 254 of the column portion 26 execute the respective pieces of processing of which the comparing portion 252 and the counting portion 254 take charge.

Each of the data memory portions 256, for example, includes a D type flip flop 652 and an output buffer 654. In the D type flip flop 652, a data input terminal D is connected to the output terminal of the counting portion 254, and a non-inverting output terminal Q is connected to an input terminal of the output buffer 654. An output terminal of the output buffer 654 is connected to the horizontal signal line 18. The horizontal read control pulse HSEL is supplied from (the horizontal driving portion 12b of) the horizontal scanning portion 12 to a clock input terminal CK of the D type flip flop 652. The output buffer 654 is of a type capable of obtaining a high-impedance state in addition to L/H (the low level L and the high level H). Thus, while the horizontal read control pulse HSEL is at the active H level, the output buffer 654 outputs the non-inverted signal at the non-inverting output terminal Q (L/H) of the D type flip flop 652 as it is. On the other hand, while the horizontal read control pulse HSEL is at the inactive L level, the output buffer 654 causes the output terminal to become the high-impedance state. As a result, only the pixel data of the columns in each of which the horizontal read control pulse HSEL is at the active H level is transmitted to the outputting portion 28 through the horizontal signal line 18, thereby making it possible to realize the horizontal transfer of the pixel data.

The horizontal signal line 18 has signal lines for either a bit width or a double bit width (for example, in the case of a complementary output) of the AD conversion portion 250, and is connected to the outputting portion 28 having signal amplifiers 402 corresponding to the respective output lines. The counting portion 254, the data memory portion 256, and the horizontal signal line 18 adopt the respective configurations each corresponding to N bits.

The horizontal scanning portion 12 includes a shift register 660 in which registers 662 (for example, D type flip flop) are cascade-connected to one another as the horizontal address setting portion 12a. When a start pulse H_ST indicating the horizontal scanning start is inputted to the horizontal scanning portion 12, the horizontal scanning portion 12 carries out a shifting operation for subsequently supplying the horizontal read control pulse HSEL corresponding to the start pulse H_ST to the subsequent stage. For example, the start pulse H_ST is assumed to be a signal which is held in the H level only for a time period shorter than one cycle of the horizontal transfer clock CK_H, and whose H level can be latched at a rising edge of the horizontal transfer clock CK_H. The register 662 latches the horizontal read control pulse HSEL (the start pulse HST in the case of the initial stage) transferred thereto from the preceding stage at a rising of the horizontal transfer clock CK_H, and holds the horizontal read control pulse HSEL at the falling of the horizontal transfer clock CK_H, thereby transferring the horizontal read control pulse HSEL to the subsequent stage. It is possible to transfer the horizontal read control pulse HSEL having an active time period (H level) for one cycle of the horizontal transfer clock CK_H corresponding to the start pulse H_ST in correspondence to the cycle of the horizontal transfer clock CK_H without depending on the duty of the horizontal transfer clock CK_H. With regard to the shifting operation for the horizontal read control pulse HSEL (in a word, the horizontal transferring operation for the horizontal read control pulse HSEL), for example, it is only necessary to refer to Example 6 which will be described later.

Here, the horizontal scanning portion 12 in Example 3 includes a gate circuit composing the horizontal driving portion 12b between the output terminal of the register 662 and the AD conversion portion 250 (specifically, the data memory portion 256), and the read column control signal generating portion 690. In this case, the read column control signal generating portion 690 includes the cut-out control signal generating portion 696 for generating the cut-out control signal used to control the gate circuit (in other words, to regulate the read column). When the horizontal read control pulse HSEL is at the active H level, and the H time period of the cut-out control signal used to regulate the cut-out range indicates the cut-out range (active time period), a 2-input type AND gate 672, for example, is used as the gate circuit. In this connection, when the logic of the active time period of the horizontal read control pulse HSEL or the cut-out control signal is different from that of the AND gate 672, a circuit corresponding thereto is also used as the gate circuit.

In the AND gate 672, the horizontal read control pulse HSEL outputted from the register 662 is supplied to one input terminal, and the cut-out control signal used to regulate the cut-out range is supplied from the cut-out control signal generating portion 696 to the other input terminal. The cut-out control signal may be signals corresponding to the columns, respectively. Or, a signal obtained by logic-inverting the column stop signal CLMSTP shown in FIG. 6 or FIG. 10 may also be commonly used. A signal obtained by latching the column stop signal CLMSTP shown in FIG. 7 can be used as the former. In a word, the cutting-out control signal generating portion 696 can utilize a part of or all of the configuration of the column stop signal generating portion shown in FIG. 7.

In such Example 3, only for the time period for which the cutting-out control signal is at the active H level, the pixel data is horizontally transferred. In this connection, as shown in FIG. 14, or Example 1 and Example 2, when the read start position control for starting the output of the horizontal read control pulse HSEL from the position corresponding to the cutting-out start is also carried out, it is possible to skip (not read out) the pixel data of each non-selection column in and after the cutting-out start.

Example 4

Figure 22:
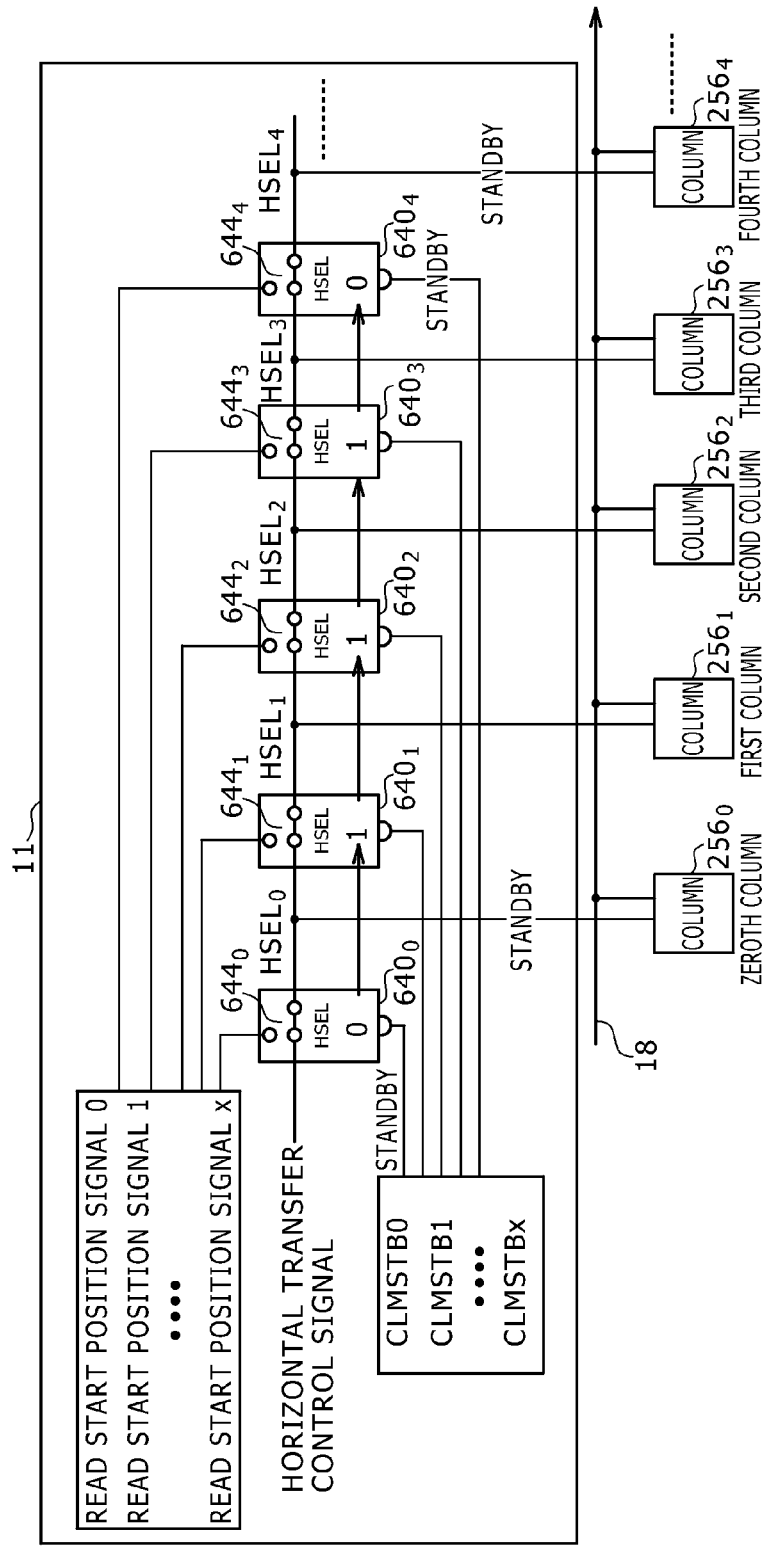
FIG. 22 is a circuit diagram showing a schematic configuration of a horizontal transferring portion in Example 4.
Figure 23:
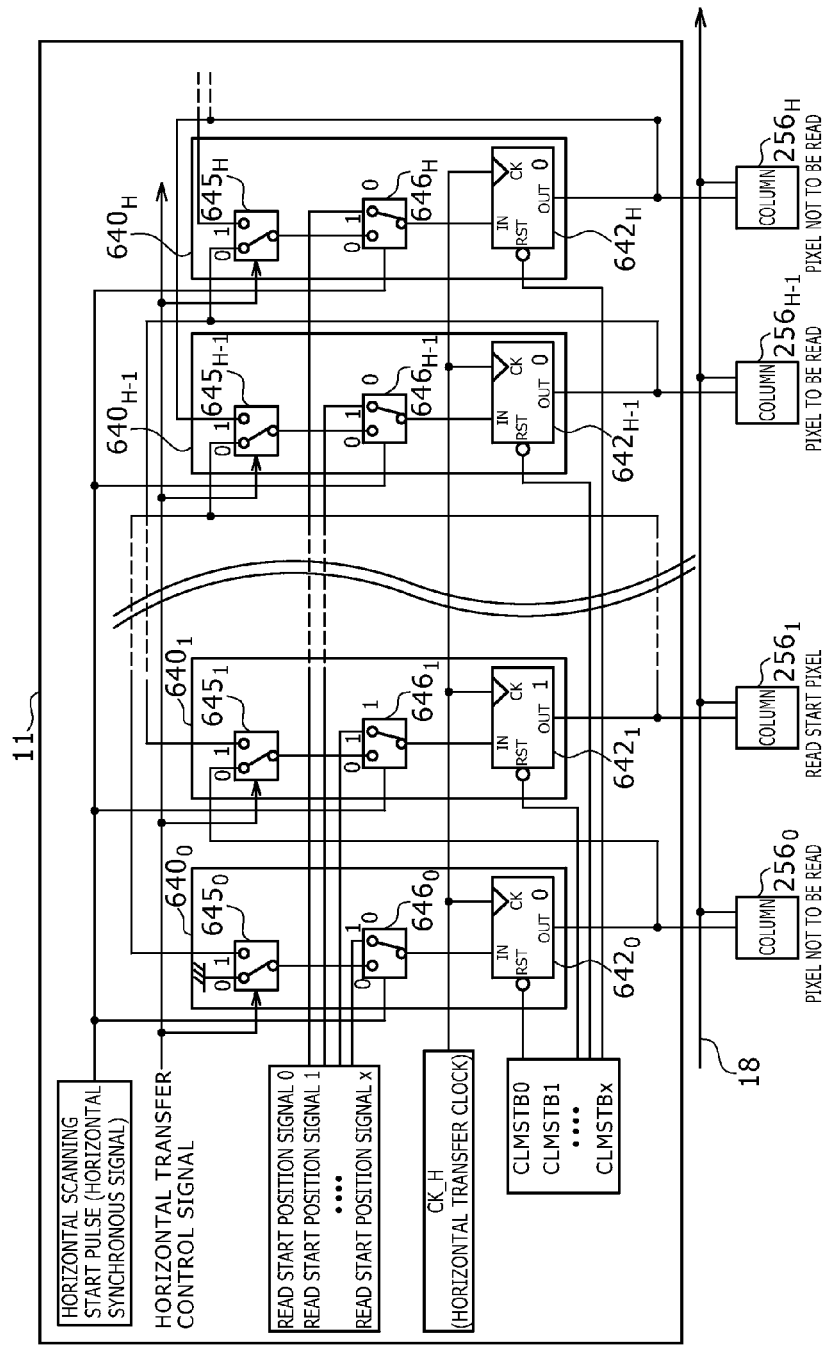
FIG. 23 is a circuit diagram (part 1) showing a detailed configuration of a horizontal transferring portion in Example 4.
Figure 24:
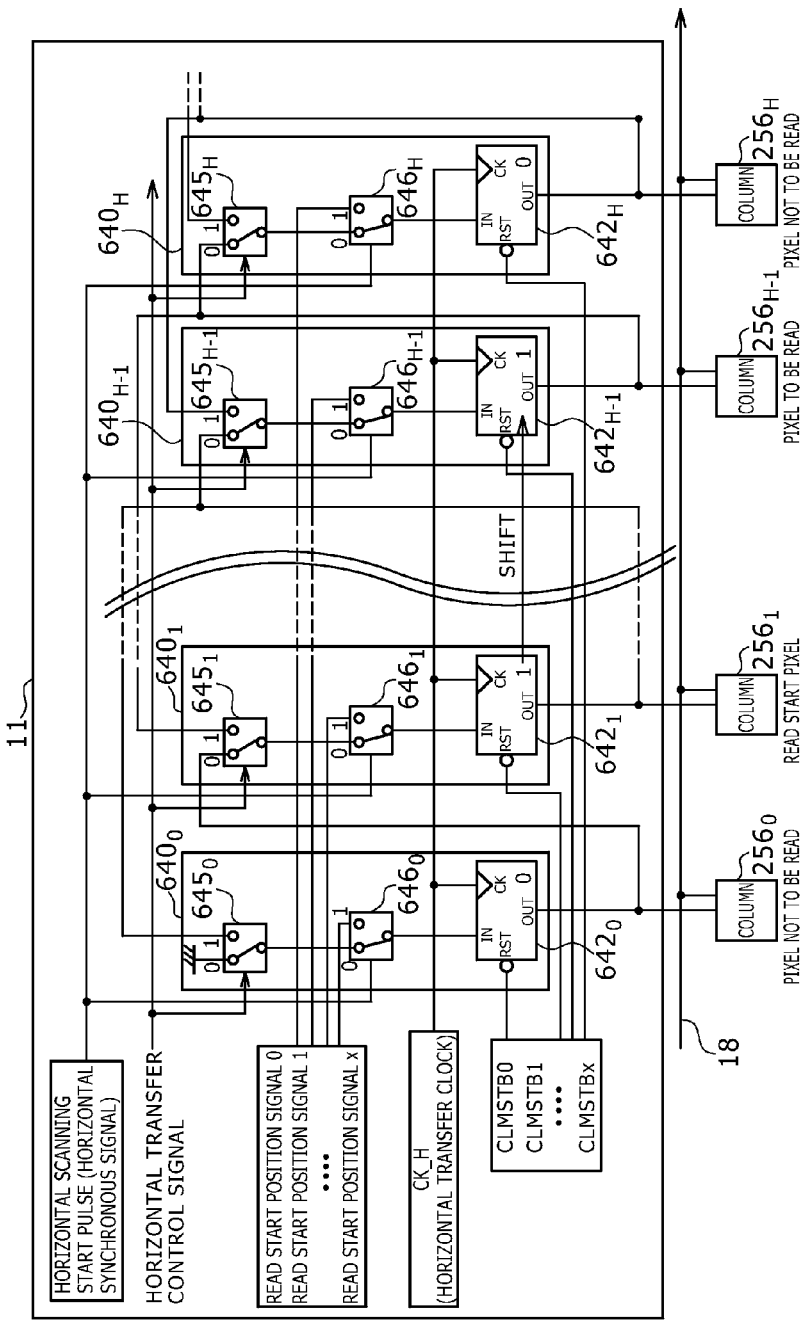
FIG. 24 is a circuit diagram (part 2) showing a detailed configuration of a horizontal transferring portion of Example 4.

FIGS. 22 to 24 are respectively circuit diagrams explaining horizontal skipping processing in Example 4. Here, FIG. 22 is a circuit diagram showing a schematic configuration of the horizontal transferring portion 11 in Example 4. FIGS. 23 and 24 are respectively circuit diagrams each showing a detailed configuration of the horizontal transferring portion 11 in Example 4. As shown in FIG. 22, the horizontal transferring portion 11 in Example 4 includes a horizontal transfer controlling portion 640 containing therein a switch circuit 644 every column. A read start position signal $ST_n$ is inputted from the read start position signal generating portion 580 to the switch circuit 644$_n$. Also, the horizontal transfer control signal is supplied from the communication/timing controlling portion 20 to a control input terminal of the switch circuit 644$_n$. The column standby signal $CLMSTB_n$ is supplied to the horizontal transfer controlling portion 640$_n$. The horizontal transfer controlling portion 640$_n$ successively transfers the horizontal read control pulse HSEL to the subsequent stage, and also supplies the horizontal read control pulse HSEL to the data memory portion 256 of the corresponding column. An output terminal of the data memory portion 256 is connected to the horizontal signal line 18. Although not illustrated, similarly to the case of Example 3, the data memory portion 256 includes a D type flip flop 652 and an output buffer 654. While the horizontal read control pulse HSEL is at the active H level, the data memory portion 256 outputs the data held therein to the horizontal signal line 18. On the other hand, while the horizontal read control pulse HSEL is at the inactive L level, the data memory portion 256 causes the output terminal to become the high-impedance state.

As shown in FIGS. 23 and 24, the horizontal transfer controlling portion 640 includes a D type flip flop 642 (register), and a switch circuit 644 having 2-input type switches 645 and 646. The horizontal transfer control signal used to switch a direction (route) in which the horizontal read control pulse HSEL is transferred to the next shift register over to another one is supplied to a control input terminal (of the switch 645) of the switch circuit 644.

In the switch 645$_n$, the horizontal read control pulse $HSEL_{n-1}$ outputted thereto from the flip flop 642$_{n-1}$ in the preceding stage is inputted to one input terminal (a "0" side). Also, the horizontal read control pulse $HSEL_{n+1}$ outputted thereto from the flip flop 642$_{n-1}$ in the subsequent stage is inputted to the other input terminal (a "1" side). It is noted that both of one input terminal (the "0" side) of the switch 645$_0$ on the initial stage, and the other input terminal (the "1" side) of the switch 645$_H$ in the final stage are fixed either to the L level or to the H level. The switch 645$_n$ selects and outputs the input signal on the "0" side when the horizontal transfer control signal is at "0: the L level," and selects and outputs the input signal on the "1" side when the horizontal transfer control signal is at "1: the H level." For example, in the case of the non-inversion reading, the switching is made to "0: the L level" side, and in the phase of the inversion, the switching is made to "1: H level" side. In the switch 646$_n$, the output signal from the switch 645$_n$ is inputted to one input terminal (the "0" side), the read start position signal, n, corresponding to the read start position signal $ST_n$ is inputted to the other input terminal (the "1" side), and the horizontal scanning start pulse corresponding to the horizontal synchronous signal is inputted to a control input terminal. In this connection, FIG. 23 shows a state when the horizontal scanning start pulse is at the H level, and FIG. 24 shows a state when the horizontal scanning start pulse is at the L level. In the flip flop 642$_n$, the output signal from the switch 646$_n$ is inputted to a D input terminal, the horizontal transfer clock CK_H is supplied to a clock input terminal, the column standby signal $CLMSTB_n$ is supplied to a reset terminal RST, and the horizontal read control pulse $HSEL_n$ is outputted from a non-inverting output terminal Q.

In such a configuration, the switch 646$_n$ carries out the switching to the side on which the read start position signal, n, (cut-out signal) is fetched in by only one cycle of the horizontal transfer signal (when the horizontal synchronous signal is inputted) based on the horizontal scanning start pulse. As a result, the transfer of the horizontal read control pulse $HSEL_n$ starts from the column for which the read start position signal, n, is at the H level. Specifically, firstly, as shown in FIG. 23, while the horizontal scanning state pulse (horizontal synchronous signal) is at the H level, the switch 646$_n$ is switched to the "1" side to select the read start position signal, n, thereby supplying the read start position signal, n, to the D input terminal of the flip flop 642$_n$. The flip flop 642$_n$ fetches therein the read start position signal, n, (the signal for which only the column in the start position is at the H level) synchronously with the horizontal transfer clock CK_H, and holds therein the read start position signal, n, as the horizontal read control pulse $HSEL_n$. As shown in FIG. 24, when the horizontal scanning start signal becomes the L level (after a lapse of one cycle of the horizontal transfer clock CK_H), whenever the horizontal transfer clock CK_H is inputted, the horizontal read control pulse $HSEL_n$ is shift-registered. As a result, since the horizontal read control pulse $HSEL_n$ becomes the H level in order from the start position, the pixel data in the data memory portion 256 of the corresponding column is selected in order to be transferred through the horizontal signal line 18. In a word, the switch 646$_n$ of the column for which the read start position signal n is at the H level, and the reading starts from that column through the shifting operation. As a result, the pixel data before the cutting-out start can be skipped. The horizontal read control pulse $HSEL_n$ is shift-registered from the read start position, thereby providing the configuration carrying out the skipping. In this connection, the flip flop 642$_n$ of the pixel column not to be read out is reset by using the column standby signal $CLMSTB_n$, thereby stopping the operation.

Horizontal Thinning-Out Processing

Example 5

Figure 25:
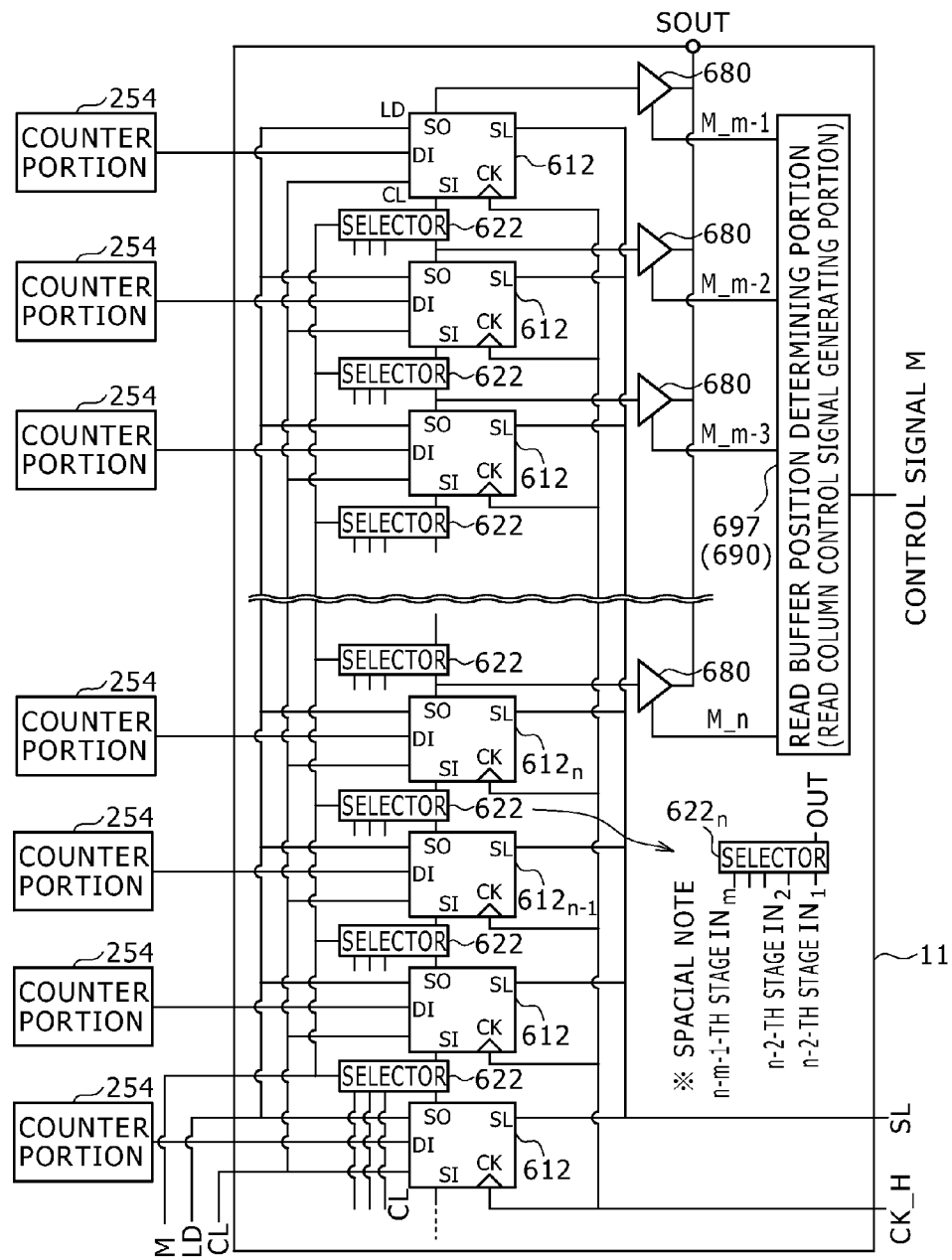
FIG. 25 is a circuit diagram explaining a first case of horizontal skipping processing according to Example 5 of the embodiment shown in FIG. 16.
Figure 26:
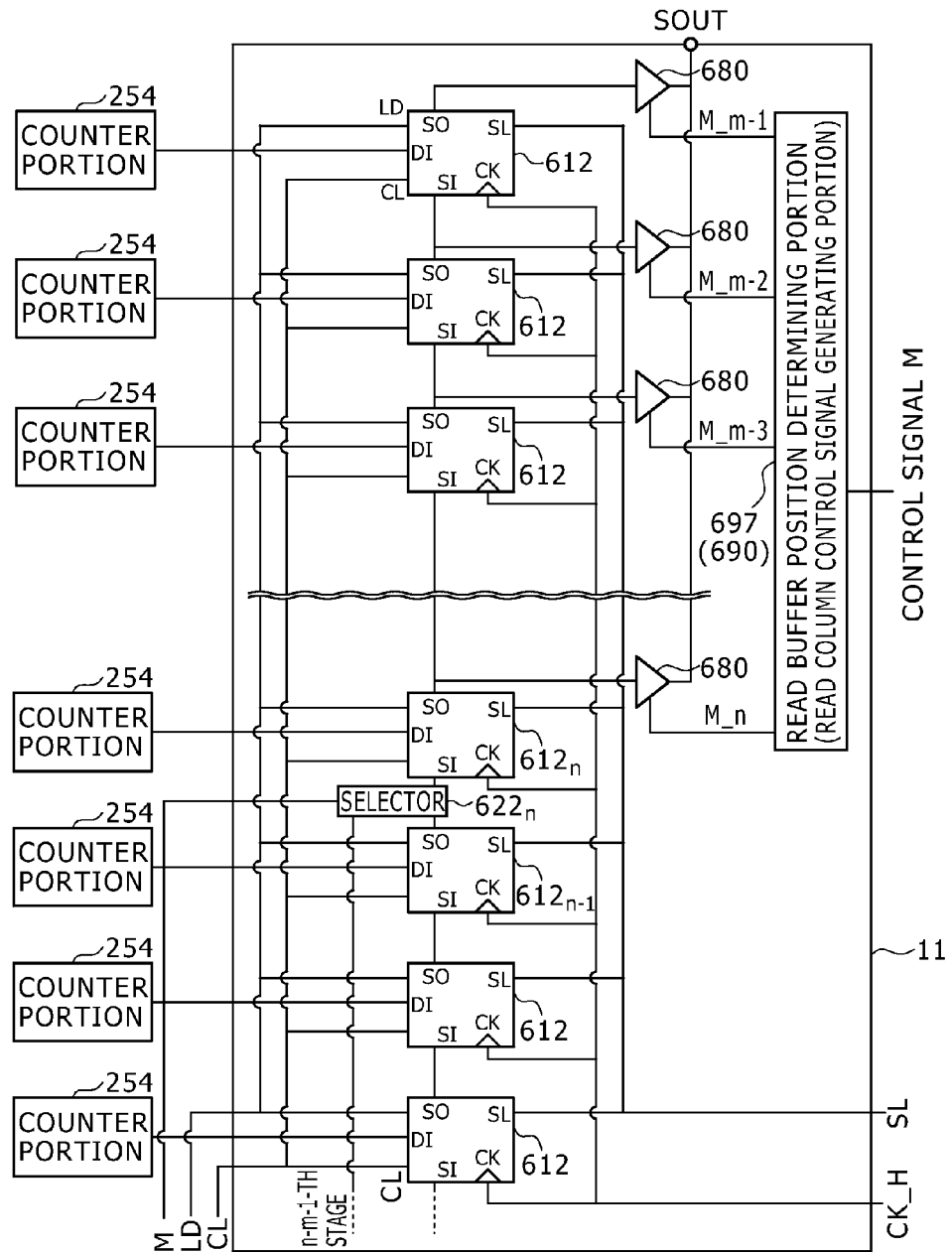
FIG. 26 is a circuit diagram explaining a second case of horizontal skipping processing according to Example 5 of the embodiment shown in FIG. 16.

FIGS. 25 and 26 are respectively circuit diagrams explaining skipping processing of Example 5. Example 5 is a change in horizontal transfer of Example 1, and the operation stop control for each non-selection column may be the same as that of Example 1.

Unlike Example 1 to Example 4 as the application examples of the horizontal cutting-out processing, the horizontal skipping processing of Example 5 is an application example of the horizontal thinning-out processing. Thus, the horizontal skipping processing of Example 5 features that the measures are taken so as to be applied to the horizontal thinning-out processing on the basis of a configuration in which whenever the horizontal transfer clock CK_H is inputted, the pixel data (read-out signal) is successively transferred to the subsequent stage by using the shift register, (this point is identical either to Example 1 or to Example 2). In this connection, the horizontal thinning-out processing is a form in which the pixel data is transferred to the horizontal signal line 18 side every number, m, of columns (m is the number of thinning-out and is a positive integer equal to or larger than 2). Thus, hereinafter, we shall refer the horizontal thinning-out processing as 1/m thinning. Although a detailed description is omitted here, it is better for the operating current supplying portion 24 and the column portion 26 to stop the operation for each non-selection column not becoming a read-out object, thereby reducing the power consumption.

In a first case shown in FIG. 25, the horizontal transferring portion 11 includes a switch portion 620 having a selector 622 for responding to the horizontal thinning-out processing between each adjacent two registers 612 (in a word, between each adjacent two stages) of the shift register 610 so as to be capable of responding to the 1/m thinning (m: an arbitrary thinning-out number). The selector 622 uses m inputs-1 output type switch so as to be capable of responding to the 1/m thinning.

For the sake of drawing, the connection of the signal lines to the input terminals of the selectors $622_n$ is omitted in the entire figure for illustration. However, as shown in special note in the figure, in the selector $622_n$ disposed on the input side of the register $612_n$ on the n-th stage, an output terminal OUT is connected to an input side of the register $612_n$, a first input terminal $IN_1$ is connected to an output terminal of the register $612_{n-1}$ (in a word, the (n−1)-th stage) right before the register $612_{n-2}$, and a second input terminal $IN_2$ is connected to an output terminal of the register $612_{n-2}$ (in a word, the (n−2)-th stage) right before the register $612_{n-1}$. Likewise, a final m-th input terminal $IN_m$ is connected to an output terminal of the register $612_{n-m}$ in the (n−m)-th stage. In the selector $622_{n-1}$ disposed on the input side of the register $612_{n-1}$ in the (n−1)-th stage, an output terminal OUT is connected to an input side of the register $612_{n-1}$, a first input terminal $TN_1$ is connected to an output terminal of the register $612_{n-2}$ (in a word, in the (n−2)-th stage) right before the register $612_{n-1}$, and a second input terminal $IN_2$ is connected to an output terminal of the register $612_{n-3}$ (in a word, in the (n−3)-th stage) right before the register $612_{n-2}$. Likewise, a final m-th input terminal $IN_m$ is connected to an output terminal of the register $612_{n-m-1}$ in the (n−m−1)-th stage. This also applies to any other stage.

In the selectors 622, a control signal M used to control the number, m, of thinning is inputted from the communication/timing controlling portion 20 to a control input terminal. Thus, the selectors 622 are controlled in such a way that in a phase of ½ thinning, the second input terminal $IN_2$ is selected. Likewise, the selectors 622 are controlled in such a way that in a phase of 1/m thinning, the m-th input terminal $IN_m$ is selected. As a result, since only the output from the register 612 in an (n±m·α)-th stage (α: an arbitrary integer) is selectively transferred to the outputting portion 28 side, the pixel data can be transferred to the horizontal signal line 18 side every number, m, of thinning. In this connection, there is no inconvenience in the phase of the normal reading-out processing because the control is carried out so as to select the first input terminal $IN_1$.

A second case shown in FIG. 26 is the case where the number, m, of thinning may be fixed, and a 2 inputs-1 output type switch is used every number, m, of thinning. In the selector $622_n$ disposed on the input side of the register $612_n$ in the n-th stage, the output terminal OUT is connected to the input side of the register $612_n$, the first input terminal $IN_1$ is connected to the output terminal of the register $612_{n-1}$ (in a word, in the (n−1)-th stage) right before the register $612_n$, and the second input terminal $IN_2$ is connected to the output terminal of the register $612_{n-m}$ in the (n−m)-th stage. This also applies to other (n±m·α)-th stage (α: arbitrary integer).

A control signal used to control whether or not the horizontal thinning-out processing is executed is inputted to the control input terminal of the selector 622. In the phase of the 1/m thinning, the control is carried out so as to select the second input terminal $IN_2$. As a result, since only the output from the register 612 in the (n±m·α)-th stage (α: an arbitrary integer) is selectively transferred to the outputting portion 28 side, the pixel data can be transferred to the horizontal signal line 18 side every number, m, of thinning. In this connection, there is no inconvenience in the phase of the normal reading-out processing because the control is carried out so as to select the first input terminal $IN_1$.

It is noted that in any of the first case and the second case, with regard to the head side (the outputting portion 28 side) of the shift register 610, for example, it is better to cause the n-th stage (or an arbitrary (n±m·α)-th stage) to become the final stage (in a word, the read buffer) in order to prevent any of unnecessary columns from being caused. When the n-th stage is not caused to become the final stage, it is better to adopt a configuration in which any of unnecessary columns is skipped. This way of thinking is the same as that in Example 2. That is to say, in the shift register 610, in the phase of the horizontal thinning-out processing, with regard to the register 612 in the range capable of becoming the non-selection column on the head side (for example, the range from the n-th stage to the (n+m−1)-th stage), the output buffer 680 is provided on the output side. The output terminals of the output buffers 680 are connected commonly to the serial output terminal SOUT in terms of the entire shift register 610. Control signals M_j indicating the number, m, of thinning are supplied from the read column control signal generating portion 690 to the output buffers 680, respectively. The read column control signal generating portion 690 includes a read buffer position determining portion 697. A control signal M used to control the number, m, of thinning is supplied from the communication/timing controlling portion 20 to the read buffer position determining portion 697. The read buffer position determining portion 697 generates control signals M_j (equivalent to the read buffer indicating signals Hrd_k) which specify the column of the read buffer based on the control signal H, and of which only the control signals indicating signals having the column number of the read buffers are active (for example, at the H level), and other read buffer indicating signals are inactive (for example, at the L level). Of the control signals M_j, only the control signal of the n-th stage is active (for example, at the H level), and other control signals are each inactive (for example, at the L level). The output terminal of each output buffer for which the control signal M_j is inactive becomes the high-impedance state. On the other hand, each output buffer (read buffer) for which the control signal M_j is active transfers the output signal thereof to the outputting portion 28. As a result, the pixel data in the non-selection column on the head side is not horizontally transferred. In this connection, when the normal control horizontal transfer is carried out, there is no inconvenience because the pixel data is transferred from the head output buffer to the outputting portion 28.

Example 6

Figure 27:
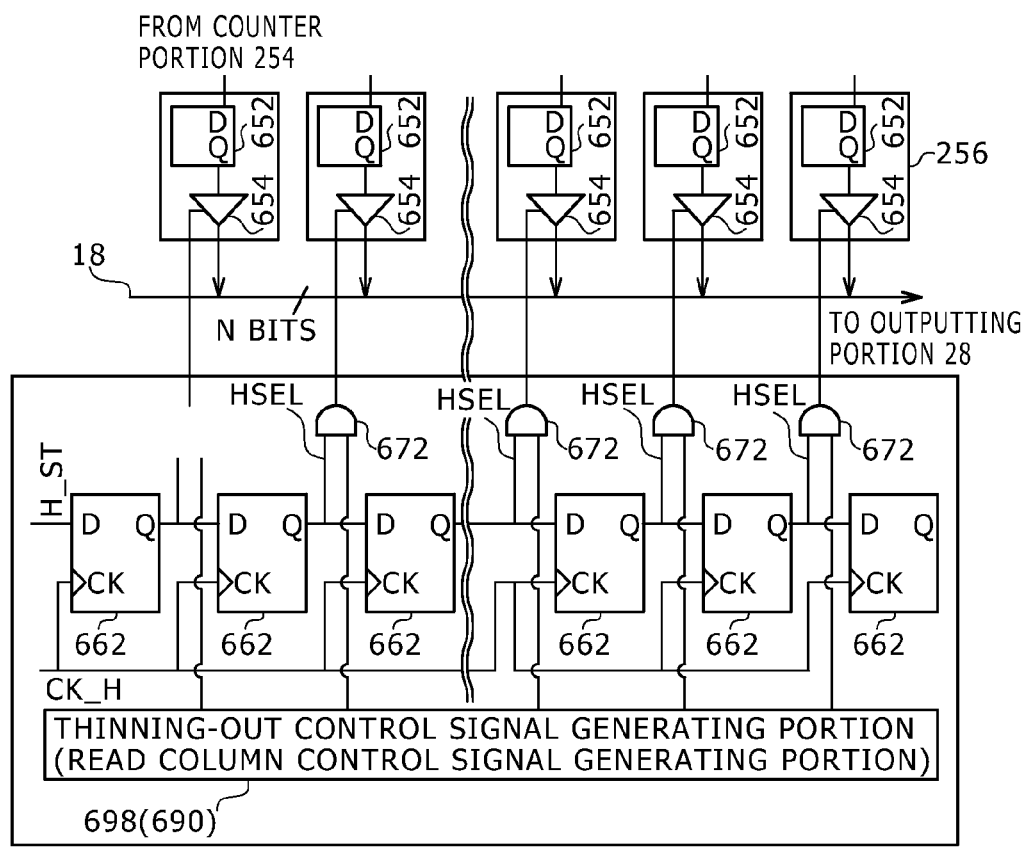
FIG. 27 is a circuit diagram explaining a configuration of a horizontal transferring portion in Example 6.
Figure 28A:
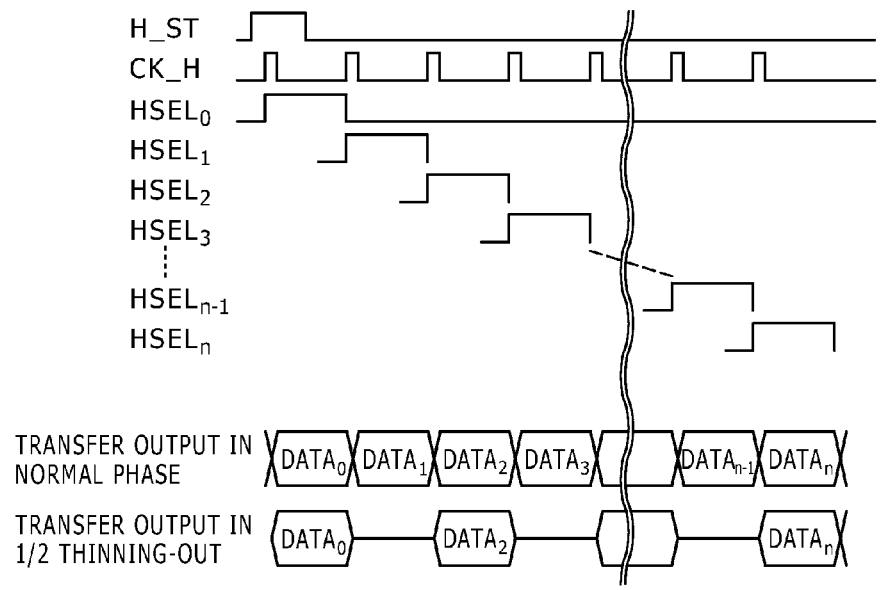
FIGS. 28A and 28B are respectively timing charts explaining an operation of the horizontal transferring portion in Example 6.
Figure 28B:
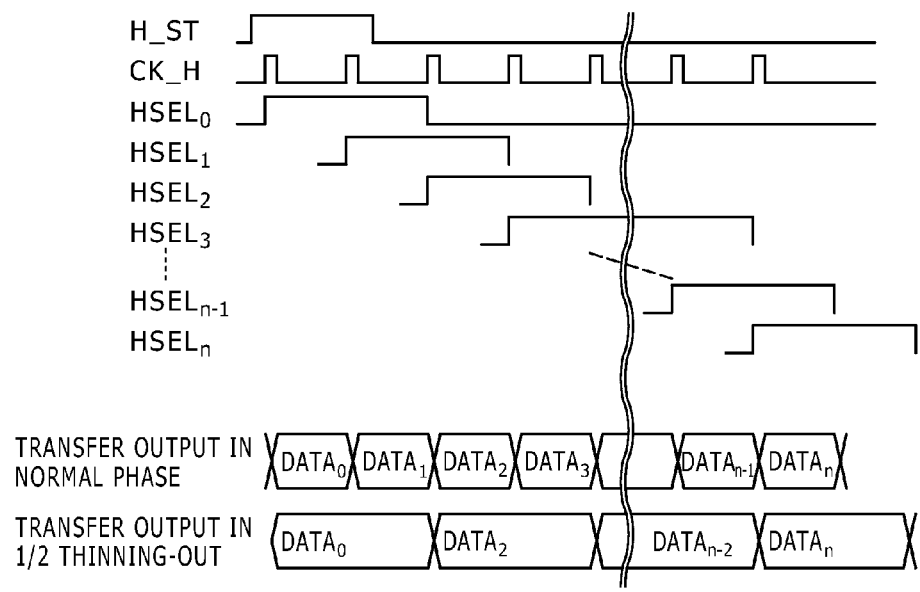

FIG. 27, and FIGS. 28A and 28B are respectively a circuit diagram, and timing charts explaining horizontal skipping processing of Example 6. Here, FIG. 27 is a circuit diagram explaining a configuration of the horizontal transferring portion 11 in Example 6. FIGS. 28A and 28B are respectively timing charts explaining an operation of the horizontal transferring portion 11 in Example 6. Example 6 is a change, in the horizontal transfer, of Example 1, and the operation stop control for each non-selection column may be the same as that in Example 1.

The horizontal skipping processing of Example 6 is an application example of the horizontal thinning processing similarly to the case of Example 3. Thus, Example 6 features that the measures are taken so as to be applied to the horizontal thinning processing in accordance with the control made by the horizontal scanning portion 12 (this point is identical to that in Example 3). The basic configuration is the same as that in Example 3, and thus Example 6 is different from Example 3 only in the control signals for the gate circuit 670. Specifically, the horizontal scanning portion 12 in Example 6 includes a gate circuit composing the horizontal driving portion 12*b* between the output terminal of the register 662 and the AD conversion portion 250 (specifically, the data memory portion 256). Also, the horizontal scanning portion 12 in Example 6 includes a read column control signal generating portion 690 having a thinning control signal generating portion 698 for generating thinning control signals used to control the gate circuits (in a word, to regulate the read column).

In the AND gate 672, the horizontal read control pulse HSEL outputted from the register 662 is supplied to one input terminal, and a thinning control signal used to regulate the thinning portion is supplied from the thinning control signal generating portion 698 to the other input terminal. The thinning control signal is a signal with which only the thinning position (the read column of the pixel data) becomes the active H level. As a result, since only the output signal from the data memory portion 256 in the (n±m·α)-th stage (α: an arbitrary integer) is selectively transferred to the outputting portion 28 side through the horizontal signal line 18, the pixel data can be transferred to the horizontal signal line 18 side every number, m, of thinning. In this connection, there is no inconvenience in the phase of the normal reading-out processing because the control is carried out in such a way that the thinning control signals for all of the columns become the active H level. Although a detailed description is omitted here, it is better for the operating current supplying portion 24 and the column portion 26 to stop the operation for each non-selection column not becoming a read-out object, thereby reducing the power consumption.

For example, a first case shown in FIG. 28A is an operation example in the case of a signal in which an H level time period of the start pulse H_ST is shorter than one cycle of the horizontal transfer clock CK_H, and the H level can be latched at the rising edge of the horizontal clock CK_H, and is shown as an example of the ½ thinning. In FIG. 28A, only the pixel data of even-numbered (including 0-th) columns is selectively transferred to the outputting portion 28 through the horizontal signal line 18. While the even-numbered (including 0-th) columns are selected, the pixel data is not transferred.

On the other hand, a second case shown in FIG. 28B is an operation example in the case of a signal in which an H level time period of the start pulse H_ST in the phase of the 1/m thinning is longer than a "m−1" cycles of the horizontal transfer clock CK_H and shorter than m cycles, and the H level can be latched at the rising edge of the horizontal clock CK_H, and is shown as an example of the ½ thinning (m=2). The start pulse H_ST in the normal operation is the same as that in the first case. In this case, the register 662 latches the horizontal read control pulse HSEL (the start pulse H_ST in the case of the initial stage) supplied thereto from the preceding stage at a rising of the horizontal transfer clock CK_H, and holds the horizontal read control pulse HSEL at the falling of the horizontal transfer clock CK_H, thereby transferring the horizontal read control pulse HSEL to the subsequent stage. It is possible to transfer the horizontal read control pulse HSEL having an active time period (H level) for the m cycles of the horizontal transfer clock CK_H corresponding to the start pulse H_ST in correspondence to the period of the horizontal transfer clock CK_H without depending on the duty of the horizontal transfer clock CK_H.

In FIG. 28B, only the pixel data of the even-numbered (including 0-th) columns is selectively transferred to the outputting portion 28 through the horizontal signal line 18. While the even-numbered (including 0-th) columns are selected, the pixel data is not transferred. By the way, each of the horizontal read control pulses HSEL themselves outputted from the respective registers 662 overlap the horizontal read control pulses HSEL adjacent thereto by the "m−1" cycles of the horizontal transfer clock CK_H. However, the signal used to control the 1/m thinning is outputted from the thinning control signal generating portion 698 to be gated by the AND gate 672, thereby preventing the overlap of the pixel data transferred on the horizontal signal line 18 from being caused. In addition, when the cycle of the horizontal transfer clock CK_H in the phase of the 1/m thinning is made 1/m (in other words, the clock rate is made m-fold), the read time can be made 1/m of the normal phase.

Although the technique disclosed in this specification has been described so far based on the embodiments, the technical scope disclosed in this specification is by no means limited to the scope of the embodiments described above. Various changes and modifications can be added to the embodiments described above without departing from the subject matter of the technique disclosed in this specification, and thus such embodiments obtained through the addition of such changes and modifications are also contained in the technical scope of the technique disclosed in this specification. The embodiments described above by no means limit the technique concerned with the appended claims, and all of combinations of the features described in the embodiments described above are not necessarily essential to the solving means for the problems on which the technique disclosed in this specification is made. The techniques in the various stages are contained in the embodiments described above and thus various techniques can be extracted based on suitable combinations in plural constituent requirements disclosed. Even when some constituent requirements are deleted from all of the constituent requirements disclosed in the embodiments described above, the constitution remaining after deletion of some constituent requirements are also extracted as the technique disclosed in the specification as long as the effects corresponding to the problems on which the technique disclosed in this specification is made are obtained.

The present disclosure contains subject matter related to that disclosed in Japanese Priority Patent Application JP 2011-023782 filed in the Japan Patent Office on Feb. 7, 2011, the entire content of which is hereby incorporated by reference.

What is claimed is:
1. A semiconductor device, comprising:
a pixel array portion in which unit pixels are disposed in a matrix of columns and rows, wherein vertical signal lines respectively correspond to columns of the unit pixels to provide readout signals from the unit pixels in the respective columns;
an AD conversion portion including comparing units and counter units,
the comparing units being respectively configured to compare a reference signal and the readout signals from the respective columns,
the counter units being configured to perform a count operation in a count operation effective period based on comparison results of the comparing units from the respective columns, the AD conversion portion performing AD conversion processing for acquiring digital data of the readout signals on the basis of output data of the counter units; and an operating current supplying portion, including transistors corresponding to the respective columns, each transistor having a gate terminal, a first current terminal and a second current terminal, the first current terminal being connected to a respective vertical signal line at a node between the pixel array portion and the AD conversion portion, the second current terminal being connected to a reference current source, and the gate terminal being connected to a column stop control signal line, wherein power consumption is controlled to be lower in a pixel selection mode in which only information on a part of the unit pixels for one row in the pixel array portion is required than in a normal operation mode.

2. The semiconductor device according to claim 1, wherein each of the comparing units of the AD conversion portion include an enable input, the enable input being connected to the column stop control signal line that is connected to the gate terminal of the transistor in its respective column.

3. The semiconductor device according to claim 2, wherein each of the counter units of the AD conversion portion include an input that is connected to the column stop control signal line that is connected to the gate terminal of the transistor in its respective column.

4. The semiconductor device according to claim 1, wherein each of the counter units of the AD conversion portion include an input that is connected to the column stop control signal line that is connected to the gate terminal of the transistor in its respective column.

5. The semiconductor device according to claim 1, wherein the power consumption is controlled to be lower by disconnecting the AD conversion portion from a power source supply for a vertical signal line of a pixel unit whose information is not required.

6. A solid-state imaging apparatus comprising an imaging lens and the semiconductor device according to claim 1.

7. The solid-state imaging apparatus according to claim 6, wherein each of the comparing units of the AD conversion portion include an enable input, the enable input being connected to the column stop control signal line that is connected to the gate terminal of the transistor in its respective column.

8. The solid-state imaging apparatus according to claim 7, wherein each of the counter units of the AD conversion portion include an input that is connected to the column stop control signal line that is connected to the gate terminal of the transistor in its respective column.

9. The solid-state imaging apparatus according to claim 6, wherein each of the counter units of the AD conversion portion include an input that is connected to the column stop control signal line that is connected to the gate terminal of the transistor in its respective column.

10. The solid-state imaging apparatus according to claim 6, wherein the power consumption is controlled to be lower by disconnecting the AD conversion portion from a power source supply for a vertical signal line of a pixel unit whose information is not required.

* * * * *